United States Patent
Washio et al.

(10) Patent No.: US 11,352,473 B2
(45) Date of Patent: Jun. 7, 2022

(54) HARD COAT LAMINATED FILM AND METHOD FOR PRODUCING SAME

(71) Applicant: RIKEN TECHNOS CORPORATION, Tokyo (JP)

(72) Inventors: Nozomu Washio, Tokyo (JP); Taketo Hashimoto, Tokyo (JP)

(73) Assignee: RIKEN TECHNOS CORPORATION

( * ) Notice: Subject to any disclaimer, the term of this patent is extended or adjusted under 35 U.S.C. 154(b) by 0 days.

(21) Appl. No.: 15/109,407

(22) PCT Filed: Jun. 19, 2015

(86) PCT No.: PCT/JP2015/067714
§ 371 (c)(1),
(2) Date: Jun. 30, 2016

(87) PCT Pub. No.: WO2016/147424
PCT Pub. Date: Sep. 22, 2016

(65) Prior Publication Data
US 2017/0056921 A1   Mar. 2, 2017

(30) Foreign Application Priority Data

Mar. 18, 2015 (JP) .............................. JP2015-054437
Mar. 18, 2015 (JP) .............................. JP2015-054438
Mar. 18, 2015 (JP) .............................. JP2015-054439

(51) Int. Cl.
*C08J 7/043* (2020.01)
*C08J 7/12* (2006.01)
(Continued)

(52) U.S. Cl.
CPC .............. *C08J 7/043* (2020.01); *B05D 3/002* (2013.01); *B05D 3/06* (2013.01); *B32B 27/08* (2013.01);
(Continued)

(58) Field of Classification Search
CPC ..... C08J 7/043; C08J 7/04; C08J 7/042; C08J 7/0423; C08J 7/0427; C08J 7/06; C08J 7/065
See application file for complete search history.

(56) References Cited

U.S. PATENT DOCUMENTS 3,496,143 A   2/1970   Siggel et al.
6,055,823 A   5/2000   Baker et al.
(Continued)

FOREIGN PATENT DOCUMENTS

CN   1649733 A    8/2005
CN   102686642 A  9/2012
(Continued)

OTHER PUBLICATIONS

Artham et al., Biodegradation of Aliphatic and Aromatic Polycarbonates, Macromol. Biosci, 2008, 8, 14-24. (Year: 2008).*
(Continued)

*Primary Examiner* — Callie E Shosho
*Assistant Examiner* — John Vincent Lawler
(74) *Attorney, Agent, or Firm* — Bracewell LLP; Brad Y. Chin

(57) ABSTRACT

Embodiments provide a hard coat laminated film including a first hard coat, a second hard coat, and a transparent resin film layer in order from the outermost surface layer side, where the first hard coat is formed of a coating material containing no inorganic particles; the second hard coat is formed of a coating material containing inorganic particles; and the hard coat laminated film satisfies the following requirements: (i) the total light transmittance is 85% or more; and (ii) the pencil hardness of the surface of the first hard coat is 5H or higher.

14 Claims, 2 Drawing Sheets

(51) Int. Cl.

| | | |
|---|---|---|
| *B32B 27/28* | (2006.01) | |
| *B32B 27/30* | (2006.01) | |
| *C08J 7/04* | (2020.01) | |
| *B32B 27/36* | (2006.01) | |
| *B32B 27/08* | (2006.01) | |
| *C09D 133/14* | (2006.01) | |
| *C08J 7/046* | (2020.01) | |
| *B05D 3/00* | (2006.01) | |
| *B05D 3/06* | (2006.01) | |
| *B05D 3/02* | (2006.01) | |
| *B05D 7/04* | (2006.01) | |
| *B05D 7/00* | (2006.01) | |

(52) U.S. Cl.
CPC .......... *B32B 27/281* (2013.01); *B32B 27/308* (2013.01); *B32B 27/365* (2013.01); *C08J 7/042* (2013.01); *C08J 7/046* (2020.01); *C08J 7/123* (2013.01); *C09D 133/14* (2013.01); *B05D 3/0209* (2013.01); *B05D 3/067* (2013.01); *B05D 7/04* (2013.01); *B05D 7/536* (2013.01); *B32B 2255/10* (2013.01); *B32B 2255/26* (2013.01); *B32B 2307/412* (2013.01); *B32B 2307/518* (2013.01); *B32B 2307/536* (2013.01); *B32B 2307/554* (2013.01); *B32B 2307/581* (2013.01); *B32B 2307/732* (2013.01); *B32B 2307/736* (2013.01); *B32B 2457/20* (2013.01); *C08J 2379/08* (2013.01); *C08J 2433/08* (2013.01); *C08J 2433/10* (2013.01); *C08J 2471/00* (2013.01)

(56) References Cited

U.S. PATENT DOCUMENTS

| | | | |
|---|---|---|---|
| 6,489,015 B1 * | 12/2002 | Tsuchiya | C08J 7/04 428/212 |
| 10,596,739 B2 * | 3/2020 | Washio | B05D 1/005 |
| 10,780,685 B2 | 9/2020 | Mori et al. | |
| 2003/0022984 A1 | 1/2003 | Kawase et al. | |
| 2005/0249942 A1 | 11/2005 | Coggio et al. | |
| 2006/0134400 A1 | 6/2006 | Takada et al. | |
| 2006/0210727 A1 | 9/2006 | Ibuki et al. | |
| 2007/0231566 A1 * | 10/2007 | Yoneyama | G02B 1/105 428/331 |
| 2007/0291363 A1 | 12/2007 | Asakura et al. | |
| 2008/0280086 A1 | 11/2008 | Sheridan et al. | |
| 2010/0104879 A1 | 4/2010 | Okano | |
| 2010/0147191 A1 | 6/2010 | Sakano et al. | |
| 2010/0210812 A1 | 8/2010 | Urakawa et al. | |
| 2012/0114892 A1 | 5/2012 | Jung et al. | |
| 2013/0059158 A1 | 3/2013 | Oguro et al. | |
| 2013/0063393 A1 | 3/2013 | Kurishima et al. | |
| 2013/0084458 A1 | 4/2013 | Yamada et al. | |
| 2013/0216801 A1 | 8/2013 | Kadoki et al. | |
| 2013/0222906 A1 | 8/2013 | Tsunekawa et al. | |
| 2014/0044891 A1 | 2/2014 | Shibata et al. | |
| 2014/0208657 A1 | 7/2014 | Kim et al. | |
| 2014/0227482 A1 | 8/2014 | Shibata et al. | |
| 2014/0360975 A1 | 12/2014 | Hustad et al. | |
| 2015/0197662 A1 | 7/2015 | Kang et al. | |
| 2015/0203711 A1 | 7/2015 | Kang et al. | |
| 2016/0122525 A1 | 5/2016 | Carloff et al. | |
| 2016/0122573 A1 | 5/2016 | Uprety et al. | |
| 2016/0214294 A1 | 7/2016 | Tsujimura et al. | |
| 2016/0229159 A1 | 8/2016 | Nakashima et al. | |
| 2017/0095993 A1 | 4/2017 | Tomomatsu et al. | |
| 2017/0183543 A1 | 6/2017 | Nagata et al. | |
| 2017/0198164 A1 | 7/2017 | Itagaki et al. | |
| 2018/0072029 A1 | 3/2018 | Nakashima et al. | |

FOREIGN PATENT DOCUMENTS

| | | |
|---|---|---|
| CN | 103492913 A | 1/2014 |
| CN | 104422239 A | 3/2015 |
| CN | 105404094 A | 3/2016 |
| EP | 2873692 A1 | 5/2015 |
| JP | S633011 A | 1/1988 |
| JP | H0211665 A | 1/1990 |
| JP | 04019142 A * | 1/1992 |
| JP | H0794061 A | 4/1995 |
| JP | 2000052472 A | 2/2000 |
| JP | 2000214791 A | 8/2000 |
| JP | 2000517455 A | 12/2000 |
| JP | 2002062405 A | 2/2002 |
| JP | 2004109966 A | 4/2004 |
| JP | 2005148444 A | 6/2005 |
| JP | 2005181940 A | 7/2005 |
| JP | 2006030983 A | 2/2006 |
| JP | 2006058574 A | 3/2006 |
| JP | 2006154758 A | 6/2006 |
| JP | 2006215488 A | 8/2006 |
| JP | 2007025040 A | 2/2007 |
| JP | 2007108449 A | 4/2007 |
| JP | 2007537059 A | 12/2007 |
| JP | 2008026883 A | 2/2008 |
| JP | 2008095064 A | 4/2008 |
| JP | 2008201864 A | 9/2008 |
| JP | 2009036818 A | 2/2009 |
| JP | 2009114248 A | 5/2009 |
| JP | 2009196125 A | 9/2009 |
| JP | 2009255544 A | 11/2009 |
| JP | 2009279806 A | 12/2009 |
| JP | 2010024255 A | 2/2010 |
| JP | 2010054861 A | 3/2010 |
| JP | 2010064332 A | 3/2010 |
| JP | 2010078642 A | 4/2010 |
| JP | 2010511206 A | 4/2010 |
| JP | 2010107823 A | 5/2010 |
| JP | 2010131771 A | 6/2010 |
| JP | 2010208035 A | 9/2010 |
| JP | 2010211150 A | 9/2010 |
| JP | 2010224150 A | 10/2010 |
| JP | 2010241019 A | 10/2010 |
| JP | 2010271400 A | 12/2010 |
| JP | 2010275385 A | 12/2010 |
| JP | 2011133862 A | 7/2011 |
| JP | 2011175040 A | 9/2011 |
| JP | 2011201087 A | 10/2011 |
| JP | 2011213989 A | 10/2011 |
| JP | 2012234163 A | 11/2012 |
| JP | 2012250438 A | 12/2012 |
| JP | 2013075466 A | 4/2013 |
| JP | 2013076029 A | 4/2013 |
| JP | 2013142113 A | 7/2013 |
| JP | 2013173871 A | 9/2013 |
| JP | 2014-31397 A | 2/2014 |
| JP | 2014024332 A | 2/2014 |
| JP | 2014025061 A | 2/2014 |
| JP | 2014040017 A | 3/2014 |
| JP | 2014043101 A | 3/2014 |
| JP | 2014080536 A | 5/2014 |
| JP | 2014117904 A | 6/2014 |
| JP | 2014143831 A | 8/2014 |
| JP | 2014152237 A | 8/2014 |
| JP | 2014152281 A | 8/2014 |
| JP | 2014201681 A | 10/2014 |
| JP | 2014238614 A | 12/2014 |
| JP | 2014240955 A | 12/2014 |
| JP | 2015013472 A | 1/2015 |
| JP | 2015013473 A | 1/2015 |
| JP | 2015016683 A | 1/2015 |
| JP | 2015033851 A | 2/2015 |
| JP | 2015034285 A | 2/2015 |
| JP | 2015034286 A | 2/2015 |
| JP | 2015083370 A | 4/2015 |
| JP | 2015151420 A | 8/2015 |
| JP | 2015182272 A | 10/2015 |
| JP | 2015182273 A | 10/2015 |
| JP | 2015184639 A | 10/2015 |

(56) References Cited

FOREIGN PATENT DOCUMENTS

| | | | |
|---|---|---|---|
| JP | 2015203770 A | 11/2015 | |
| JP | 2016006160 A | 1/2016 | |
| JP | 2016011365 A | 1/2016 | |
| JP | 5870222 B1 | 2/2016 | |
| JP | 5878255 A | 3/2016 | |
| JP | 2016060839 A | 4/2016 | |
| JP | 2016172423 A | 9/2016 | |
| JP | 2016172424 A | 9/2016 | |
| JP | 2016177260 A | 10/2016 | |
| JP | WO2015098495 A1 | 3/2017 | |
| JP | 2017200042 A | 11/2017 | |
| KR | 1020040094153 A | 11/2001 | |
| KR | 20100129512 A | 12/2010 | |
| KR | 20140056399 A | 5/2014 | |
| TW | 200609110 A | 3/2006 | |
| TW | 201300236 A | 1/2013 | |
| TW | 201420652 A | 6/2014 | |
| TW | 201437304 A | 10/2014 | |
| TW | 201504320 A | 2/2015 | |
| TW | 201602268 A | 1/2016 | |
| TW | 201638250 A | 11/2016 | |
| WO | 2005113690 A2 | 12/2005 | |
| WO | 2006102383 A1 | 9/2006 | |
| WO | 2008029766 A1 | 3/2008 | |
| WO | 2008067262 A1 | 6/2008 | |
| WO | 2011033976 A1 | 3/2011 | |
| WO | 2011034847 A1 | 3/2011 | |
| WO | 2011145630 A1 | 11/2011 | |
| WO | 2012026446 A1 | 3/2012 | |
| WO | 2012144508 A1 | 10/2012 | |
| WO | 2012144510 A1 | 10/2012 | |
| WO | 2013129531 A1 | 9/2013 | |
| WO | 2014030848 A1 | 2/2014 | |
| WO | 2014203792 A1 | 12/2014 | |
| WO | 2015001948 A1 | 1/2015 | |
| WO | 2015005049 A | 1/2015 | |
| WO | 2015005049 A1 | 1/2015 | |
| WO | 2015045823 A1 | 4/2015 | |
| WO | 2015098495 A1 | 7/2015 | |
| WO | 2015146565 A | 10/2015 | |
| WO | 2015150244 A1 | 10/2015 | |
| WO | 2016147424 A1 | 9/2016 | |
| WO | 2016147734 A1 | 9/2016 | |
| WO | 2016147739 A1 | 9/2016 | |
| WO | 2017200042 A | 11/2017 | |

OTHER PUBLICATIONS

KR10-2016-7017502 Decision of Rejection dated May 10, 2018; 8 pgs.
CN201580003516.4 Office Action dated Jun. 28, 2017; 22 pgs.
EP16764607.4 Search Report dated May 28, 2018; 8 pgs
JP6144330 Opposition Paper dated Dec. 5, 2017; 45 Pgs.
Yamamoto, et al.; Application of Chemically Absorbed Fluorocarbon Film with Highly Durability as a Mold Release Agent; Seikei-Kakou vol. 22 No. 2, 2010; pp. 104-114.
PCT/JP2016/052927 International Search Report dated Apr. 19, 2016; 2 pgs.
PCT/JP2016/052950 International Search Report dated Apr. 19, 2016; 2 pgs.
PCT/JP2016/053357 International Search Report dated May 17, 2016; 2 pgs.
PCT/JP2016/053355 International Search Report dated May 17, 2016; 2 pgs.
PCT/JP2016/053556 International Search Report dated May 17, 2016; 2 pgs.
PCT/JP2016/054363 International Search Report dated May 17, 2016; 2 pgs.
PCT/JP2016/084981 International Search Report dated Jan. 25, 2017; 2 pgs.
PCT/JP2016/084981 International Preliminary Report on Patentability dated Jun. 21, 2018; 13 pgs.
EP16764570.4 Search Report dated May 28, 2018; 8 pgs.
JP2015-054439 Office Action dated Aug. 24, 2016; 31 pgs.
TW104122442 Office Action dated Jul. 13, 2016; 24 pgs.
KR10-2016-7017502 Office Action dated Oct. 27, 2017; 18pgs.
CN201580003516.4 Office Action dated Jan. 17, 2018; 20 pgs.
Lai, et al., Synthetic Process and Application of Silicone Products, 2nd Edition, Nov. 2009, 4 pgs.
CN201680015984.8 Office Action dated Nov. 5, 2018; 13 pgs.
CN201680015901.5 Office Action dated Jan. 28, 2019; 12 pgs.
JP2017069555 Office Action dated Nov. 27, 2018; 8 pgs.
EP16764565.4 Extended European Search Report dated Oct. 18, 2018; 8 pgs.
CN201680015850.6 Office Action dated Jan. 24, 2019; 10 pgs.
CN201680015908.7 Office Action dated Feb. 2, 2019; 12 pgs.
KR10-2017-7026048 Korean Office Action dated Nov. 1, 2018; 14 pgs.
EP16764564.7 Extended European Search Report dated Oct. 18, 2018; 8 pgs.
EP16764550.6 Extended European Search Report dated Oct. 18, 2018; 8 pgs.
CN201680015900.0 Office Action dated Nov. 5, 2018; 12 pgs.
EP15885519.7 Extended European Search Report dated Oct. 18, 2018; 8Pgs.
Chinese Patent Application No. 201680015900.0 dated Jun. 4, 2019; 8 pgs.
Chinese Patent Application No. 201680015984.8 dated Jun. 4, 2019; 8 pgs.
EP16868622.8 Extended European Search Report dated May 20, 2019; 8 pgs.
TW105104029 Office Action dated Mar. 7, 2019; 12 pgs.
PCT/JP2017/027297 International Search Report dated Aug. 29, 2017; 2 pgs.
JP2017-152119 Office Action dated Aug. 7, 2018; 10 pgs.
PCT/JP2017/040099 International Search Report dated Feb. 13, 2018; 4 pgs.
KR10-2019-7001505 Office Action dated Feb. 20, 2019; 12 pgs.
CN201680015902.X Office Action dated Feb. 3, 2019; 15 pgs.
EP16872835.0 Extended European Search Report dated July 8, 2019; 6 pgs.
TW105104050 Office Action dated Aug. 20, 2019; 12 pgs.
CN201811070889.5 Office Action dated Jan. 10, 2020, 15 pgs.
CN201680068951.X Office Action dated Sep. 29, 2019; 21 pgs.
CN201680015902.X Office Action dated Jan. 2, 2020, 16 pgs.
JP2016-29588 Office Action dated Dec. 24, 2019, 7 pgs.
CN201810254960.9 Office Action dated Oct. 11, 2019, 13 pgs.
JP2017-094366 Office Action dated Nov. 18, 2019, 11 pgs.
JP2016-17863 Office Action dated Oct. 8, 2019; 11 pgs.
CN201680015902.X Second Office Action dated Jul. 17, 2019; 16 pgs.
TW105104026 Office Action dated Oct. 5, 2019; 10 pgs.
TW105104907 Office Action dated Oct. 18, 2019; 10 pages.
CN201680015984.8 Office Action dated Sep. 10, 2019, 13 pgs.
TW105104027 Office Action dated Jun. 25, 2019; 21 pages.
TW105104240 Office Action dated Oct. 17, 2019, 10 pgs.
EP15885519.7 Third Party Observations dated Jan. 8, 2020, 85 pgs.
CN201680015900.0 Office Action dated Sep. 10, 2019, 13 pgs.
CN201780055888.0 First Office Action dated Jul. 2, 2020, 11 pgs.
EP20150365.3 Extended European Search Report dated Apr. 9, 2020, 8 pgs.
JP2017-094366 Office Action dated May 11, 2020, 15 pgs.
JP2016-24288 Opposition Against JP6599789 dated Jun. 24, 2020, 64 pgs.
Website of Fluorolink@PFPE (including a flurorine-containing water repellent agent "Fluorolink AD 1700"), https://www.solvay.jp/ja/markets-and-products/featured-products/Fluorolink.html, Jan. 7, 2020, 2pgs.
CN201810254960.9 Second Office Action dated Jun. 9, 2020, 11 pgs.
EP20150373.7 Extended European Search Report dated Apr. 7, 2020, 9 pgs.
EP20150371.1 Extended European Search Report dated Apr. 7, 2020, 8 pgs.

(56) References Cited

OTHER PUBLICATIONS

EP17850559.0 Supplementary Search Report dated Mar. 18, 2020, 10 pgs.
EP17874537.8 Supplementary Search Report dated May 14, 2020, 12 pgs.
JP6599789B Notice for Reasons for Revocation dated Sep. 29, 2020, 32 pgs.
JP2017-094366 Office Action dated Jan. 26, 2021, 18 pgs.
CN201910756415.4 First Office Action dated Dec. 31, 2020, 9 pgs.
CN201810254960.9 Third Office Action dated Dec. 30, 2020, 16 pgs.
CN201811070889.5 Second Office Action dated Aug. 3, 2020, 16 pgs.
TW106125432 First Office Action dated Dec. 28, 2020, 14 pgs.
CN201780069802.X Second Office Action dated Nov. 25, 2020, 23 pgs.
CN201910746657.5 First Office Action dated Oct. 27, 2020, 18 pgs.
CN201780069802.X First Office Action dated Jul. 31, 2020, 23 pgs.
EP20202998.9 Extended European Search Report dated Feb. 1, 2021, 8 pgs.
KR10-2017-7026047 Third Party Observation dated Jan. 11, 2021, 21 pgs.
TW105136889 Second Office Action dated Jan. 7, 2021, 9 pgs.
JP2017-552695 Second Office Action dated Dec. 2, 2020, 5 pgs.
KR10-2019-7010129 First Office Action dated Jun. 25, 2021, 10 pgs.
CN201910746657.5 Second Office Action dated Jun. 4, 2021, 15 pgs.
CN201810254960.9 Decision of Rejection dated Jun. 30, 2021, 8 pgs.
CN201910756415.4 Second Office Action dated Aug. 3, 2021, 7 pgs.
JP2020-55297 Office Action dated May 20, 2021, 7 pgs.
TW106125432 Decision of Rejection dated Apr. 29, 2021, 11 pgs.
JP2020-55297 Office Action dated Dec. 23, 2021, 7 pgs.
KR10-2019-7014887 First Office Action dated Oct. 22, 2021, 11 pgs.
JP2017-211513 Office Action dated Oct. 6, 2021, 9 pgs.

\* cited by examiner

HARD COAT LAMINATED FILM AND METHOD FOR PRODUCING SAME

CROSS REFERENCE TO RELATED APPLICATION

This application claims the benefit of and priority to PCT/JP2015/067714, filed on Jun. 19, 2015, entitled (translation), "HARD COAT LAMINATED FILM AND METHOD FOR PRODUCING THE SAME," which claims the benefit of and priority to Japanese Patent Applications Nos. 2015-054437, 2015-054438, and 2015-054439, all of which were filed on Mar. 18, 2015, and all of which are hereby incorporated by reference in their entirety into this application.

BACKGROUND

Field of the Invention

The invention relates to a hard coat laminated film, and more specifically a hard coat laminated film excellent in transparency, surface hardness, bending resistance, abrasion resistance, color tone and surface appearance.

The invention also relates to a method for producing a hard coat laminated film, and more specifically a method for producing a hard coat laminated film excellent in transparency, color tone, abrasion resistance, surface hardness, bending resistance and surface appearance.

Description of the Related Art

In recent years, touch panels, which are installed on an image display device, such as a liquid crystal display, a plasma display and an electroluminescence display and enable input by touching with fingers, a pen or the like while watching displayed objects, have become popular.

For a display faceplate in a touch panel, articles using glass as the base material have been conventionally used because they meet the required properties such as heat resistance, dimensional stability, high transparency, high surface hardness and high stiffness. On the other hand, glass has disadvantages such as a low impact resistance and consequent fragility; a low processability; difficulty in handling; a high specific weight and a consequent heavy weight; and difficulty in satisfying the demand for a curved or flexible display. Therefore, materials to substitute for glass have been intensively studied. For a glass-substituting material, many hard coat laminated films have been proposed in which a hard coat excellent in surface hardness and abrasion resistance is formed on the surface of a transparent resin film formed of triacetylcellulose, polyethylene terephthalate, polycarbonate, polymethyl methacrylate, a norbornene polymer or the like (JP 2000-052472A and JP 2000-214791). However, the abrasion resistance is still insufficient in each of them. A hard coat laminated film has been required which can maintain surface properties such as finger slidability even after repeated wipes with a handkerchief or the like.

SUMMARY

The invention provides a hard coat laminated film excellent in transparency, surface hardness, bending resistance, abrasion resistance, color tone and surface appearance. It is desirable that this hard coat laminated film be one which can be suitably used for a member in an image display device such as a liquid crystal display, a plasma display and an electroluminescence display (including an image display device with a touch panel function and an image display device with no touch panel function), particularly for a display faceplate in an image display device with a touch panel function.

The invention further provides a method for producing a hard coat laminated film which enables to obtain a good interlayer adhesion strength even in the case where a plurality of hard coats with largely different properties are laminated. It is desirable that a hard coat laminated film to be obtained be one which is excellent in transparency, surface hardness, bending resistance, abrasion resistance, color tone and surface appearance and which can be suitably used for a member in an image display device such as a liquid crystal display, a plasma display and an electroluminescence display (including an image display device with a touch panel function and an image display device with no touch panel function), particularly for a display faceplate in an image display device with a touch panel function.

According to a first aspect, there is provided a hard coat laminated film including a first hard coat, a second hard coat and a transparent resin film layer in order from an outermost surface layer side, wherein the first hard coat is formed of a coating material containing no inorganic particles, the second hard coat is formed of a coating material containing inorganic particles, and the hard coat laminated film satisfies the following requirements: (i) a total light transmittance is 85% or more, and (ii) a pencil hardness of a surface of the first hard coat is 5H or higher.

According to the first aspect, the pencil hardness of the surface of the first hard coat is 7H or higher.

According to the first aspect, the hard coat laminated film further satisfies the following requirements: (iii) a haze is 2.0% or less, and (iv) a minimum bending radius is 40 mm or less.

According to the first aspect, the hard coat laminated film further satisfies the following requirements: (v) a water contact angle on the surface of the first hard coat is 100° or more, and (vi) a water contact angle on the surface of the first hard coat after 20000 reciprocating wipes with a cotton is 100° or more.

According to the first aspect, the transparent resin film is a transparent multilayer film with a first poly(meth)acrylimide resin layer ($\alpha1$), an aromatic polycarbonate resin layer ($\beta$), and a second poly(meth)acrylimide resin layer ($\alpha2$) directly laminated in this order.

According to the first aspect, the first hard coat is formed of a coating material containing a silane coupling agent.

According to the first aspect, a thickness of the first hard coat is 0.5 to 5 μm.

According to the first aspect, a thickness of the second hard coat is 10 to 30 μm.

According to the first aspect, there is provided a use of the hard coat laminated film according to the invention for a member in an image display device.

According to the first aspect, there is provided an image display device including the hard coat laminated film according to the invention.

According to a second aspect, there is provided a hard coat laminated film including a first hard coat, a second hard coat, and a transparent resin film layer in order from an outermost surface layer side, wherein the first hard coat is formed of a coating material containing (A) 100 parts by mass of a polyfunctional (meth)acrylate, (B) 0.01 to 7 parts by mass of a water repellant, and (C) 0.01 to 10 parts by mass of a silane coupling agent and containing no inorganic particles; and the second hard coat is formed of a coating material containing (A) 100 parts by mass of a polyfunctional (meth)acrylate, and (D) 50 to 300 parts by mass of inorganic fine particles having an average particle size of 1 to 300 nm.

According to the second aspect, the (C) silane coupling agent contains one or more selected from the group consisting of a silane coupling agent having an amino group and a silane coupling agent having a mercapto group.

According to the second aspect, the (B) water repellant contains a (meth)acryloyl group-containing fluoropolyether water repellant.

According to the second aspect, the coating material for forming the second hard coat further contains (E) 0.01 to 1 part by mass of a leveling agent.

According to the second aspect, a thickness of the first hard coat is 0.5 to 5 μm.

According to the second aspect, a thickness of the second hard coat is 10 to 30 μm.

According to the second aspect, the transparent resin film is a transparent multilayer film with a first poly(meth)acrylimide resin layer (α1), an aromatic polycarbonate resin layer (β), and a second poly(meth)acrylimide resin layer (α2) directly laminated in this order.

According to the second aspect, there is provided a use of the hard coat laminated film for a member in an image display device.

According to the second aspect, there is provided an image display device including the hard coat laminated film according to the invention.

According to a third aspect, there is provide a method for producing a hard coat laminated film, including the steps of: (1) coating a transparent resin film with a coating material α containing an active energy ray-curable resin to form a first wet coat; (2) irradiating the first wet coat formed of the coating material α with an active energy ray so that an integrated amount of light is 1 to 230 mJ/cm$^2$ to convert the first wet coat formed of the coating material α into a coating film in a set-to-touch state; (3) coating the coating film in a set-to-touch state formed of the coating material α with a coating material β containing an active energy ray-curable resin to form a second wet coat; and (4) preheating the second wet coat formed of the coating material β to a temperature of 30 to 100° C. followed by irradiating with an active energy ray so that an integrated amount of light is 240 to 10000 mJ/cm$^2$ to obtain a hard coat laminated film comprising a hard coat formed of the coating material α and a hard coat formed of the coating material β.

According to the third aspect, a thickness of the hard coat formed of the coating material β is 0.5 to 5 μm.

According to the third aspect, a thickness of the hard coat formed of the coating material α is 10 to 30 μm.

According to the third aspect, the coating material β contains: (A) 100 parts by mass of a polyfunctional (meth)acrylate, (B) 0.01 to 7 parts by mass of a water repellant, and (C) 0.01 to 10 parts by mass of a silane coupling agent and contains no inorganic particles.

According to the third aspect, the coating material α contains: (A) 100 parts by mass of a polyfunctional (meth)acrylate, and (D) 50 to 300 parts by mass of inorganic fine particles having an average particle size of 1 to 300 nm.

According to the third aspect, the transparent resin film is a transparent multilayer film with a first poly(meth)acrylimide resin layer (P1), an aromatic polycarbonate resin layer (Q), and a second poly(meth)acrylimide resin layer (P2) directly laminated in this order.

According to the third aspect, there is provided a hard coat laminated film produced by using the method according to the invention.

According to the third aspect, there is provided a use of the hard coat laminated film according to the invention for a member in an image display device.

According to the third aspect, there is provided an image display device including the hard coat laminated film according to the invention.

DETAILED DESCRIPTION

Figure 1:
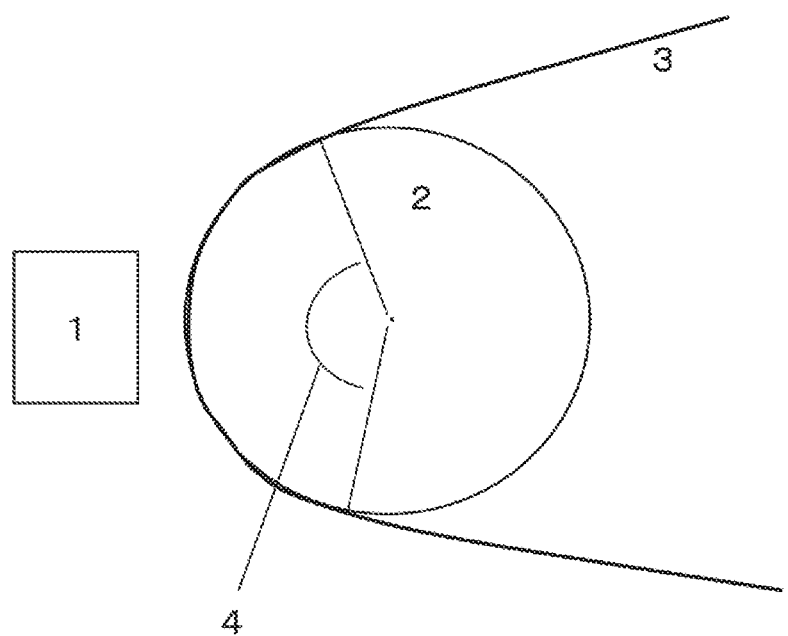
FIG. 1 is a conceptual diagram of a UV irradiator used in Examples according to the invention.

Hereinafter, the first aspect, the second aspect, and the third aspect of the invention will be described.

When part of one aspect of the invention is referred to for a component or a method with regard to another aspect in the following description, it is intended that the latter aspect is supported by the part referred to.

1. Hard Coat Laminated Film According to First Aspect of the Invention

The hard coat laminated film according to a first aspect of the invention includes a first hard coat, a second hard coat, and a transparent resin film layer in order from the outermost surface layer side, wherein the first hard coat is formed of a coating material containing no inorganic particles; and the second hard coat is formed of a coating material containing inorganic particles.

Here, "the surface layer side" means being disposed closer to the outer surface of an article formed by using a hard coat laminate having a multilayer structure when the article is in practice use (e.g., being disposed closer to the displaying surface of an image display device when the article is used for the image display device).

The inorganic particles (e.g., silica (silicon dioxide); metal oxide particles formed of aluminum oxide, zirconia, titania, zinc oxide, germanium oxide, indium oxide, tin oxide, indium tin oxide, antimony oxide, cerium oxide or the like; metal fluoride particles formed of magnesium fluoride, sodium fluoride or the like; metal sulfide particles; metal nitride particles; and metal particles) are highly effective in enhancing the hardness of a hard coat.

On the other hand, the weak interaction between inorganic particles and a resin component in a coating material results in an insufficient abrasion resistance. Accordingly, the invention allows the first hard coat constituting the outermost surface to contain no inorganic particles for retaining the abrasion resistance and on the other hand allows the second hard coat to contain inorganic particles, preferably inorganic fine particles having an average particle size of 1 to 300 nm for enhancing the hardness, and thereby has solved this problem.

The term "inorganic particles" referred to herein is intended to mean particles not including particles formed of an organic substance (i.e., a substance which can generate water and carbon dioxide by combustion).

Here, "containing no" inorganic particles regarding the first hard coat means not containing a significant amount of inorganic particles. In the field of coating materials for forming a hard coat, the significant amount of inorganic particles is typically about 1 part by mass or more based on 100 parts by mass of the resin component in a coating material. Therefore, "containing no" inorganic particles can be represented otherwise as follows: the amount of inorganic particles is typically 0 parts by mass or more and less than 1 part by mass, preferably 0.1 parts by mass or less and more preferably 0.01 parts by mass or less based on 100 parts by mass of the resin component in the coating material for forming the first hard coat.

Here, "containing" inorganic particles regarding the second hard coat means containing a significant amount of inorganic particles for enhancing the hardness of a hard coat. In the field of coating materials for forming a hard coat, the significant amount of inorganic particles for enhancing the hardness of a hard coat is typically about 5 parts by mass or more based on 100 parts by mass of the resin component in a coating material. Therefore, "containing" inorganic particles can be represented otherwise: the amount of inorganic particles is typically 5 parts by mass or more, preferably 15 parts by mass or more, more preferably 30 parts by mass or more, still more preferably 50 parts by mass or more and most preferably 80 parts by mass or more based on 100 parts by mass of the resin component in the coating material for forming the second hard coat. The upper limit of the amount of inorganic particles in the second hard coat, which is not particularly limited, may be typically 1000 parts by mass or less, preferably 500 parts by mass or less, more preferably 300 parts by mass or less, still more preferably 200 parts by mass or less and most preferably 160 parts by mass or less based on 100 parts by mass of the resin component in the coating material for forming the second hard coat.

The hard coat laminated film has a total light transmittance of 85% or more, preferably 88% or more, and more preferably 90% or more (measured with a turbidimeter "NDH 2000" (trade name) available from Nippon Denshoku Industries Co., Ltd. in accordance with JIS K7361-1:1997). Due to the total light transmittance being 85% or more, the hard coat laminated film according to the invention can be suitably used for a member in an image display device. A higher total light transmittance is more preferred.

The hard coat laminated film has a haze of 2.0% or less, preferably 1.5% or less, more preferably 1.0% or less and still more preferably 0.5% or less (measured with a turbidimeter "NDH 2000" (trade name) available from Nippon Denshoku Industries Co., Ltd. in accordance with JIS K7136:2000). Due to the haze being 2.0% or less, the hard coat laminated film according to the invention can be suitably used for a member in an image display device. A lower haze is more preferred.

In the hard coat laminated film, a surface of the first hard coat has a pencil hardness of 5H or higher, preferably 6H or higher and more preferably 7H or higher (measured with a pencil "uni" (trade name) available from Mitsubishi Pencil Co., Ltd. under conditions of a load of 750 g in accordance with JIS K5600-5-4). Due to the pencil hardness being 5H or higher, the hard coat laminated film according to the invention can be suitably used for a member in an image display device. A higher pencil hardness is more preferred.

The hard coat laminated film has a minimum bending radius of preferably 40 mm or less, more preferably 35 mm or less and still more preferably 30 mm or less. Due to the minimum bending radius being 40 mm or less, the hard coat laminated film according to the invention can easily be handled as a film roll, and this leads to an advantage in terms of production efficiency and the like. A smaller minimum bending radius is more preferred. Here, the minimum bending radius is a value determined by a test (iv) in Examples described later.

The minimum bending radius referred to herein is a bending radius immediately before the occurrence of a crack in the surface of a bending portion when a hard coat laminated film is bent, and indicates the limit against bending. Bending radius is defined in the same manner as for radius of curvature.

Figure 3:
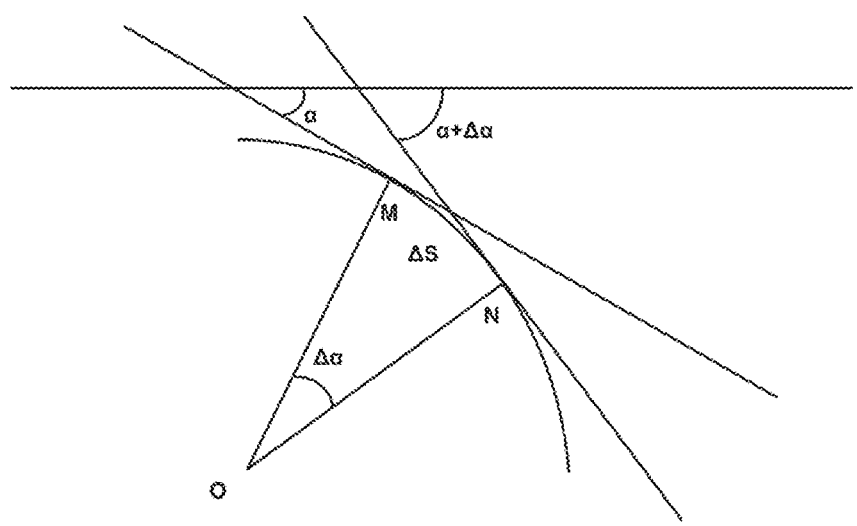
FIG. 3 is a diagram for describing a radius of curvature according to the invention.

A radius of curvature is defined as follows in reference to FIG. 3. The length from the point M to the point N in the curve is denoted as $\Delta S$; the difference between the slope of the tangent line at the point M and the slope of the tangent line at the point N as Act; and the intersection of the line which is perpendicular to the tangent line at the point M and intersects with the tangent line at the point M and the line which is perpendicular to the tangent line at the point N and intersects with the tangent line at the point N, as O. In the case where $\Delta S$ is sufficiently small, the curve from the point M to the point N can be approximated to an arc (see FIG. 3). The radius in this case is defined as the radius of curvature. Further, the radius of curvature is denoted as R. Then, $\angle MON = \Delta\alpha$. In the case where $\Delta S$ is sufficiently small, Act is also sufficiently small and therefore $\Delta S = R\Delta\alpha$. As the result, $R = \Delta S / \Delta\alpha$.

In the hard coat laminated film according to the invention, a surface of the first hard coat has a water contact angle of preferably 100° or more, and more preferably 105° or more. In the case where the hard coat laminated film according to the invention is used for a display faceplate in a touch panel, the first hard coat will function as a touch surface. The water contact angle on the surface of the first hard coat of 100° or more enables to operate a touch panel at will by sliding fingers or a pen on the touch surface. From the viewpoint of sliding fingers or a pen at will, a higher water contact angle is more preferred. The upper limit of the water contact angle is not particularly limited and about 120° is typically adequate from the viewpoint of finger slidability. Here, the water contact angle is a value determined by a test (v) in Examples described later.

In the hard coat laminated film, a surface of the first hard coat has a water contact angle after 20000 reciprocating wipes with a cotton of preferably 100° or more. More preferably, the water contact angle on the first hard coat after 25000 reciprocating wipes with a cotton is 100° or more. The water contact angle after 20000 reciprocating wipes with a cotton of 100° or more enables to maintain the surface properties such as finger slidability even after repeated wipes with a handkerchief or the like. For the number of wipes with a cotton during which a water contact angle of 100° or more can be maintained, a larger number is more preferred. Here, the water contact angle after wipes with a cotton is a value determined by a test (vi) in Examples described later.

The hard coat laminated film has a yellowness index of preferably 3 or less, more preferably 2 or less and still more preferably 1 or less (measured with a colorimeter "SolidSpec-3700" (trade name) available from Shimadzu Corporation in accordance with JIS K7105:1981). A smaller yellowness index is more preferred. Due to the yellowness index being 3 or less, the hard coat laminated film according to the invention can be suitably used for a member in an image display device.

In a further embodiment, the hard coat laminated film according to the invention preferably meets the requirements (i), (ii) and (iii) regarding desirable physical properties simultaneously, or preferably meets the requirements (i), (ii) and (iv) simultaneously, or preferably meets the requirements (i), (ii) and (v) simultaneously, or preferably meets the requirements (i), (ii), (iii) and (v) simultaneously, or preferably meets the requirements (i), (ii), (iii), (v) and (vi) simultaneously, or preferably meets the requirements (i), (ii), (iv) and (v) simultaneously, or preferably meets the requirements (i), (ii), (iv), (v) and (vi) simultaneously, or preferably meets the requirements (i), (ii), (iii), (iv) and (v) simultaneously. In a still further embodiment, the hard coat laminated film according to the invention preferably meets the requirements (i), (ii) and (iii) and a pencil hardness of 7H or higher regarding desirable physical properties simultaneously, or preferably meets the requirements (i), (ii) and (iv) and a pencil hardness of 7H or higher simultaneously, or preferably meets the requirements (i), (ii) and (v) and a pencil hardness of 7H or higher simultaneously, or preferably meets the requirements (i), (ii), (iii) and (v) and a pencil hardness of 7H or higher simultaneously, or preferably meets the requirements (i), (ii), (iii), (v) and (vi) and a pencil hardness of 7H or higher simultaneously, or preferably meets the requirements (i), (ii), (iv) and (v) and a pencil hardness of 7H or higher simultaneously, or preferably meets the requirements (i), (ii), (iv), (v) and (vi) and a pencil hardness of 7H or higher simultaneously, or preferably meets the requirements (i), (ii), (iii), (iv) and (v) and a pencil hardness of 7H or higher simultaneously.

First Hard Coat

The first hard coat constitutes the surface of the hard coat laminated film. In the case where the hard coat laminated film according to the invention is used for a display faceplate in an image display device with a touch panel function, the first hard coat functions as a touch surface. The first hard coat exhibits a good abrasion resistance, and serves to maintain the surface properties such as finger slidability even after repeated wipes with a handkerchief or the like.

Any coating material can be used for the coating material for forming the first hard coat without limitation as long as it contains no inorganic particles. Preferred examples of the coating material for forming the first hard coat include coating materials which contain an active energy ray-curable resin and can form a hard coat through polymerization/curing with an active energy ray such as a UV ray and an electron beam.

Examples of the active energy ray-curable resin include one or more selected from (meth)acryloyl group-containing prepolymers or oligomers such as polyurethane (meth)acrylate, polyester (meth)acrylate, polyacryl (meth)acrylate, epoxy (meth)acrylate, polyalkylene glycol poly(meth)acrylate and polyether (meth)acrylate; (meth)acryloyl group-containing monofunctional reactive monomers such as methyl (meth)acrylate, ethyl (meth)acrylate, n-butyl(meth)acrylate, hexyl (meth)acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth)acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth)acrylate and trimethylsiloxyethyl methacrylate; monofunctional reactive monomers such as N-vinylpyrrolidone and styrene; (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl)propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra(meth)acrylate; (meth)acryloyl group-containing hexafunctional reactive monomers such as dipentaerythritol hexaacrylate; and the like, and resins containing one or more of the above substances as constituent monomers. One of them or a mixture of two or more thereof can be used for the active energy ray-curable resin. The term (meth)acrylate herein means acrylate or methacrylate.

In the case where the hard coat laminated film according to the invention is used for a member in an image display device, particularly a display faceplate in an image display device with a touch panel function, the coating material for forming the first hard coat is preferably a coating material containing (A) 100 parts by mass of a polyfunctional (meth)acrylate; (B) 0.01 to 7 parts by mass of a water repellant; and (C) 0.01 to 10 parts by mass of a silane coupling agent and containing no inorganic particles from the viewpoint of transparency, color tone, abrasion resistance, surface hardness, bending resistance and surface appearance.

For the types and amounts of the (A) polyfunctional (meth)acrylate, the (B) water repellant and the (C) silane coupling agent and other optional components to be blended, those described later for constitution components of the hard coat laminated film according to a second aspect can preferably be employed.

The coating material for forming the first hard coat may contain a solvent as desired for dilution to a concentration which allows easy application. The solvent is not particularly limited as long as the solvent neither reacts with any of the components (A) to (C) and other optional components nor catalyzes (promotes) the self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol and acetone. One of them or a mixture of two or more thereof can be used for the solvent.

The coating material for forming the first hard coat can be obtained by mixing and stirring these components.

The method for forming the first hard coat using the coating material for forming the first hard coat is not particularly limited, and known web coating methods can be used. Specifically, examples of the method include roll coating, gravure coating, reverse coating, roll brushing, spray coating, air knife coating and die coating.

The thickness of the first hard coat is preferably 0.5 µm or more, and more preferably 1 µm or more from the viewpoint of abrasion resistance and hardness. At the same time, the thickness of the first hard coat is preferably 5 µm or less, more preferably 4 µm or less and still more preferably 3 µm or less from the viewpoint of adhesiveness to the second hard coat.

In addition, the thickness of the first hard coat may be preferably 0.5 µm or more and 5 µm or less, or 0.5 µm or more and 4 µm or less, or 0.5 µm or more and 3 µm or less, or preferably 1 µm or more and 5 µm or less, or 1 µm or more and 4 µm or less, or 1 µm or more and 3 µm or less.

Second Hard Coat

Any coating material can be used for the coating material for forming the second hard coat without limitation as far as it contains inorganic particles. Preferred examples of the coating material for forming the second hard coat include coating materials which further contain an active energy ray-curable resin and can form a hard coat through polymerization/curing with an active energy ray such as a UV ray and an electron beam.

The active energy ray-curable resin has been described above in the description of the coating material for forming the first hard coat. One of the above-described active energy ray-curable resins or a mixture of two or more thereof can be used for this active energy ray-curable resin.

In the case where the hard coat laminated film according to the invention is used for a member in an image display device, particularly a display faceplate in an image display device with a touch panel function, the coating material for forming the second hard coat is preferably a coating material containing (A) 100 parts by mass of a polyfunctional (meth)acrylate; and (D) 50 to 300 parts by mass of inorganic fine particles having an average particle size of 1 to 300 nm from the viewpoint of transparency, color tone, abrasion resistance, surface hardness, bending resistance and surface appearance.

For the (A) polyfunctional (meth)acrylate and the (D) inorganic fine particle having an average particle size of 1 to 300 nm and other optional components (e.g., a leveling agent), those described later for constitution components of the hard coat laminated film according to the second aspect can preferably be employed.

The coating material for forming the second hard coat may contain a solvent as desired for dilution to a concentration which allows easy application. The solvent is not particularly limited as long as the solvent neither reacts with any of the components (A) and (D) and other optional components nor catalyzes (promotes) the self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol and acetone. Among them, 1-methoxy-2-propanol is preferred. One of them or a mixture of two or more thereof can be used for the solvent.

The coating material for forming the second hard coat can be obtained by mixing and stirring these components.

The method for forming the second hard coat using the coating material for forming the second hard coat is not particularly limited, and known web coating methods can be used. Specifically, examples of the method include roll coating, gravure coating, reverse coating, roll brushing, spray coating, air knife coating and die coating.

The thickness of the second hard coat is preferably 10 μm or more, more preferably 15 μm or more and still more preferably 18 μm or more from the viewpoint of hardness. At the same time, the thickness of the second hard coat is preferably 30 μm or less, more preferably 27 Nm or less and still more preferably 25 μm or less from the viewpoint of curling resistance and bending resistance.

In addition, the thickness of the second hard coat may be preferably 10 μm or more and 30 μm or less, or 10 μm or more and 27 μm or less, or 10 μm or more and 25 μm or less, or preferably 15 μm or more and 30 μm or less, or 15 μm or more and 27 μm or less, or 15 μm or more and 25 μm or less, or preferably 18 μm or more and 30 μm or less, or 18 μm or more and 27 μm or less, or 18 μm or more and 25 μm or less.

Transparent Resin Film

The transparent resin film is a layer functioning as a transparent film base material for forming the first hard coat and the second hard coat thereabove. Any transparent resin film can be used for the transparent resin film without limitation as long as it has a high transparency and no coloring. Examples thereof include films formed of a cellulose ester resin such as triacetylcellulose; a polyester resin such as polyethylene terephthalate; a cyclic hydrocarbon resin such as an ethylene-norbornene copolymer; an acrylic resin such as polymethyl methacrylate and polyethyl methacrylate; a poly(meth)acrylimide resin; an aromatic polycarbonate resin; a polyolefin resin such as polypropylene and 4-methyl-penten-1; a polyamide resin; a polyarylate resin; a polymer-type urethane acrylate resin; and a polyimide resin. These films encompass cast films, uniaxially oriented films and biaxially oriented films. Further, these films encompass laminated films with one of these films or two or more thereof laminated in two or more layers.

The thickness of the transparent resin film, which is not particularly limited, can be any thickness as desired. The thickness of the transparent resin film may be typically 20 μm or more and preferably 50 μm or more from the viewpoint of the handleability of the hard coat laminated film according to the invention. In the case where the hard coat laminated film according to the invention is used for a display faceplate in a touch panel, the thickness of the transparent resin film may be typically 100 μm or more, preferably 200 μm or more, and more preferably 300 μm or more from the viewpoint of retaining the stiffness. Further, the thickness of the transparent resin film may be typically 1500 μm or less, preferably 1200 μm or less and more preferably 1000 μm or less from the viewpoint of meeting the requirement for a thinner touch panel. In applications in which a high stiffness is not required other than a display faceplate in a touch panel, the thickness of the transparent resin film may be typically 250 μm or less and preferably 150 μm or less from the viewpoint of economic efficiency.

The transparent resin film is preferably a poly(meth)acrylimide resin film. This allows the hard coat laminated film to be excellent in surface hardness, abrasion resistance transparency, surface smoothness, appearance, stiffness, heat resistance and dimensional stability, and as a result the hard coat laminated film can be suitably used for a display faceplate in a touch panel or a transparent electroconductive substrate.

The poly(meth)acrylimide resin is a thermoplastic resin in which, while a high transparency, a high surface hardness and a high stiffness derived from an acrylic resin are retained, a characteristic of being excellent in heat resistance and dimensional stability derived from a polyimide resin is introduced to overcome a drawback of coloring to pale yellow-to-reddish brown color. The poly(meth)acrylimide resin is disclosed in JP 2011-519999 A, for example. The term poly(meth)acrylimide herein means polyacrylimide or polymethacrylimide.

Any poly(meth)acrylimide resin can be used for the poly(meth)acrylimide resin without limitation as long as it has a high transparency and no coloring in order to use the hard coat laminated film for optical articles such as a touch panel.

Preferred examples of the poly(meth)acrylimide resin include ones having a yellowness index of 3 or less (measured with a colorimeter "SolidSpec-3700" (trade name) available from Shimadzu Corporation in accordance with JIS K7105:1981). The yellowness index is more preferably 2 or less and still more preferably 1 or less. Further, preferred examples of the poly(meth)acrylimide resin include poly(meth)acrylimide resins having a melt mass-flow rate of 0.1 to 20 g/10 min (measured under conditions of 260° C. and 98.07 N in accordance with ISO 1133) from the viewpoint of extrusion load and the stability of a melted film. The melt mass-flow rate is more preferably 0.5 to 10 g/10 min. Further, the glass transition temperature of the poly(meth)acrylimide resin is preferably 150° C. or higher from the viewpoint of heat resistance. The glass transition temperature is more preferably 170° C. or higher.

The poly(meth)acrylimide resin can further contain, within a range that is not contrary to the object of the invention, a thermoplastic resin other than the poly(meth)acrylimide resin; a pigment, an inorganic filler, an organic filler, a resin filler; an additive such as, a lubricant, an antioxidant, a weatherability stabilizer, a heat stabilizer, a releasing agent, an antistatic agent and a surfactant; or the like, as desired. The amount of the optional component(s) to be blended is typically about 0.01 to 10 parts by mass based on 100 parts by mass of the poly(meth)acrylimide resin.

Examples of commercial products of the poly(meth)acrylimide resin can include "PLEXIMID TT50" (trade name) and "PLEXIMID TT70" (trade name) available from Evonik Industry AG.

The poly(meth)acrylimide resin film is preferably a transparent multilayer film with a first poly(meth)acrylimide resin layer ($\alpha$1); an aromatic polycarbonate resin layer ($\beta$); and a second poly(meth)acrylimide resin layer ($\alpha$2) directly laminated in this order. The invention is herein described under the assumption that a touch surface is formed on the $\alpha$1 layer side.

The poly(meth)acrylimide resin is excellent in heat resistance and surface hardness but often insufficient in cutting processability. On the other hand, the aromatic polycarbonate resin is excellent in cutting processability but often insufficient in heat resistance and surface hardness. Therefore, using a transparent multilayer film having the above-described layer configuration enables to easily obtain a hard coat laminated film in which both substances cover for each other's drawbacks and which is excellent in all of heat resistance, surface hardness and cutting processability.

The layer thickness of the $\alpha$1 layer, although not particularly limited, may be typically 20 µm or more, preferably 40 µm or more, more preferably 60 µm or more and still more preferably 80 µm or more from the viewpoint of the heat resistance and the surface hardness of the hard coat laminated film according to the invention.

The layer thickness of the $\alpha$2 layer, although not particularly limited, is preferably the same layer thickness as the $\alpha$1 layer from the viewpoint of the curling resistance of the hard coat laminated film according to the invention.

Here, "the same layer thickness" should not be interpreted as the same layer thickness in the physicochemically strict sense; but should be interpreted as the same layer thickness within a variation in a process/quality control commonly performed in industry. The reason is that the curling resistance of a multilayer film can be kept good if the layer thickness is the same layer thickness within a variation in a process/quality control commonly performed in industry. A cast multilayer film obtained by a T-die coextrusion method is typically subjected to a process/quality control within a variation of about −5 to +5 µm, and therefore the layer thickness of 65 µm and the layer thickness of 75 µm should be interpreted to be identical. "The same layer thickness" here can be paraphrased as "substantially the same layer thickness".

The layer thickness of the 13 layer, although not particularly limited, may be typically 20 µm or more and preferably 80 µm or more from the viewpoint of the cutting processability of the hard coat laminated film according to the invention.

The poly(meth)acrylimide resin to be used for the $\alpha$1 layer and the $\alpha$2 layer has been described above.

For the poly(meth)acrylimide resin to be used for the $\alpha$1 layer and the poly(meth)acrylimide resin to be used for the $\alpha$2 layer, poly(meth)acrylimide resins different in resin properties, for example, poly(meth)acrylimide resins different in melt mass-flow rate or glass transition temperature may be used. It is preferred to use poly(meth)acrylimide resins having the same resin properties from the viewpoint of the curling resistance of the hard coat laminated film according to the invention. Using poly(meth)acrylimide resins in the same grade and in the same lot is one of the preferred embodiments, for example.

Examples of the aromatic polycarbonate resin to be used for the 13 layer include aromatic polycarbonate resins such as polymers obtained by interfacial polymerization of an aromatic dihydroxy compound such as bisphenol A, dimethyl bisphenol A and 1,1-bis(4-hydroxyphenyl)-3,3,5-trimethylcyclohexane with phosgene; and polymers obtained by transesterification reaction of an aromatic dihydroxy compound such as bisphenol A, dimethyl bisphenol A and 1,1-bis(4-hydroxyphenyl)-3,3,5-trimethylcyclohexane with a carbonate diester such as diphenyl carbonate. One of them or a mixture of two or more thereof can be used for the aromatic polycarbonate resin to be used for the 13 layer.

Preferred examples of optional components which can be contained in the aromatic polycarbonate resin include core-shell rubbers. Using 0 to 30 parts by mass of a core-shell rubber (100 to 70 parts by mass of the aromatic polycarbonate resin), preferably 0 to 10 parts by mass of a core-shell rubber (100 to 90 parts by mass of the aromatic polycarbonate resin) based on 100 parts by mass of the total amount of the aromatic polycarbonate resin and the core-shell rubber can further enhance the cutting processability and the impact resistance of a hard coat laminated film.

Examples of the core-shell rubber include core-shell rubbers formed of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer and a methacrylate-acrylonitrile/acrylate rubber graft copolymer. One of them or a mixture of two or more thereof can be used for the core-shell rubber.

The aromatic polycarbonate resin can further contain, within a range that is not contrary to the object of the invention, a thermoplastic resin other than the aromatic polycarbonate resin or the core-shell rubber; a pigment, an inorganic filler, an organic filler, a resin filler; an additive such as a lubricant, an antioxidant, a weatherability stabilizer, a heat stabilizer, a releasing agent, an antistatic agent and a surfactant; or the like, as desired. The amount of the optional component(s) to be blended is typically about 0.01 to 10 parts by mass based on 100 parts by mass of the total amount of the aromatic polycarbonate resin and the core-shell rubber.

The method for producing the poly(meth)acrylimide resin film (including the case where the film is the above-described transparent multilayer film) is not particularly limited. Preferred examples of the production method include the methods described in JP 2015-033844 A and JP 2015-034285 A.

In forming the second hard coat, an adhesion-facilitating treatment such as a corona discharge treatment and an anchor coat formation may be performed beforehand on the surface for forming the hard coat or both surfaces of the monolayer film formed of the poly(meth)acrylimide resin or the transparent multilayer film in order to enhance the adhesion strength to the second hard coat.

The hard coat laminated film preferably includes the first hard coat, the second hard coat, the transparent resin film layer and a third hard coat in order from the surface side. The third hard coat formed will allow a force to curl the hard coat laminated film in one direction (hereinafter, occasionally abbreviated as a curling force) and a force to curl the hard coat laminated film in another direction to work simultaneously. Then, the occurrence of curling can be suppressed by allowing these two curling forces to be canceled to be zero.

Figure 2:
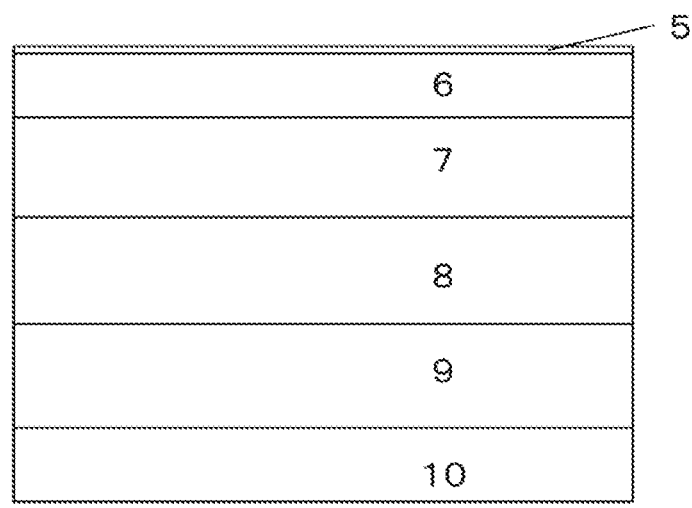
FIG. 2 is a conceptual cross-sectional diagram illustrating an example of the hard coat laminated film according to a first aspect of the invention, the hard coat laminated film according to a second aspect of the invention or the hard coat laminated film obtained by the production method according to a third aspect of the invention.

FIG. 2 illustrates a hard coat laminated film comprising the third hard coat. In FIG. 2, the reference signs denote as follows: 5: a first hard coat, 6: a second hard coat, 7: a first poly(meth)acrylimide resin layer ($\alpha$1), 8: an aromatic polycarbonate resin layer ($\beta$), 9: a second poly(meth)acrylimide resin layer ($\alpha$2), 10: a third hard coat.

The components and the thickness of the third hard coat are not particularly limited as long as the two curling forces can be canceled. For the components and the thickness of the third hard coat, those described above for the second hard coat may be employed.

In recent years, a touch panel has been proposed which has a bilayer structure in which a touch sensor is directly provided on the back side of a display faceplate for the purpose of weight reduction of an image display device (so-called one-glass-solution). In addition, one-plastic-solution to substitute for the so-called one-glass-solution has also been proposed for the purpose of further weight reduction. In the case where the hard coat laminated film according to the invention is used for the one-plastic-solution to substitute for the so-called one-glass-solution, the third hard coat formed allows the hard coat laminated film to easily have properties suitable for a printed surface.

The hard coat laminated film may have an optional layer(s) other than the first hard coat, the second hard coat, the transparent resin film layer and the third hard coat, as desired. Examples of the optional layer include a hard coat other than the first to third hard coats, an anchor coat, a pressure-sensitive adhesive layer, a transparent electroconductive layer, a high refractive index layer, a low refractive index layer and a reflection-preventive layer.

Regarding the poly(meth)acrylimide resin film, which is preferably a transparent multilayer film with a first poly (meth)acrylimide resin layer ($\alpha$1); an aromatic polycarbonate resin layer ($\beta$); and a second poly(meth)acrylimide resin layer ($\alpha$2) directly laminated in this order as described above, it is not intended that poly(meth)acrylimide resin films comprising an optional layer(s) (e.g., a pressure-sensitive adhesive layer, an anchor coat, a transparent electroconductive layer, a high refractive index layer, a low refractive index layer, a reflection-preventive layer, and the like) in addition to these layers be excluded from the scope of the invention.

Production Method

The method for producing the hard coat laminated film according to the invention can be produced by using any method without particular limitation.

Preferred examples of the production method include methods comprising the following steps from the viewpoint of adhesiveness between the first hard coat and the second hard coat:

(1) coating a transparent resin film with a coating material for forming the second hard coat to form a first wet coat;

(2) irradiating the first wet coat formed of the coating material for forming the second hard coat with an active energy ray so that the integrated amount of light is 1 to 230 mJ/cm$^2$, preferably 5 to 200 mJ/cm$^2$, more preferably 10 to 160 mJ/cm$^2$, still more preferably 20 to 120 mJ/cm$^2$ and most preferably 30 to 100 mJ/cm$^2$ to convert the first wet coat formed of the coating material for forming the second hard coat into a coating film in a set-to-touch state;

(3) coating the coating film in a set-to-touch state formed of the coating material for forming the second hard coat with a coating material for forming the first hard coat to form a second wet coat; and (4) preheating the second wet coat formed of the coating material for forming the first hard coat to a temperature of 30 to 100° C., preferably to a temperature of 40 to 85° C., more preferably to a temperature of 50 to 75° C. followed by irradiating with an active energy ray so that the integrated amount of light is 240 to 10000 mJ/cm$^2$, preferably 320 to 5000 mJ/cm$^2$ and more preferably 360 to 2000 mJ/cm$^2$ to obtain a hard coat laminated film comprising the second hard coat formed of the coating material for forming the second hard coat and the first hard coat formed of the coating material for forming the first hard coat.

In the step (1), the method for forming the first wet coat from the coating material for forming the second hard coat is not particularly limited, and known web coating methods can be used. Specifically, examples of the method include roll coating, gravure coating, reverse coating, roll brushing, spray coating, air knife coating and die coating.

The first wet coat formed of the coating material for forming the second hard coat, which has been provided in the step (1), becomes in a set-to-touch state or in a state with no tackiness in the step (2) so that problems in handling such as sticking do not occur even in direct contact with a web apparatus. This enables to form the second wet coat on the coating film in a set-to-touch state formed of the coating material for forming the second hard coat by using the coating material for forming the first hard coat in the next step (3).

The clause "a coating film is in a set-to-touch state (in a state with no tackiness)" herein means that a coating film is in a state in which, even when the coating film directly comes into contact with a web apparatus, no problem in handling occurs.

The irradiation with an active energy ray in the step (2) is performed so that the integrated amount of light, although depending on the properties of a coating material to be used for the coating material for forming the second hard coat, is typically 1 J/cm$^2$ or more, preferably 5 mJ/cm$^2$ or more, more preferably 10 mJ/cm$^2$ or more, still more preferably 20 mJ/cm$^2$ or more and most preferably 30 mJ/cm$^2$ or more from the viewpoint of converting the coating film into a coating film in a set-to-touch state reliably. At the same time, the irradiation with an active energy ray in this step is performed so that the integrated amount of light is typically 230 mJ/cm$^2$ or less, preferably 200 mJ/cm$^2$ or less, more preferably 160 mJ/cm$^2$ or less, still more preferably 120 mJ/cm$^2$ or less and most preferably 100 mJ/cm$^2$ or less from the viewpoint of the adhesiveness between the first hard coat and the second hard coat. The integrated amount of light in this step may be typically 1 J/cm$^2$ or more and 230 mJ/cm$^2$ or less, preferably 1 J/cm$^2$ or more and 200 mJ/cm$^2$ or less, or 1 J/cm$^2$ or more and 160 mJ/cm$^2$ or less, or 1 J/cm$^2$ or more and 120 mJ/cm$^2$ or less, or 1 J/cm$^2$ or more and 100 mJ/cm$^2$ or less, or preferably 5 mJ/cm$^2$ or more and 230 mJ/cm$^2$ or less, or 5 mJ/cm$^2$ or more and 200 mJ/cm$^2$ or less, or 5 mJ/cm$^2$ or more and 160 mJ/cm$^2$ or less, or 5 mJ/cm$^2$ or more and 120 mJ/cm$^2$ or less, or 5 mJ/cm$^2$ or more and 100 mJ/cm$^2$ or less, or preferably 10 mJ/cm$^2$ or more and 230 mJ/cm$^2$ or less, or 10 mJ/cm$^2$ or more and 200 mJ/cm$^2$ or less, or 10 mJ/cm$^2$ or more and 160 mJ/cm$^2$ or less, or 10 mJ/cm$^2$ or more and 120 mJ/cm$^2$ or less, or 10 mJ/cm$^2$ or more and 100 mJ/cm$^2$ or less, or preferably 20 mJ/cm$^2$ or more and 230 mJ/cm$^2$ or less, or 20 mJ/cm$^2$ or more and 200 mJ/cm$^2$ or less, or 20 mJ/cm$^2$ or more and 160 mJ/cm$^2$ or less, or 20 mJ/cm$^2$ or more and 120 mJ/cm$^2$ or less, or 20 mJ/cm$^2$ or more and 100 mJ/cm$^2$ or less, or preferably 30 mJ/cm$^2$ or more and 230 mJ/cm$^2$ or less, or 30 mJ/cm$^2$ or more and 200 mJ/cm$^2$ or less, or 30 mJ/cm$^2$ or more and 160 mJ/cm$^2$ or less, or 30 mJ/cm$^2$ or more and 120 mJ/cm$^2$ or less, or 30 mJ/cm$^2$ or more and 100 mJ/cm$^2$ or less.

The first wet coat formed of the coating material for forming the second hard coat is preferably predried before irradiating with an active energy ray in the step (2). The predrying can be performed by passing a web in a drying furnace with the temperature set to about 23 to 150° C., preferably with the temperature set to 50 to 120° C., at a line speed such that the time required to pass through from the inlet to the outlet is about 0.5 to 10 minutes and preferably 1 to 5 minutes, for example.

The first wet coat formed of the coating material for forming the second hard coat may be preheated to a temperature of 40 to 120° C., preferably to a temperature of 70 to 100° C. in advance of irradiating an active energy ray in the step (2). Such preheating enables to convert the coating film into a set-to-touch state reliably. The method for preheating is not particularly limited, and any method can be performed. Specific examples of the method will be described later in the description of the step (4).

The method for forming the second wet coat formed of the coating material for forming the first hard coat in the step (3) is not particularly limited, and any known web coating method can be used. Specifically, examples of the method include roll coating, gravure coating, reverse coating, roll brushing, spray coating, air knife coating and die coating.

The second wet coat formed of the coating material for forming the first hard coat, which has been provided in the step (3), is completely cured in the step (4). Simultaneously, the coating film in a set-to-touch state formed of the coating material for forming the second hard coat is also completely cured.

The above-described method enables to enhance the adhesiveness between the first hard coat and the second hard coat, and without wishing to be bound by any theory it is presumed that the reason is that complete curing is simultaneously achieved for both hard coats by limiting the integrated amount of light in irradiating an active energy ray to an amount adequate to convert the coating film into a coating film in a set-to-touch state but inadequate to completely cure the coating film in the step (2) and setting the integrated amount of light to an amount adequate to completely cure the coating film in the step (4) for the first time.

The irradiation with an active energy ray in the step (4) is performed so that the integrated amount of light is 240 mJ/cm$^2$ or more, preferably 320 mJ/cm$^2$ or more, and more preferably 360 mJ/cm$^2$ or more from the viewpoint of completely curing the coating film and the adhesiveness between the first hard coat and the second hard coat. At the same time, the irradiation with an active energy ray in this step is performed so that the integrated amount of light is 10000 mJ/cm$^2$ or less, preferably 5000 mJ/cm$^2$ or less, and more preferably 2000 mJ/cm$^2$ or less from the viewpoint of preventing the yellowing of a hard coat laminated film to be obtained and costs. The integrated amount of light in this step may be typically 240 J/cm$^2$ or more and 10000 mJ/cm$^2$ or less, preferably 240 J/cm$^2$ or more and 5000 mJ/cm$^2$ or less, or 240 J/cm$^2$ or more and 2000 mJ/cm$^2$ or less, or preferably 320 mJ/cm$^2$ or more and 10000 mJ/cm$^2$ or less, or 320 mJ/cm$^2$ or more and 5000 mJ/cm$^2$ or less, or 320 J/cm$^2$ or more and 2000 mJ/cm$^2$ or less, or preferably 360 mJ/cm$^2$ or more and 10000 mJ/cm$^2$ or less, or 360 mJ/cm$^2$ or more and 5000 mJ/cm$^2$ or less, or 360 J/cm$^2$ or more and 2000 mJ/cm$^2$ or less.

The second wet coat formed of the coating material for forming the first hard coat is preferably predried before irradiating with an active energy ray in the step (4). The predrying can be performed by passing a web in a drying furnace with the temperature set to about 23 to 150° C., preferably with the temperature set to 50 to 120° C., at a line speed such that the time required to pass through from the inlet to the outlet is about 0.5 to 10 minutes and preferably 1 to 5 minutes, for example.

The second wet coat formed of the coating material for forming the first hard coat is preheated to a temperature of 30 to 100° C., preferably to a temperature of 40 to 85° C. and more preferably to a temperature of 50 to 75° C. in advance of irradiating an active energy ray in the step (4) from the viewpoint of obtaining a good interlayer adhesion strength even in the case where the coating material for forming the first hard coat and the coating material for forming the second hard coat are largely different in properties. The temperature range may be preferably 30 to 85° C. or 30 to 75° C., or preferably 40 to 100° C. or 40 to 85° C. or 40 to 75° C., or preferably be 50 to 100° C. or 50 to 85° C. or 50 to 75° C. The method for preheating is not particularly limited, and any method can be used. Examples thereof include a method in which a web is wrapped around a mirror-finished metal roll 2 disposed opposite to an active energy ray (UV ray) irradiator 1 as illustrated in FIG. 1 and the surface temperature of the roll is controlled to a predetermined temperature; a method in which the temperature in an irradiation furnace, which is formed by surrounding an active energy ray irradiator, is controlled to a predetermined temperature; and a combination of these options.

An aging treatment may be performed after the step (4). This enables to stabilize the properties of the hard coat laminated film.

2. Hard Coat Laminated Film According to Second Aspect of the Invention

The hard coat laminated film according to the second aspect of the invention includes a first hard coat, a second hard coat and a transparent resin film layer in order from the outermost surface layer side.

First Hard Coat

The first hard coat constitutes the surface of the hard coat laminated film according to the invention. In the case where the hard coat laminated film according to the invention is used for a display faceplate in an image display device with a touch panel function, the first hard coat functions as a touch surface. The first hard coat exhibits a good abrasion resistance, and serves to maintain the surface properties such as finger slidability even after repeated wipes with a handkerchief or the like.

The first hard coat is formed of a coating material containing (A) 100 parts by mass of a polyfunctional (meth) acrylate; (B) 0.01 to 7 parts by mass of a water repellant; and (C) 0.01 to 10 parts by mass of a silane coupling agent and containing no inorganic particles.

The inorganic particles (e.g., silica (silicon dioxide); metal oxide particles formed of aluminum oxide, zirconia, titania, zinc oxide, germanium oxide, indium oxide, tin oxide, indium tin oxide, antimony oxide, cerium oxide or the like; metal fluoride particles formed of magnesium fluoride, sodium fluoride or the like; metal sulfide particles; metal nitride particles; and metal particles) are highly effective in enhancing the hardness of a hard coat. On the other hand, the weak interaction between inorganic particles and a resin component such as the component (A) results in an insufficient abrasion resistance. Accordingly, the invention allows the first hard coat constituting the outermost surface to contain no inorganic particles for retaining the abrasion resistance and on the other hand allows the second hard coat to contain a large amount of specific inorganic fine particles for enhancing the hardness, and thereby has solved this problem.

The term "inorganic particles" referred to herein is intended to mean particles not including particles formed of an organic substance (i.e., a substance which can generate water and carbon dioxide by combustion).

Here, "containing no" inorganic particles means not containing a significant amount of inorganic particles. In the field of coating materials for forming a hard coat, the significant amount of inorganic particles is typically about 1 part by mass or more based on 100 parts by mass of the component (A). Therefore, "containing no" inorganic particles can be represented otherwise as follows: the amount of inorganic particles is typically 0 parts by mass or more and less than 1 part by mass, preferably 0.1 parts by mass or less and more preferably 0.01 parts by mass or less based on 100 parts by mass of the component (A).

(A) Polyfunctional (meth)acrylate

The polyfunctional (meth)acrylate as the component (A) is a (meth)acrylate having two or more (meth)acryloyl groups in one molecule. Since this component has two or more (meth)acryloyl groups in one molecule, it serves to form a hard coat through polymerization/curing with an active energy ray such as a UV ray and an electron beam.

Examples of the polyfunctional (meth)acrylate include (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl)propane; (meth)acryloyl group-containing trifunctional reactive monomers such as trimethylolpropane tri(meth)acrylate, trimethylolethane tri(meth)acrylate and pentaerythritol tri (meth)acrylate; (meth)acryloyl group-containing tetrafunctional reactive monomers such as pentaerythritol tetra(meth) acrylate; and (meth)acryloyl group-containing hexafunctional reactive monomers such as dipentaerythritol hexaacrylate; and polymers (oligomers and prepolymers) containing one or more of them as constituent monomers. One of them or a mixture of two or more thereof can be used for the component (A).

The term (meth)acrylate herein means acrylate or methacrylate.

(B) Water Repellant

The water repellant as the component (B) serves to enhance the finger slidability, the stain resistance and the wipeability against stain.

Examples of the water repellant include wax water repellants such as a paraffin wax, a polyethylene wax and an acryl-ethylene copolymer wax; silicone water repellants such as a silicon oil, a silicon resin, a polydimethylsiloxane and an alkylalkoxysilane; and fluorine-containing water repellants such as a fluoropolyether water repellant and a fluoropolyalkyl water repellant. One of them or a mixture of two or more thereof can be used for the water repellant as the component (B).

Among them, a fluoropolyether water repellant is preferred for the water repellant as the component (B) from the viewpoint of water repellent performance. An water repellant containing a compound having a (meth)acryloyl group and a fluoropolyether group in the molecule (hereinafter, abbreviated as a (meth)acryloyl group-containing fluoropolyether water repellant) is more preferred for the water repellant as the component (B) from the viewpoint that the component (A) and the component (B) can chemically bond or strongly interact together to prevent troubles such as the bleed-out of component (B). Still more preferred for the water repellant as the component (B) is an admixture of an acryloyl group-containing fluoropolyether water repellant and a methacryloyl group-containing fluoropolyether water repellant from the viewpoint of appropriately controlling the chemical bond or the interaction between the component (A) and the component (B) to allow to exhibit a good water repellency while keeping the transparency high.

The amount of the water repellant as the component (B) to be blended is typically 7 parts by mass or less, preferably 4 parts by mass or less, and more preferably 2 parts by mass or less based on 100 parts by mass of the component (A) from the viewpoint of preventing troubles such as the bleed-out of the component (B). At the same time, the amount of the water repellant as the component (B) to be blended is typically 0.01 parts by mass or more, preferably 0.05 parts by mass or more, and more preferably 0.1 parts by mass or more from the viewpoint of obtaining the effect of use thereof. The amount of the water repellant to be blended may be typically 0.01 parts by mass or more and 7 parts by mass or less, and preferably be 0.01 parts by mass or more and 4 parts by mass or less, or 0.01 parts by mass or more and 2 parts by mass or less, or preferably 0.05 parts by mass or more and 7 parts by mass or less, or 0.05 parts by mass or more and 4 parts by mass or less, or 0.05 parts by mass or more and 2 parts by mass or less, or preferably 0.1 parts by mass or more and 7 parts by mass or less, or 0.1 parts by mass or more and 4 parts by mass or less, or 0.1 parts by mass or more and 2 parts by mass or less.

(C) Silane Coupling Agent

The silane coupling agent as the component (C) serves to enhance the adhesiveness between the first hard coat and the second hard coat.

The silane coupling agents are silane compounds having at least two types of different reactive groups: a hydrolyzable group (e.g., an alkoxy group such as a methoxy group and an ethoxy group; an acyloxy group such as acetoxy group; and a halogen group such as a chloro group) and an organic functional group (e.g., an amino group, a mercapto group, a vinyl group, an epoxy group, a methacryloxy group, an acryloxy group and an isocyanate group). Among them, silane coupling agents having an amino group (i.e., silane coupling compounds having an amino group and a hydrolyzable group) and silane coupling agents having a mercapto group (i.e., silane coupling compound having a mercapto group and a hydrolyzable group) are preferred for the silane coupling agent as the component (C) from the viewpoint of adhesiveness. Silane coupling agents having an amino group are more preferred from the viewpoint of adhesiveness and odor.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

One of them or a mixture of two or more thereof can be used for the silane coupling agent as the component (C).

The amount of the silane coupling agent as the component (C) to be blended is typically 0.01 parts by mass or more, preferably 0.05 parts by mass or more, and more preferably 0.1 parts by mass or more based on 100 parts by mass of the component (A) from the viewpoint of obtaining the adhesiveness-enhancing effect reliably. At the same time, the amount of the silane coupling agent as the component (C) to be blended may be typically 10 parts by mass or less, preferably 5 parts by mass or less, and more preferably 1 part by mass or less, from the viewpoint of the pot life of a coating material. The amount of the silane coupling agent to be blended may be typically 0.01 parts by mass or more and 10 parts by mass or less, and preferably 0.01 parts by mass or more and 5 parts by mass or less, or 0.01 parts by mass or more and 1 part by mass or less, or preferably 0.05 parts by mass or more and 10 parts by mass or less, or 0.05 parts by mass or more and 5 parts by mass or less, or 0.05 parts by mass or more and 1 part by mass or less, or preferably 0.1 parts by mass or more and 10 parts by mass or less, or 0.1 parts by mass or more and 5 parts by mass or less, or 0.1 parts by mass or more and 1 part by mass or less.

It is preferable that the coating material for forming the first hard coat further contains a compound having two or more isocyanate groups (—N=C=O) in one molecule and/or a photopolymerization initiator from the viewpoint of improved curability with an active energy ray.

Examples of the compound having two or more isocyanate groups in one molecule include methylenebis-4-cyclohexylisocyanate; polyisocyanates such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate and a biuret form of hexamethylene diisocyanate; and urethane crosslinking agents such as blocked isocyanates of the polyisocyanates. One of them or a mixture of two or more thereof can be used for the compound having two or more isocyanate groups in one molecule. In crosslinking, a catalyst such as dibutyltin dilaurate and dibutyltin diethylhexoate may be added as necessary.

Examples of the photopolymerization initiator include benzophenone compounds such as benzophenone, methyl-o-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone and 2,4,6-trimethylbenzophenone; benzoin compounds such as benzoin, benzoin methyl ether, benzoin ethyl ether, benzoin isopropyl ether and benzyl methyl ketal; acetophenone compounds such as acetophenone, 2,2-dimethoxy-2-phenylacetophenone and 1-hydroxycyclohexyl phenyl ketone; anthraquinone compounds such as methylanthraquinone, 2-ethylanthraquinone and 2-amylanthraquinone; thioxanthone compounds such as thioxanthone, 2,4-diethylthioxanthone and 2,4-diisopropylthioxanthone; alkylphenone compounds such as acetophenone dimethyl ketal; triazine compounds; biimidazole compounds; acylphosphine oxide compounds; titanocene compounds; oxime ester compounds; oxime phenylacetate compounds; hydroxyketone compounds; and aminobenzoate compounds. One of them or a mixture of two or more thereof can be used for the photopolymerization initiator.

The coating material for forming the first hard coat can contain one or two or more of additives such as an antistatic agent, a surfactant, a leveling agent, a thixotropy-imparting agent, a stain-proofing agent, a printability improver, an antioxidant, a weatherability stabilizer, a light resistance stabilizer, a UV absorber, a heat stabilizer, organic fine particles and an organic colorant, as desired.

The coating material for forming the first hard coat may contain a solvent as desired for dilution to a concentration which allows easy application. The solvent is not particularly limited as long as the solvent neither reacts with any of the components (A) to (C) and other optional components nor catalyzes (promotes) the self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol and acetone. One of them or a mixture of two or more thereof can be used for the solvent.

The coating material for forming the first hard coat can be obtained by mixing and stirring these components.

The method for forming the first hard coat using the coating material for forming the first hard coat is not particularly limited, and any known web coating method can be used. Specifically, examples of the method include roll coating, gravure coating, reverse coating, roll brushing, spray coating, air knife coating and die coating.

The thickness of the first hard coat is preferably 0.5 µm or more, and more preferably 1 µm or more from the viewpoint of abrasion resistance and hardness. At the same time, the thickness of the first hard coat is preferably 5 µm or less, more preferably 4 µm or less, and still more preferably 3 µm or less from the viewpoint of hardness and the adhesiveness to the second hard coat.

In addition, the thickness of the first hard coat may be preferably 0.5 µm or more and 5 µm or less, or 0.5 µm or more and 4 µm or less, or 0.5 µm or more and 3 µm or less, or preferably 1 µm or more and 5 µm or less, or 1 µm or more and 4 µm or less, or 1 µm or more and 3 µm or less.

Second Hard Coat

The second hard coat is formed of a coating material containing (A) 100 parts by mass of a polyfunctional (meth)acrylate; and (D) 50 to 300 parts by mass of inorganic fine particles having an average particle size of 1 to 300 nm.

The (A) polyfunctional (meth)acrylate has been described above in the description of the coating material for forming the first hard coat. For the polyfunctional (meth)acrylate as the component (A), one of the above-described polyfunctional (meth)acrylates or a mixture of two or more thereof can be used.

(D) Inorganic Fine Particles Having an Average Particle Size of 1 to 300 nm

The inorganic fine particles as the component (D) serve to dramatically enhance the hardness of the hard coat laminated film according to the invention.

Examples of the inorganic fine particles include silica (silicon dioxide); metal oxide fine particles formed of aluminum oxide, zirconia, titania, zinc oxide, germanium oxide, indium oxide, tin oxide, indium tin oxide, antimony oxide, cerium oxide or the like; metal fluoride fine particle formed of magnesium fluoride, sodium fluoride or the like; metal sulfide fine particles; metal nitride fine particles; and metal fine particles.

Among them, fine particles formed of silica or aluminum oxide are preferred and fine particles formed of silica are more preferred in order to obtain a hard coat having a higher surface hardness. Examples of commercial silica fine particles include Snowtex (trade name) available from Nissan Chemical Industries, Ltd. and Quartron (trade name) available from Fuso Chemical Co., Ltd.

In order to enhance the dispersibility of inorganic fine particles in the coating material or enhance the surface hardness of a hard coat to be obtained, it is preferred to use inorganic fine particles the surface of which have been treated with any one selected from a silane coupling agent such as a vinylsilane and an aminosilane; a titanate coupling agent; an aluminate coupling agent; an organic compound having a reactive functional group such as an ethylenic unsaturated bond group such as a (meth)acryloyl group, a vinyl group and an allyl group and an epoxy group; a surface-treatment agent such as a fatty acid and a fatty acid metal salt; and the like.

The average particle size of the inorganic fine particles as the component (D) is 300 nm or less, preferably 200 nm or less, and more preferably 120 nm or less from the viewpoint of retaining the transparency of a hard coat and obtaining the hardness-improving effect reliably. Although the lower limit of the average particle size of the inorganic fine particles as the component (D) is not particularly limited, the average particle size of inorganic fine particles commonly available is about 1 nm at the finest.

The average particle size of inorganic fine particles herein refers to a particle size at which a cumulative value from the smallest particle size reaches to 50% by mass in a particle size distribution curve determined by using a laser diffraction/scattering particle size analyzer "MT 3200 II" (trade name) available from Nikkiso Co., Ltd.

The amount of the inorganic fine particles as the component (D) to be blended is 50 parts by mass or more, and preferably 80 parts by mass or more based on 100 parts by mass of the component (A) from the viewpoint of surface hardness. At the same time, the amount of the inorganic fine particles as the component (D) to be blended is 300 parts by mass or less, preferably 200 parts by mass or less, and more preferably 160 parts by mass or less from the viewpoint of transparency. The amount of the inorganic fine particles to be blended may be typically 50 parts by mass or more and 300 parts by mass or less, preferably 50 parts by mass or more and 200 parts by mass or less, or 50 parts by mass or more and 160 parts by mass or less, or preferably 80 parts by mass or more and 300 parts by mass or less, or 80 parts by mass or more and 200 parts by mass or less, or 80 parts by mass or more and 160 parts by mass or less.

(E) Leveling Agent

The coating material for forming the second hard coat preferably further contains (E) a leveling agent from the viewpoint of smoothing the surface of the second hard coat to facilitate to form the first hard coat.

Examples of the leveling agent include acrylic leveling agents, silicon leveling agents, fluorine-containing leveling agents, silicon-acrylic copolymer leveling agents, fluorine-modified acrylic leveling agents, fluorine-modified silicon leveling agents, and leveling agents into which a functional group (e.g., an alkoxy group such as a methoxy group and an ethoxy group, an acyloxy group, a halogen group, an amino group, a vinyl group, an epoxy group, a methacryloxy group, an acryloxy group and an isocyanate group) is introduced. Among them, silicon-acrylic copolymer leveling agents are preferred for the leveling agent as the component (E). One of them or a mixture of two or more thereof can be used for the leveling agent as the component (E).

The amount of the leveling agent as the component (E) to be blended is typically 0.01 parts by mass or more, preferably 0.1 parts by mass or more, and more preferably 0.2 parts by mass or more based on 100 parts by mass of the component (A) from the viewpoint of smoothing the surface of the second hard coat to facilitate to form the first hard coat. At the same time, the amount of the leveling agent to be blended may be 1 part by mass or less, preferably 0.6 parts by mass or less, and more preferably 0.4 parts by mass or less from the viewpoint of satisfactorily applying the coating material for forming the first hard coat on the second hard coat without being repelled. The amount of the leveling agent to be blended may be typically 0.01 parts by mass or more and 1 part by mass or less, preferably 0.01 parts by mass or more and 0.6 parts by mass or less, or 0.01 parts by mass or more and 0.4 parts by mass or less, or preferably 0.1 parts by mass or more and 1 part by mass or less, or 0.1 parts by mass or more and 0.6 parts by mass or less, or 0.1 parts by mass or more and 0.4 parts by mass or less, or preferably 0.2 parts by mass or more and 1 part by mass or less, or 0.2 parts by mass or more and 0.6 parts by mass or less, or 0.2 parts by mass or more and 0.4 parts by mass or less.

It is preferable that the coating material for forming the second hard coat further contains a compound having two or more isocyanate groups (—N═C═O) in one molecule and/or a photopolymerization initiator from the viewpoint of improved curability with an active energy ray.

The compound having two or more isocyanate groups in one molecule has been described above in the description of the coating material for forming the first hard coat. For the compound having two or more isocyanate groups in one molecule, one of the above-described compounds having two or more isocyanate groups in one molecule or a mixture of two or more thereof can be used.

The photopolymerization initiator has been described above in the description of the coating material for forming the first hard coat. For the photopolymerization initiator, one of the above-described photopolymerization initiators or a mixture of two or more thereof can be used.

The coating material for forming the second hard coat can contain one or two or more of additives such as an antistatic agent, a surfactant, a thixotropy-imparting agent, a stain-proofing agent, a printability improver, an antioxidant, a weatherability stabilizer, a light resistance stabilizer, a UV absorber, a heat stabilizer, a colorant and organic fine particles, as desired.

The coating material for forming the second hard coat may contain a solvent as desired for dilution to a concentration which allows easy application. The solvent is not particularly limited as long as the solvent neither reacts with any of the components (A) and (D) and other optional components nor catalyzes (promotes) the self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol and acetone. Among them, 1-methoxy-2-propanol is preferred. One of them or a mixture of two or more thereof can be used for the solvent.

The coating material for forming the second hard coat can be obtained by mixing and stirring these components.

The method for forming the second hard coat using the coating material for forming the second hard coat is not particularly limited, and any known web coating method can be used. Specifically, examples of the method include roll coating, gravure coating, reverse coating, roll brushing, spray coating, air knife coating and die coating.

The thickness of the second hard coat is preferably 10 μm or more, more preferably 15 μm or more, and still more preferably 18 μm or more from the viewpoint of hardness. At the same time, the thickness of the second hard coat is preferably 30 μm or less, more preferably 27 μm or less, and still more preferably 25 μm or less from the viewpoint of curling resistance and bending resistance.

In addition, the thickness of the second hard coat may be preferably 10 μm or more and 30 μm or less, or 10 μm or more and 27 μm or less, or 10 μm or more and 25 μm or less, or preferably 15 μm or more and 30 μm or less, or 15 μm or more and 27 μm or less, or 15 μm or more and 25 μm or less, or preferably be 18 μm or more and 30 μm or less, or 18 μm or more and 27 μm or less, or 18 μm or more and 25 μm or less.

Transparent Resin Film

The same film as described above for the first aspect of the invention can be used for the transparent resin film.

This transparent resin film is a layer functioning as a transparent film base material for forming the first hard coat and the second hard coat thereabove. Any transparent resin film can be used for the transparent resin film without limitation as long as it has a high transparency and no coloring. Examples thereof include films formed of a cellulose ester resin such as triacetylcellulose; a polyester resin such as polyethylene terephthalate; a cyclic hydrocarbon resin such as an ethylene-norbornene copolymer; an acrylic resin such as polymethyl methacrylate and polyethyl methacrylate; a poly(meth)acrylimide resin; an aromatic polycarbonate resin; a polyolefin resin such as polypropylene and 4-methyl-penten-1; a polyamide resin; a polyarylate resin; a polymer-type urethane acrylate resin; and a polyimide resin. These films encompass cast films, uniaxially oriented films and biaxially oriented films. Further, these films encompass laminated films with one of these films or two or more thereof laminated in two or more layers.

The thickness of the transparent resin film, which is not particularly limited, can be any thickness as desired. The thickness of the transparent resin film may be typically 20 μm or more and preferably 50 μm or more from the viewpoint of the handleability of the hard coat laminated film according to the invention. In the case where the hard coat laminated film according to the invention is used for a display faceplate in a touch panel, the thickness of the transparent resin film may be typically 100 μm or more, preferably 200 μm or more, and more preferably 300 μm or more from the viewpoint of retaining the stiffness. Further, the thickness of the transparent resin film may be typically 1500 μm or less, preferably 1200 μm or less, and more preferably 1000 μm or less from the viewpoint of meeting the requirement for a thinner touch panel. In applications in which a high stiffness is not required other than a display faceplate in a touch panel, the thickness of the transparent resin film may be typically 250 μm or less, and preferably 150 μm or less from the viewpoint of economic efficiency.

The transparent resin film is preferably a poly(meth) acrylimide resin film. This allows the hard coat laminated film to be excellent in surface hardness, abrasion resistance transparency, surface smoothness, appearance, stiffness, heat resistance and dimensional stability, and as a result the hard coat laminated film can be suitably used for a display faceplate in a touch panel or a transparent electroconductive substrate.

The poly(meth)acrylimide resin is a thermoplastic resin in which, while a high transparency, a high surface hardness and a high stiffness derived from an acrylic resin are retained, a characteristic of being excellent in heat resistance and dimensional stability derived from a polyimide resin is introduced to overcome a drawback of coloring to pale yellow-to-reddish brown color. The poly(meth)acrylimide resin is disclosed in JP 2011-519999 A, for example. The term poly(meth)acrylimide herein means polyacrylimide or polymethacrylimide.

Any poly(meth)acrylimide resin can be used for the poly(meth)acrylimide resin without limitation as long as it has a high transparency and no coloring in order to use the hard coat laminated film for optical articles such as a touch panel.

Preferred examples of the poly(meth)acrylimide resin include ones having a yellowness index of 3 or less (measured with a colorimeter "SolidSpec-3700" (trade name) available from Shimadzu Corporation in accordance with JIS K7105:1981). The yellowness index is more preferably 2 or less and still more preferably 1 or less. Further, preferred examples of the poly(meth)acrylimide resin include poly(meth)acrylimide resins having a melt mass-flow rate of 0.1 to 20 g/10 min (measured under conditions of 260° C. and 98.07 N in accordance with ISO 1133) from the viewpoint of extrusion load and the stability of a melted film. The melt mass-flow rate is more preferably 0.5 to 10 g/10 min. Further, the glass transition temperature of the poly(meth)acrylimide resin is preferably 150° C. or higher from the viewpoint of heat resistance. The glass transition temperature is more preferably 170° C. or higher.

The poly(meth)acrylimide resin can further contain, within a range that is not contrary to the object of the invention, a thermoplastic resin other than the poly(meth) acrylimide resin; a pigment, an inorganic filler, an organic filler, a resin filler; an additive such as, a lubricant, an antioxidant, a weatherability stabilizer, a heat stabilizer, a releasing agent, an antistatic agent and a surfactant; or the like, as desired. The amount of the optional component(s) to be blended is typically about 0.01 to 10 parts by mass based on 100 parts by mass of the poly(meth)acrylimide resin.

Examples of commercial products of the poly(meth) acrylimide resin can include "PLEXIMID TT50" (trade name) and "PLEXIMID TT70" (trade name) available from Evonik Industry AG.

The poly(meth)acrylimide resin film is preferably a transparent multilayer film with a first poly(meth)acrylimide resin layer ($\alpha 1$); an aromatic polycarbonate resin layer ($\beta$); and a second poly(meth)acrylimide resin layer ($\alpha 2$) directly laminated in this order. The invention is herein described under the assumption that a touch surface is formed on the $\alpha 1$ layer side.

The poly(meth)acrylimide resin is excellent in heat resistance and surface hardness but often insufficient in cutting processability. On the other hand, the aromatic polycarbonate resin is excellent in cutting processability but often insufficient in heat resistance and surface hardness. Therefore, using a transparent multilayer film having the above-described layer configuration enables to easily obtain a hard coat laminated film in which both substances cover for each other's drawbacks and which is excellent in all of heat resistance, surface hardness and cutting processability.

The layer thickness of the $\alpha 1$ layer, although not particularly limited, may be typically 20 μm or more, preferably 40 μm or more, more preferably 60 μm or more and still more preferably 80 μm or more from the viewpoint of the heat resistance and the surface hardness of the hard coat laminated film according to the invention.

The layer thickness of the α2 layer, although not particularly limited, is preferably the same layer thickness as the α1 layer from the viewpoint of the curling resistance of the hard coat laminated film according to the invention.

Here, "the same layer thickness" should not be interpreted as the same layer thickness in the physicochemically strict sense; but should be interpreted as the same layer thickness within a variation in a process/quality control commonly performed in industry. The reason is that the curling resistance of a multilayer film can be kept good if the layer thickness is the same layer thickness within a variation in a process/quality control commonly performed in industry. A cast multilayer film obtained by a T-die coextrusion method is typically subjected to a process/quality control within a variation of about −5 to +5 μm, and therefore the layer thickness of 65 μm and the layer thickness of 75 μm should be interpreted to be identical. "The same layer thickness" here can be paraphrased as "substantially the same layer thickness".

The layer thickness of the 13 layer, although not particularly limited, may be typically 20 μm or more and preferably 80 μm or more from the viewpoint of the cutting processability of the hard coat laminated film according to the invention.

The poly(meth)acrylimide resin to be used for the α1 layer and the α2 layer has been described above.

For the poly(meth)acrylimide resin to be used for the α1 layer and the poly(meth)acrylimide resin to be used for the α2 layer, poly(meth)acrylimide resins different in resin properties, for example, poly(meth)acrylimide resins different in melt mass-flow rate or glass transition temperature may be used. It is preferred to use poly(meth)acrylimide resins having the same resin properties from the viewpoint of the curling resistance of the hard coat laminated film according to the invention. Using poly(meth)acrylimide resins in the same grade and in the same lot is one of the preferred embodiments, for example.

Examples of the aromatic polycarbonate resin to be used for the 13 layer include aromatic polycarbonate resins such as polymers obtained by interfacial polymerization of an aromatic dihydroxy compound such as bisphenol A, dimethyl bisphenol A and 1,1-bis(4-hydroxyphenyl)-3,3,5-trimethylcyclohexane with phosgene; and polymers obtained by transesterification reaction of an aromatic dihydroxy compound such as bisphenol A, dimethyl bisphenol A and 1,1-bis(4-hydroxyphenyl)-3,3,5-trimethylcyclohexane with a carbonate diester such as diphenyl carbonate. One of them or a mixture of two or more thereof can be used for the aromatic polycarbonate resin to be used for the 13 layer.

Preferred examples of optional components which can be contained in the aromatic polycarbonate resin include core-shell rubbers. Using 0 to 30 parts by mass of a core-shell rubber (100 to 70 parts by mass of the aromatic polycarbonate resin), preferably 0 to 10 parts by mass of a core-shell rubber (100 to 90 parts by mass of the aromatic polycarbonate resin) based on 100 parts by mass of the total amount of the aromatic polycarbonate resin and the core-shell rubber can further enhance the cutting processability and the impact resistance of a hard coat laminated film.

Examples of the core-shell rubber include core-shell rubbers formed of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer and a methacrylate-acrylonitrile/acrylate rubber graft copolymer. One of them or a mixture of two or more thereof can be used for the core-shell rubber.

The aromatic polycarbonate resin can further contain, within a range that is not contrary to the object of the invention, a thermoplastic resin other than the aromatic polycarbonate resin or the core-shell rubber; a pigment, an inorganic filler, an organic filler, a resin filler; an additive such as a lubricant, an antioxidant, a weatherability stabilizer, a heat stabilizer, a releasing agent, an antistatic agent and a surfactant; or the like, as desired. The amount of the optional component(s) to be blended is typically about 0.01 to 10 parts by mass based on 100 parts by mass of the total amount of the aromatic polycarbonate resin and the core-shell rubber.

The method for producing the poly(meth)acrylimide resin film (including the case where the film is the above-described transparent multilayer film) is not particularly limited. Preferred examples of the production method include the methods described in JP 2015-033844 A and JP 2015-034285 A.

In forming the second hard coat, an adhesion-facilitating treatment such as a corona discharge treatment and an anchor coat formation may be performed beforehand on the surface for forming the hard coat or both surfaces of the monolayer film formed of the poly(meth)acrylimide resin or the transparent multilayer film in order to enhance the adhesion strength to the second hard coat.

The hard coat laminated film according to the invention preferably includes the first hard coat, the second hard coat, the transparent resin film layer and a third hard coat in order from the surface side. The third hard coat formed will allow a force to curl the hard coat laminated film in one direction (hereinafter, occasionally abbreviated as a curling force) and a force to curl the hard coat laminated film in another direction to work simultaneously. Then, the occurrence of curling can be suppressed by allowing these two curling forces to be canceled to be zero.

FIG. 2 illustrates a hard coat laminated film comprising the third hard coat. In FIG. 2, the reference signs denote as follows: 5: a first hard coat, 6: a second hard coat, 7: a first poly(meth)acrylimide resin layer (α1), 8: an aromatic polycarbonate resin layer (β), 9: a second poly(meth)acrylimide resin layer (α2), 10: a third hard coat.

The components and the thickness of the third hard coat are not particularly limited as long as the two curling forces can be canceled. For the components and the thickness of the third hard coat, those described above for the second hard coat may be employed.

In recent years, a touch panel has been proposed which has a bilayer structure in which a touch sensor is directly provided on the back side of a display faceplate for the purpose of weight reduction of an image display device (so-called one-glass-solution). In addition, one-plastic-solution to substitute for the so-called one-glass-solution has also been proposed for the purpose of further weight reduction. In the case where the hard coat laminated film according to the invention is used for the one-plastic-solution to substitute for the so-called one-glass-solution, the third hard coat formed allows the hard coat laminated film to easily have properties suitable for a printed surface.

The hard coat laminated film according to the invention may have an optional layer(s) other than the first hard coat, the second hard coat, the transparent resin film layer and the third hard coat, as desired. Examples of the optional layer include a hard coat other than the first to third hard coats, an anchor coat, a pressure-sensitive adhesive layer, a transparent electroconductive layer, a high refractive index layer, a low refractive index layer and a reflection-preventive layer.

Regarding the poly(meth)acrylimide resin film, which is preferably a transparent multilayer film with a first poly (meth)acrylimide resin layer (α1); an aromatic polycarbonate resin layer (β); and a second poly(meth)acrylimide resin layer (α2) directly laminated in this order as described above, it is not intended that poly(meth)acrylimide resin films comprising an optional layer(s) (e.g., a pressure-sensitive adhesive layer, an anchor coat, a transparent electroconductive layer, a high refractive index layer, a low refractive index layer, a reflection-preventive layer, and the like) in addition to these layers be excluded from the scope of the invention.

It is desirable that the hard coat laminated film according to the second aspect of the invention satisfies any one or more of the preferred ranges as described above for total light transmittance, haze, pencil hardness, minimum bending radius, water contact angle and yellowness index regarding the hard coat laminated film according to the first aspect. Details for the methods for measuring these physical properties and technical meanings thereof are as described above.

Specifically, the hard coat laminated film according to the second aspect has a total light transmittance of preferably 85%, more preferably 88% or more and still more preferably 90% or more, and/or a haze of 2.0% or less, more preferably 1.5% or less, still more preferably 1.0% or less and most preferably 0.5% or less, and/or a pencil hardness of preferably 5H or higher, more preferably 6H or higher and still more preferably 7H or higher, and/or a minimum bending radius of preferably 40 mm or less, more preferably 35 mm or less and still more preferably 30 mm or less, and/or a water contact angle of the surface of the first hard coat of preferably 100° or more and more preferably 105° or more, and/or preferably a water contact angle of the surface of the first hard coat after 20000 reciprocating wipes with a cotton of 100° or more and more preferably a water contact angle after 25000 reciprocating wipes with a cotton of 100° or more.

The hard coat laminated film according to the second aspect of the invention can be produced by using the method as described above with regard to the hard coat laminated film according to the first aspect.

Specifically, the hard coat laminated film according to the second aspect can be produced by using a method comprising the following steps, for example. Details for these steps are as described above.

The method includes:

(1) coating a transparent resin film with a coating material for forming the second hard coat to form a first wet coat;

(2) irradiating the first wet coat formed of the coating material for forming the second hard coat with an active energy ray so that the integrated amount of light is 1 to 230 mJ/cm$^2$, preferably 5 to 200 mJ/cm$^2$, more preferably 10 to 160 mJ/cm$^2$, still more preferably 20 to 120 mJ/cm$^2$ and most preferably 30 to 100 mJ/cm$^2$ to convert the first wet coat formed of the coating material for forming the second hard coat into a coating film in a set-to-touch state;

(3) coating the coating film in a set-to-touch state formed of the coating material for forming the second hard coat with a coating material for forming the first hard coat to form a second wet coat; and (4) preheating the second wet coat formed of the coating material for forming the first hard coat to a temperature of 30 to 100° C., preferably to a temperature of 40 to 85° C., more preferably to a temperature of 50 to 75° C. followed by irradiating with an active energy ray so that the integrated amount of light is 240 to 10000 mJ/cm$^2$, preferably 320 to 5000 mJ/cm$^2$ and more preferably 360 to 2000 mJ/cm$^2$ to obtain a hard coat laminated film comprising the second hard coat formed of the coating material for forming the second hard coat and the first hard coat formed of the coating material for forming the first hard coat.

3. Method for Producing Hard Coat Laminated Film According to Third Aspect of the Invention The steps will now be described sequentially.

Step (1) The production method according to the invention is a method for producing a hard coat laminated film comprising a step of (1) coating a transparent resin film with a coating material α containing an active energy ray-curable resin to form a first wet coat.

Any coating material can be used for the coating material α without particular limitation as long as it contains an active energy ray-curable resin. Preferred examples of the coating material α will be described later.

In the step (1), the method for forming the first wet coat from the coating material α is not particularly limited, and any known web coating method can be used. Specifically, examples of the method include roll coating, gravure coating, reverse coating, roll brushing, spray coating, air knife coating and die coating.

Step (2) The production method according to the invention includes a step of (2) irradiating the first wet coat formed of the coating material α with an active energy ray so that the integrated amount of light is 1 to 230 mJ/cm$^2$, preferably 5 to 200 mJ/cm$^2$, more preferably 10 to 160 mJ/cm$^2$, still more preferably 20 to 120 mJ/cm$^2$ and most preferably 30 to 100 mJ/cm$^2$ to convert the first wet coat formed of the coating material α into a coating film in a set-to-touch state.

The first wet coat formed of the coating material α, which has been provided in the step (1), becomes in a set-to-touch state or in a state with no tackiness in the step (2) so that problems in handling such as sticking do not occur even in direct contact with a web apparatus. This enables to form a wet coat on the coating film in a set-to-touch state formed of the coating material α by using the coating material β in the next step (3).

The clause "a coating film is in a set-to-touch state (in a state with no tackiness)" herein means that a coating film is in a state in which, even when the coating film directly comes into contact with a web apparatus, no problem in handling occurs.

The irradiation with an active energy ray in the step (2) is performed so that the integrated amount of light, although depending on the properties of the coating material α, is typically 1 J/cm$^2$ or more, preferably 5 mJ/cm$^2$ or more, more preferably 10 mJ/cm$^2$ or more, still more preferably 20 mJ/cm$^2$ or more, and most preferably 30 mJ/cm$^2$ or more from the viewpoint of converting the coating film into a set-to-touch state reliably. At the same time, the irradiation is performed so that the integrated amount of light is typically 230 mJ/cm$^2$ or less, preferably 200 mJ/cm$^2$ or less, more preferably 160 mJ/cm$^2$ or less, still more preferably 120 mJ/cm$^2$ or less, and most preferably 100 mJ/cm$^2$ or less from the viewpoint of obtaining a good interlayer adhesion strength even in the case where the coating material α and the coating material β are largely different in properties. The integrated amount of light in this step may be typically 1 J/cm$^2$ or more and 230 mJ/cm$^2$ or less, preferably 1 J/cm$^2$ or more and 200 mJ/cm$^2$ or less, or 1 J/cm$^2$ or more and 160 mJ/cm$^2$ or less, or 1 J/cm$^2$ or more and 120 mJ/cm$^2$ or less, or 1 J/cm$^2$ or more and 100 mJ/cm$^2$ or less, or preferably 5 mJ/cm$^2$ or more and 230 mJ/cm$^2$ or less, or 5 mJ/cm$^2$ or more and 200 mJ/cm$^2$ or less, or 5 mJ/cm$^2$ or more and 160 mJ/cm$^2$ or less, or 5 mJ/cm$^2$ or more and 120 mJ/cm$^2$ or less, or 5 mJ/cm$^2$ or more and 100 mJ/cm$^2$ or less, or preferably 10 mJ/cm$^2$ or more and 230 mJ/cm$^2$ or less, or 10 mJ/cm$^2$ or more and 200 mJ/cm$^2$ or less, or 10 mJ/cm$^2$ or more and 160 mJ/cm$^2$ or less, or 10 mJ/cm$^2$ or more and 120 mJ/cm$^2$ or less, or 10 mJ/cm$^2$ or more and 100 mJ/cm$^2$ or less, or preferably 20 mJ/cm$^2$ or more and 230 mJ/cm$^2$ or less, or 20 mJ/cm$^2$ or more and 200 mJ/cm$^2$ or less, or 20 mJ/cm$^2$ or more and 160 mJ/cm$^2$ or less, or 20 mJ/cm$^2$ or more and 120 mJ/cm$^2$ or less, or 20 mJ/cm$^2$ or more and 100 mJ/cm$^2$ or less, or preferably 30 mJ/cm$^2$ or more and 230 mJ/cm$^2$ or less, or 30 mJ/cm$^2$ or more and 200 mJ/cm$^2$ or less, or 30 mJ/cm$^2$ or more and 160 mJ/cm$^2$ or less, or 30 mJ/cm$^2$ or more and 120 mJ/cm$^2$ or less, or 30 mJ/cm$^2$ or more and 100 mJ/cm$^2$ or less.

The first wet coat formed of the coating material α is preferably predried before irradiating with an active energy ray in the step (2). The predrying can be performed by passing a web in a drying furnace with the temperature set to about 23 to 150° C., preferably with the temperature set to 50 to 120° C. at a line speed such that the time required to pass through from the inlet to the outlet is about 0.5 to 10 minutes, and preferably 1 to 5 minutes, for example.

The first wet coat formed of the coating material α may be preheated to a temperature of 40 to 120° C., preferably to a temperature of 70 to 100° C. in advance of irradiating an active energy ray in the step (2). This enables to convert the coating film into a set-to-touch state reliably. The method for preheating is not particularly limited, and any method can be performed. Specific examples of the method for preheating will be described later in the description of the step (4).

Step (3) The production method according to the invention includes a step of (3) coating the coating film in a set-to-touch state formed of the coating material α with a coating material β containing an active energy ray-curable resin to form a second wet coat.

Any coating material can be used for the coating material β without particular limitation as long as it contains an active energy ray-curable resin. Preferred examples of the coating material β will be described later.

In the step (3), the method for forming the second wet coat from the coating material β is not particularly limited, and any known web coating method can be used. Specifically, examples of the method include roll coating, gravure coating, reverse coating, roll brushing, spray coating, air knife coating and die coating.

Step (4) The production method according to the invention includes a step of (4) preheating the second wet coat formed of the coating material β to a temperature of 30 to 100° C., preferably to a temperature of 40 to 85° C., more preferably to a temperature of 50 to 75° C., followed by irradiating with an active energy ray so that the integrated amount of light is 240 to 10000 mJ/cm$^2$, preferably 320 to 5000 mJ/cm$^2$, more preferably 360 to 2000 mJ/cm$^2$ to obtain a hard coat laminated film comprising a hard coat formed of the coating material α and a hard coat formed of the coating material β.

The second wet coat formed of the coating material β, which has been provided in the step (3), is completely cured in the step (4). Simultaneously, the coating film formed of the coating material α is also completely cured.

The above-described method enables to obtain a good interlayer adhesion strength even in the case where the coating material α and the coating material β are largely different in properties, and without wishing to be bound by any theory it is presumed that the reason is that complete curing is achieved simultaneously for both hard coats by limiting the integrated amount of light in irradiating an active energy ray to an amount adequate to convert the coating film into a coating film in a set-to-touch state but inadequate to completely cure the coating film in the step (2) and irradiating at an integrated amount of light adequate to completely cure the coating film in the step (4) for the first time.

The irradiation with an active energy ray in the step (4) is performed so that the integrated amount of light is 240 mJ/cm$^2$ or more, preferably 320 mJ/cm$^2$ or more, and more preferably 360 mJ/cm$^2$ or more from the viewpoint of completely curing the coating film and obtaining a good interlayer adhesion strength even in the case where the coating material α and the coating material β are largely different in properties. At the same time, the irradiation with an active energy ray is performed so that the integrated amount of light is 10000 mJ/cm$^2$ or less, preferably 5000 mJ/cm$^2$ or less, and more preferably 2000 mJ/cm$^2$ or less from the viewpoint of preventing the yellowing of a hard coat laminated film to be obtained and costs. The integrated amount of light in this step may be typically 240 J/cm$^2$ or more and 10000 mJ/cm$^2$ or less, preferably 240 J/cm$^2$ or more and 5000 mJ/cm$^2$ or less, or 240 J/cm$^2$ or more and 2000 mJ/cm$^2$ or less, or preferably 320 mJ/cm$^2$ or more and 10000 mJ/cm$^2$ or less, or 320 mJ/cm$^2$ or more and 5000 mJ/cm$^2$ or less, or 320 J/cm$^2$ or more and 2000 mJ/cm$^2$ or less, or preferably 360 mJ/cm$^2$ or more and 10000 mJ/cm$^2$ or less, or 360 mJ/cm$^2$ or more and 5000 mJ/cm$^2$ or less, or 360 J/cm$^2$ or more and 2000 mJ/cm$^2$ or less.

The second wet coat formed of the coating material β is preferably predried before irradiating with an active energy ray in the step (4). The predrying can be performed by passing a web in a drying furnace with the temperature set to about 23 to 150° C., preferably with the temperature set to 50 to 120° C. at a line speed such that the time required to pass through from the inlet to the outlet is about 0.5 to 10 minutes, and preferably 1 to 5 minutes, for example.

The wet coat formed of the coating material β is preheated to a temperature of 30 to 100° C., preferably to a temperature of 40 to 85° C. and more preferably to a temperature of 50 to 75° C. in advance of irradiating an active energy ray in the step (4) from the viewpoint of obtaining a good interlayer adhesion strength even in the case where the coating material α and the coating material β are largely different in properties. The temperature range may be preferably 30 to 85° C. or 30 to 75° C., or preferably 40 to 100° C. or 40 to 85° C. or 40 to 75° C., or preferably 50 to 100° C. or 50 to 85° C. or 50 to 75° C. The method for preheating is not particularly limited, and any method can be used. Examples thereof include a method in which a web is wrapped around a mirror-finished metal roll 2 disposed opposite to an active energy ray (UV ray) irradiator 1 as illustrated in FIG. 1 and the surface temperature of the roll is controlled to a predetermined temperature; a method in which the temperature in an irradiation furnace, which is formed by surrounding an active energy ray irradiator, is controlled to a predetermined temperature; and a combination of these options.

An aging treatment may be performed after the step (4). This enables to stabilize the properties of the hard coat laminated film.

Coating Material α

The coating material α, which contains an active energy ray-curable resin, can form a hard coat through polymerization/curing with an active energy ray such as a UV ray and an electron beam.

Examples of the active energy ray-curable resin include one or more selected from (meth)acryloyl group-containing prepolymers or oligomers such as polyurethane (meth)acrylate, polyester (meth)acrylate, polyacryl (meth)acrylate, epoxy (meth)acrylate, polyalkylene glycol poly(meth)acrylate and polyether (meth)acrylate; (meth)acryloyl group-containing monofunctional reactive monomers such as methyl (meth)acrylate, ethyl (meth)acrylate, n-butyl(meth)acrylate, hexyl (meth)acrylate, 2-ethylhexyl (meth)acrylate, lauryl (meth)acrylate, isobornyl (meth)acrylate, dicyclopentenyl (meth)acrylate, dicyclopentenyloxyethyl (meth)acrylate, phenyl (meth)acrylate, phenyl cellosolve (meth)acrylate, 2-methoxyethyl (meth)acrylate, hydroxyethyl (meth)acrylate, hydroxypropyl (meth)acrylate, 2-acryloyloxyethyl hydrogen phthalate, dimethylaminoethyl (meth)acrylate, trifluoroethyl (meth)acrylate and trimethylsiloxyethyl methacrylate; monofunctional reactive monomers such as N-vinylpyrrolidone and styrene; (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl)propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra(meth)acrylate; (meth)acryloyl group-containing hexafunctional reactive monomers such as dipentaerythritol hexaacrylate; and the like, and resins containing one or more of the above substances as constituent monomers. One of them or a mixture of two or more thereof can be used for the active energy ray-curable resin. The term (meth)acrylate herein means acrylate or methacrylate.

In the case where the hard coat laminated film obtained by using the production method according to the invention is used for a member in an image display device, particularly a display faceplate in an image display device with a touch panel function, the coating material α is preferably a coating material containing (A) 100 parts by mass of a polyfunctional (meth)acrylate; and (D) 50 to 300 parts by mass of inorganic fine particles having an average particle size of 1 to 300 nm from the viewpoint of transparency, color tone, abrasion resistance, surface hardness, bending resistance and surface appearance.

(A) Polyfunctional (Meth)Acrylate

The polyfunctional (meth)acrylate as the component (A) is a (meth)acrylate having two or more (meth)acryloyl groups in one molecule. Since this component has two or more (meth)acryloyl groups in one molecule, it serves to form a hard coat through polymerization/curing with an active energy ray such as a UV ray and an electron beam.

Examples of the polyfunctional (meth)acrylate include (meth)acryloyl group-containing bifunctional reactive monomers such as diethylene glycol di(meth)acrylate, neopentyl glycol di(meth)acrylate, 1,6-hexanediol di(meth)acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl)propane; (meth)acryloyl group-containing trifunctional reactive monomers such as trimethylolpropane tri(meth)acrylate, trimethylolethane tri(meth)acrylate and pentaerythritol tri(meth)acrylate; (meth)acryloyl group-containing tetrafunctional reactive monomers such as pentaerythritol tetra(meth)acrylate; and (meth)acryloyl group-containing hexafunctional reactive monomers such as dipentaerythritol hexaacrylate; and polymers (oligomers and prepolymers) containing one or more of them as constituent monomers. One of them or a mixture of two or more thereof can be used for the component (A).

(D) Inorganic Fine Particles Having an Average Particle Size of 1 to 300 nm

The inorganic fine particles as the component (D) serve to dramatically enhance the hardness of a hard coat laminated film to be obtained by using the production method according to the invention.

Examples of the inorganic fine particles include silica (silicon dioxide); metal oxide fine particles formed of aluminum oxide, zirconia, titania, zinc oxide, germanium oxide, indium oxide, tin oxide, indium tin oxide, antimony oxide, cerium oxide or the like; metal fluoride fine particle formed of magnesium fluoride, sodium fluoride or the like; metal sulfide fine particles; metal nitride fine particles; and metal fine particles.

Among them, fine particles formed of silica or aluminum oxide are preferred and fine particles formed of silica are more preferred in order to obtain a hard coat having a higher surface hardness. Examples of commercial silica fine particles include Snowtex (trade name) available from Nissan Chemical Industries, Ltd. and Quartron (trade name) available from Fuso Chemical Co., Ltd.

In order to enhance the dispersibility of inorganic fine particles in the coating material or enhance the surface hardness of a hard coat to be obtained, it is preferred to use inorganic fine particles the surface of which have been treated with any one selected from a silane coupling agent such as a vinylsilane and an aminosilane; a titanate coupling agent; an aluminate coupling agent; an organic compound having a reactive functional group such as an ethylenic unsaturated bond group such as a (meth)acryloyl group, a vinyl group and an allyl group and an epoxy group; a surface-treatment agent such as a fatty acid and a fatty acid metal salt; and the like.

The average particle size of the inorganic fine particles as the component (D) is preferably 300 nm or less, more preferably 200 nm or less and still more preferably 120 nm or less from the viewpoint of retaining the transparency of a hard coat and obtaining the hardness-improving effect reliably. Although the lower limit of the average particle size of the inorganic fine particles as the component (D) is not particularly limited, the average particle size of inorganic fine particles commonly available is about 1 nm at the finest.

The average particle size of inorganic fine particles herein refers to a particle size at which a cumulative value from the smallest particle size reaches to 50% by mass in a particle size distribution curve determined by using a laser diffraction/scattering particle size analyzer "MT 3200 II" (trade name) available from Nikkiso Co., Ltd.

The amount of the inorganic fine particles as the component (D) to be blended is preferably 50 parts by mass or more, and more preferably 80 parts by mass or more based on 100 parts by mass of the component (A) from the viewpoint of surface hardness. At the same time, the amount of the inorganic fine particles to be blended is preferably 300 parts by mass or less, more preferably 200 parts by mass or less, and still more preferably 160 parts by mass or less from the viewpoint of transparency. In addition, the amount of the inorganic fine particles to be blended may be typically 50 parts by mass or more and 300 parts by mass or less, preferably 50 parts by mass or more and 200 parts by mass or less, or 50 parts by mass or more and 160 parts by mass or less, or preferably 80 parts by mass or more and 300 parts by mass or less, or 80 parts by mass or more and 200 parts by mass or less, or 80 parts by mass or more and 160 parts by mass or less.

(E) Leveling Agent

It is preferable that the coating material α further contains (E) a leveling agent from the viewpoint of smoothing the surface of a coating film in a set-to-touch state formed of the coating material α to facilitate to form a hard coat using the coating material β.

Examples of the leveling agent include acrylic leveling agents, silicon leveling agents, fluorine-containing leveling agents, silicon-acrylic copolymer leveling agents, fluorine-modified crylic leveling agents, fluorine-modified silicon leveling agents, and leveling agents into which a functional group (e.g., an alkoxy group such as a methoxy group and an ethoxy group, an acyloxy group, a halogen group, an amino group, a vinyl group, an epoxy group, a methacryloxy group, an acryloxy group and an isocyanate group) is introduced. Among them, silicon-acrylic copolymer leveling agents are preferred for the leveling agent as the component (E). One of them or a mixture of two or more thereof can be used for the leveling agent as the component (E).

The amount of the leveling agent as the component (E) to be blended is typically 0.01 parts by mass or more, preferably 0.1 parts by mass or more, and more preferably 0.2 parts by mass or more based on 100 parts by mass of the component (A) from the viewpoint of smoothing the surface of a coating film formed of the coating material α to facilitate to form a coating film using the coating material β. At the same time, the amount of the leveling agent to be blended may be typically 1 part by mass or less, preferably 0.6 parts by mass or less, and more preferably 0.4 parts by mass or less from the viewpoint of satisfactorily applying the coating material β on a coating film formed of the coating material α without being repelled. The amount of the leveling agent to be blended may be typically 0.01 parts by mass or more and 1 part by mass or less, preferably 0.01 parts by mass or more and 0.6 parts by mass or less, or 0.01 parts by mass or more and 0.4 parts by mass or less, or preferably 0.1 parts by mass or more and 1 part by mass or less, or 0.1 parts by mass or more and 0.6 parts by mass or less, or 0.1 parts by mass or more and 0.4 parts by mass or less, or preferably 0.2 parts by mass or more and 1 part by mass or less, or 0.2 parts by mass or more and 0.6 parts by mass or less, or 0.2 parts by mass or more and 0.4 parts by mass or less.

It is preferable that the coating material α further contains a compound having two or more isocyanate groups (—N=C=O) in one molecule and/or a photopolymerization initiator from the viewpoint of improved curability with an active energy ray.

Examples of the compound having two or more isocyanate groups in one molecule include methylenebis-4-cyclohexylisocyanate; polyisocyanates such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate and a biuret form of hexamethylene diisocyanate; and urethane crosslinking agents such as blocked isocyanates of the polyisocyanates. One of them or a mixture of two or more thereof can be used for the compound having two or more isocyanate groups in one molecule. In crosslinking, a catalyst such as dibutyltin dilaurate and dibutyltin diethylhexoate may be added as necessary.

Examples of the photopolymerization initiator include benzophenone compounds such as benzophenone, methyl-o-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone and 2,4,6-trimethylbenzophenone; benzoin compounds such as benzoin, benzoin methyl ether, benzoin ethyl ether, benzoin isopropyl ether and benzyl methyl ketal; acetophenone compounds such as acetophenone, 2,2-dimethoxy-2-phenylacetophenone and 1-hydroxycyclohexyl phenyl ketone; anthraquinone compounds such as methylanthraquinone, 2-ethylanthraquinone and 2-amylanthraquinone; thioxanthone compounds such as thioxanthone, 2,4-diethylthioxanthone and 2,4-diisopropylthioxanthone; alkylphenone compounds such as acetophenone dimethyl ketal; triazine compounds; biimidazole compounds; acylphosphine oxide compounds; titanocene compounds; oxime ester compounds; oxime phenylacetate compounds; hydroxyketone compounds; and aminobenzoate compounds. One of them or a mixture of two or more thereof can be used for the photopolymerization initiator.

The coating material α can contain one or two or more of additives such as an antistatic agent, a surfactant, a thixotropy-imparting agent, a stain-proofing agent, a printability improver, an antioxidant, a weatherability stabilizer, a light resistance stabilizer, a UV absorber, a heat stabilizer, a colorant and organic fine particles, as desired.

The coating material α may contain a solvent as desired for dilution to a concentration which allows easy application. The solvent is not particularly limited as long as the solvent neither reacts with any of the components (A) and (D) and other optional components nor catalyzes (promotes) the self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol and acetone. Among them, 1-methoxy-2-propanol is preferred. One of them or a mixture of two or more thereof can be used for the solvent.

The coating material α can be obtained by mixing and stirring these components.

The thickness of the hard coat formed of the coating material α, although not particularly limited, may be preferably 10 μm or more, more preferably 15 μm or more, and still more preferably 18 μm or more from the viewpoint of hardness. At the same time, the thickness of the hard coat formed of the coating material α may be preferably 30 μm or less, more preferably 27 μm or less, and still more preferably 25 μm or less from the viewpoint of curling resistance and bending resistance.

In addition, the thickness of the hard coat formed of the coating material α may be preferably 10 μm or more and 30 μm or less, or 10 μm or more and 27 μm or less, or 10 μm or more and 25 μm or less, or preferably 15 μm or more and 30 μm or less, or 15 μm or more and 27 μm or less, or 15 μm or more and 25 μm or less, or preferably 18 μm or more and 30 μm or less, or 18 μm or more and 27 μm or less, or 18 μm or more and 25 μm or less.

Coating Material β

The coating material β, which contains an active energy ray-curable resin, can form a hard coat through polymerization/curing with an active energy ray such as a UV ray and an electron beam. The active energy ray-curable resin has been described above in the description of the coating material α. For the active energy ray-curable resin, one of the above-described active energy ray-curable resins or a mixture of two or more thereof can be used.

In the case where the hard coat laminated film obtained by using the production method according to the invention is used for a member in an image display device, particularly a display faceplate in an image display device with a touch panel function, the coating material β is preferably a coating material containing (A) 100 parts by mass of a polyfunctional (meth)acrylate; (B) 0.01 to 7 parts by mass of a water repellant; and (C) 0.01 to 10 parts by mass of a silane coupling agent and containing no inorganic particles.

In the case where the hard coat laminated film obtained by using the production method according to the invention is used for a display faceplate in an image display device with a touch panel function, the hard coat formed of the coating material β will function as a touch surface. In this case, the coating material β having the above-described features enables to exhibit a good abrasion resistance and to maintain the surface properties such as finger slidability even after repeated wipes with a handkerchief or the like.

The inorganic particles (e.g., silica (silicon dioxide); metal oxide particles formed of aluminum oxide, zirconia, titania, zinc oxide, germanium oxide, indium oxide, tin oxide, indium tin oxide, antimony oxide, cerium oxide and the like; metal fluoride particles formed of magnesium fluoride, sodium fluoride and the like; metal sulfide particles; metal nitride particles; and metal particles) are highly effective in enhancing the hardness of a hard coat. On the other hand, the weak interaction between inorganic particles and a resin component such as the component (A) results in an insufficient abrasion resistance. Accordingly, the invention allows the hard coat formed of the coating material β constituting the outermost surface to contain no inorganic particles for retaining abrasion resistance and on the other hand allows the hard coat formed of the coating material α to contain a large amount of specific inorganic fine particles for enhancing the hardness, and thereby has solved this problem.

The term "inorganic particles" referred to herein is intended to mean particles not including particles formed of an organic substance (i.e., a substance which can generate water and carbon dioxide by combustion).

Here, "containing no" inorganic particles regarding the coating material β means not containing a significant amount of inorganic particles. In the field of coating materials for forming a hard coat, the significant amount of inorganic particles is typically about 1 part by mass or more based on 100 parts by mass of the component (A). Therefore, "containing no" inorganic particles regarding the coating material β can be represented otherwise as follows: the amount of inorganic particles is typically 0 parts by mass or more and less than 1 part by mass, preferably 0.1 parts by mass or less, and more preferably 0.01 parts by mass or less based on 100 parts by mass of the component (A).

The (A) polyfunctional (meth)acrylate has been described above in the description of the coating material α. For the polyfunctional (meth)acrylate as the component (A), one of the above-described polyfunctional (meth)acrylates or a mixture of two or more thereof can be used.

(B) Water Repellant

The water repellant as the component (B) serves to enhance the finger slidability, the stain resistance and the wipeability against stain.

Examples of the water repellant include wax water repellants such as a paraffin wax, a polyethylene wax and an acryl-ethylene copolymer wax; silicone water repellants such as a silicon oil, a silicon resin, a polydimethylsiloxane and an alkylalkoxysilane; and fluorine-containing water repellants such as a fluoropolyether water repellant and a fluoropolyalkyl water repellant. One of them or a mixture of two or more thereof can be used for the water repellant as the component (B).

Among them, a fluoropolyether water repellant is preferred for the water repellant as the component (B) from the viewpoint of water repellent performance. An water repellant containing a compound having a (meth)acryloyl group and a fluoropolyether group in the molecule (hereinafter, abbreviated as a (meth)acryloyl group-containing fluoropolyether water repellant) is more preferred from the viewpoint that the component (A) and the component (B) can chemically bond or strongly interact together to prevent troubles such as the bleed-out of component (B). Still more preferred for the water repellant as the component (B) is an admixture of an acryloyl group-containing fluoropolyether water repellant and a methacryloyl group-containing fluoropolyether water repellant from the viewpoint of appropriately controlling the chemical bond or the interaction between the component (A) and the component (B) to allow to exhibit a good water repellency while keeping the transparency high.

The amount of the water repellant as the component (B) to be blended is typically 7 parts by mass or less, preferably 4 parts by mass or less, and more preferably 2 parts by mass or less based on 100 parts by mass of the component (A) from the viewpoint of preventing troubles such as the bleed-out of the component (B). At the same time, the amount of the water repellant as the component (B) to be blended is typically 0.01 parts by mass or more, preferably 0.05 parts by mass or more, and more preferably 0.1 parts by mass or more from the viewpoint of obtaining the effect of use of the component (B). The amount of the water repellant to be blended may be typically 0.01 parts by mass or more and 7 parts by mass or less, and preferably 0.01 parts by mass or more and 4 parts by mass or less, or 0.01 parts by mass or more and 2 parts by mass or less, or preferably 0.05 parts by mass or more and 7 parts by mass or less, or 0.05 parts by mass or more and 4 parts by mass or less, or 0.05 parts by mass or more and 2 parts by mass or less, or preferably 0.1 parts by mass or more and 7 parts by mass or less, or 0.1 parts by mass or more and 4 parts by mass or less, or 0.1 parts by mass or more and 2 parts by mass or less.

(C) Silane Coupling Agent

The silane coupling agent as the component (C) serves to enhance the adhesiveness between the hard coat formed of the coating material α and the hard coat formed of the coating material β.

The silane coupling agents are silane compounds having at least two types of different reactive groups: a hydrolyzable group (e.g., an alkoxy group such as a methoxy group and an ethoxy group; an acyloxy group such as acetoxy group; and a halogen group such as a chloro group) and an organic functional group (e.g., an amino group, a mercapto group, a vinyl group, an epoxy group, a methacryloxy group, an acryloxy group and an isocyanate group). Among them, silane coupling agents having an amino group (i.e., silane coupling compounds having an amino group and a hydrolyzable group) and silane coupling agents having a mercapto group (i.e., silane coupling compound having a mercapto group and a hydrolyzable group) are preferred for the silane coupling agent as the component (C) from the viewpoint of adhesiveness. Silane coupling agents having an amino group are more preferred from the viewpoint of adhesiveness and odor.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

One of them or a mixture of two or more thereof can be used for the silane coupling agent as the component (C).

The amount of the silane coupling agent as the component (C) to be blended is typically 0.01 parts by mass or more, preferably 0.05 parts by mass or more, and more preferably 0.1 parts by mass or more based on 100 parts by mass of the component (A) from the viewpoint of obtaining the adhesiveness-enhancing effect reliably. At the same time, the amount of the silane coupling agent to be blended may be typically 10 parts by mass or less, preferably 5 parts by mass or less, and more preferably 1 part by mass or less from the viewpoint of the pot life of a coating material. The amount of the silane coupling agent to be blended may be typically 0.01 parts by mass or more and 10 parts by mass or less, and preferably 0.01 parts by mass or more and 5 parts by mass or less, or 0.01 parts by mass or more and 1 part by mass or less, or preferably 0.05 parts by mass or more and 10 parts by mass or less, or 0.05 parts by mass or more and 5 parts by mass or less, or 0.05 parts by mass or more and 1 part by mass or less, or preferably 0.1 parts by mass or more and 10 parts by mass or less, or 0.1 parts by mass or more and 5 parts by mass or less, or 0.1 parts by mass or more and 1 part by mass or less.

It is preferable that the coating material β further contains a compound having two or more isocyanate groups (—N═C═O) in one molecule and/or a photopolymerization initiator from the viewpoint of improved curability with an active energy ray.

The compound having two or more isocyanate groups (—N═C═O) in one molecule has been described above in the description of the coating material α. For the compound having two or more isocyanate groups in one molecule, one of the above-described compounds having two or more isocyanate groups in one molecule or a mixture of two or more thereof can be used.

The photopolymerization initiator has been described above in the description of the coating material α. For the photopolymerization initiator, one of the above-described photopolymerization initiators or a mixture of two or more thereof can be used.

The coating material β can contain one or two or more of additives such as an antistatic agent, a surfactant, a leveling agent, a thixotropy-imparting agent, a stain-proofing agent, a printability improver, an antioxidant, a weatherability stabilizer, a light resistance stabilizer, a UV absorber, a heat stabilizer, a colorant, inorganic fine particles and organic fine particles, as desired.

The coating material β may contain a solvent as desired for dilution to a concentration which allows easy application. The solvent is not particularly limited as long as the solvent neither reacts with any of the components (A) to (C) and other optional components nor catalyzes (promotes) the self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol and acetone. One of them or a mixture of two or more thereof can be used for the solvent.

The coating material β can be obtained by mixing and stirring these components.

The thickness of the hard coat formed of the coating material β is preferably 0.5 μm or more, and more preferably 1 μm or more from the viewpoint of abrasion resistance and hardness. At the same time, the thickness of the hard coat formed of the coating material β is preferably 5 μm or less, more preferably 4 μm or less, and still more preferably 3 μm or less from the viewpoint of hardness and adhesiveness to the hard coat formed of the coating material α.

In addition, the thickness of the hard coat formed of the coating material β may be preferably 0.5 μm or more and 5 μm or less, or 0.5 μm or more and 4 μm or less, or 0.5 μm or more and 3 μm or less, or preferably 1 μm or more and 5 μm or less, or 1 μm or more and 4 μm or less, or 1 μm or more and 3 μm or less.

Transparent Resin Film

The same film as described above for the first and second aspects of the invention can be used for the transparent resin film.

This transparent resin film constitutes a layer functioning as a transparent film base material for forming the hard coats from the coating material α and the coating material β, respectively, thereabove. Any transparent resin film can be used for the transparent resin film without limitation as long as it has a high transparency and no coloring. Examples thereof include films formed of a cellulose ester resin such as triacetylcellulose; a polyester resin such as polyethylene terephthalate; a cyclic hydrocarbon resin such as an ethylene-norbornene copolymer; an acrylic resin such as polymethyl methacrylate and polyethyl methacrylate; a poly(meth)acrylimide resin; an aromatic polycarbonate resin; a polyolefin resin such as polypropylene and 4-methyl-penten-1; a polyamide resin; a polyarylate resin; a polymer-type urethane acrylate resin; and a polyimide resin. These films encompass cast films, uniaxially oriented films and biaxially oriented films. Further, these films encompass laminated films with one of these films or two or more thereof laminated in two or more layers.

The thickness of the transparent resin film, which is not particularly limited, can be any thickness as desired. The thickness of the transparent resin film may be typically 20 μm or more, and preferably 50 μm or more from the viewpoint of the handleability of a hard coat laminated film to be obtained by using the production method according to the invention. In the case where the hard coat laminated film according to the invention is used for a display faceplate in a touch panel, the thickness of the transparent resin film may be typically 100 μm or more, preferably 200 μm or more, and more preferably 300 μm or more from the viewpoint of retaining the stiffness. Further, the thickness of the transparent resin film may typically be 1500 μm or less, preferably 1200 μm or less, and more preferably 1000 μm or less from the viewpoint of meeting the requirement for a thinner touch panel. In applications in which a high stiffness is not required other than a display faceplate in a touch panel, the thickness of the transparent resin film may be typically 250 μm or less and preferably 150 μm or less from the viewpoint of economic efficiency.

The transparent resin film is preferably a poly(meth)acrylimide resin film. This allows the hard coat laminated film to be excellent in surface hardness, abrasion resistance, transparency, surface smoothness, appearance, stiffness, heat resistance and dimensional stability, and as a result the hard coat laminated film can be suitably used for a display faceplate in a touch panel or a transparent electroconductive substrate.

The poly(meth)acrylimide resin is a thermoplastic resin in which, while a high transparency, a high surface hardness and a high stiffness derived from an acrylic resin are retained, a characteristic of being excellent in heat resistance and dimensional stability derived from a polyimide resin is introduced to overcome a drawback of coloring to pale yellow-to-reddish brown color. The poly(meth)acrylimide resin is disclosed in JP 2011-519999 A, for example. The term poly(meth)acrylimide herein means polyacrylimide or polymethacrylimide.

Any poly(meth)acrylimide resin can be used for the poly(meth)acrylimide resin without limitation as long as it has a high transparency and no coloring in order to use the hard coat laminated film for optical articles such as a touch panel.

Preferred examples of the poly(meth)acrylimide resin include ones having a yellowness index of 3 or less (measured with a colorimeter "SolidSpec-3700" (trade name) available from Shimadzu Corporation in accordance with JIS K7105:1981). The yellowness index is more preferably 2 or less and still more preferably 1 or less. Further, preferred examples of the poly(meth)acrylimide resin include poly(meth)acrylimide resins having a melt mass-flow rate of 0.1 to 20 g/10 min (measured under conditions of 260° C. and 98.07 N in accordance with ISO 1133) from the viewpoint of extrusion load and the stability of a melted film. The melt mass-flow rate is more preferably 0.5 to 10 g/10 min. Further, the glass transition temperature of the poly(meth)acrylimide resin is preferably 150° C. or higher from the viewpoint of heat resistance. The glass transition temperature is more preferably 170° C. or higher.

The poly(meth)acrylimide resin can further contain, within a range that is not contrary to the object of the invention, a thermoplastic resin other than the poly(meth)acrylimide resin; a pigment, an inorganic filler, an organic filler, a resin filler; an additive such as, a lubricant, an antioxidant, a weatherability stabilizer, a heat stabilizer, a releasing agent, an antistatic agent and a surfactant; or the like, as desired. The amount of the optional component(s) to be blended is typically about 0.01 to 10 parts by mass based on 100 parts by mass of the poly(meth)acrylimide resin.

Examples of commercial products of the poly(meth)acrylimide resin can include "PLEXIMID TT50" (trade name) and "PLEXIMID TT70" (trade name) available from Evonik Industry AG.

The poly(meth)acrylimide resin film is preferably a transparent multilayer film with a first poly(meth)acrylimide resin layer (P1); an aromatic polycarbonate resin layer (Q); and a second poly(meth)acrylimide resin layer (P2) directly laminated in this order. The invention is herein described under the assumption that a touch surface is formed on the P1 layer side.

The poly(meth)acrylimide resin is excellent in heat resistance and surface hardness but often insufficient in cutting processability. On the other hand, the aromatic polycarbonate resin is excellent in cutting processability but often insufficient in heat resistance and surface hardness. Therefore, using a transparent multilayer film having the above-described layer configuration enables to easily obtain a hard coat laminated film in which both substances cover for each other's drawbacks and which is excellent in all of heat resistance, surface hardness and cutting processability.

The layer thickness of the P1 layer, although not particularly limited, may be typically 20 μm or more, preferably 40 μm or more, more preferably 60 μm or more, and still more preferably 80 μm or more from the viewpoint of the heat resistance and the surface hardness of a hard coat laminated film to be obtained by using the production method according to the invention.

The layer thickness of the P2 layer, although not particularly limited, is preferably the same layer thickness as the P1 layer from the viewpoint of the curling resistance of a hard coat laminated film to be obtained by using the production method according to the invention.

Here, "the same layer thickness" should not be interpreted as the same layer thickness in the physicochemically strict sense; but should be interpreted as the same layer thickness within a variation in a process/quality control commonly performed in industry. The reason is that the curling resistance of a multilayer film can be kept good if the layer thickness is the same layer thickness within a variation in a process/quality control commonly performed in industry. A cast multilayer film obtained by a T-die coextrusion method is typically subjected to a process/quality control within a variation of about −5 to +5 μm, and therefore the layer thickness of 65 μm and the layer thickness of 75 μm should be interpreted to be identical. "The same layer thickness" here can be paraphrased as "substantially the same layer thickness".

The layer thickness of the Q layer, although not particularly limited, may typically be 20 μm or more, and preferably 80 μm or more from the viewpoint of the cutting processability of a hard coat laminated film to be obtained by using the production method according to the invention.

The poly(meth)acrylimide resin to be used for the P1 layer and the P2 layer has been described above.

For the poly(meth)acrylimide resin to be used for the P1 layer and the poly(meth)acrylimide resin to be used for the P2 layer, poly(meth)acrylimide resins different in resin properties, for example, poly(meth)acrylimide resins different in melt mass-flow rate or glass transition temperature may be used. It is preferred to use poly(meth)acrylimide resins having the same resin properties from the viewpoint of the curling resistance of a hard coat laminated film to be obtained by using the production method according to the invention. Using poly(meth)acrylimide resins in the same grade and in the same lot is one of the preferred embodiments, for example.

Examples of the aromatic polycarbonate resin to be used for the Q layer include aromatic polycarbonate resins such as polymers obtained by interfacial polymerization of an aromatic dihydroxy compound such as bisphenol A, dimethyl bisphenol A and 1,1-bis(4-hydroxyphenyl)-3,3,5-trimethylcyclohexane with phosgene; and polymers obtained by transesterification reaction of an aromatic dihydroxy compound such as bisphenol A, dimethyl bisphenol A and 1,1-bis(4-hydroxyphenyl)-3,3,5-trimethylcyclohexane with a carbonate diester such as diphenyl carbonate. One of them or a mixture of two or more thereof can be used for the aromatic polycarbonate resin to be used for the Q layer.

Preferred examples of optional components which can be contained in the aromatic polycarbonate resin include core-shell rubbers. Using 0 to 30 parts by mass of a core-shell rubber (100 to 70 parts by mass of the aromatic polycarbonate resin), preferably 0 to 10 parts by mass of a core-shell rubber (100 to 90 parts by mass of the aromatic polycarbonate resin) based on 100 parts by mass of the total amount of the aromatic polycarbonate resin and the core-shell rubber can further enhance the cutting processability and the impact resistance of a hard coat laminated film.

Examples of the core-shell rubber include core-shell rubbers formed of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer and a methacrylate-acrylonitrile/acrylate rubber graft copolymer. One of them or a mixture of two or more thereof can be used for the core-shell rubber.

The aromatic polycarbonate resin can further contain, within a range that is not contrary to the object of the invention, a thermoplastic resin other than the aromatic polycarbonate resin or the core-shell rubber; a pigment, an inorganic filler, an organic filler, a resin filler; an additive such as a lubricant, an antioxidant, a weatherability stabilizer, a heat stabilizer, a releasing agent, an antistatic agent and a surfactant; or the like, as desired. The amount of the optional component(s) to be blended is typically about 0.01 to 10 parts by mass based on 100 parts by mass of the total amount of the aromatic polycarbonate resin and the core-shell rubber.

The method for producing the poly(meth)acrylimide resin film (including the case where the film is the above-described transparent multilayer film) is not particularly limited. Preferred examples of the production method include the methods described in JP 2015-033844 A and JP 2015-034285 A.

In forming a hard coat from the coating material α, an adhesion-facilitating treatment such as a corona discharge treatment and an anchor coat formation may be performed in advance for the surface for forming the hard coat or both surfaces of the monolayer film formed of the poly(meth)acrylimide resin or the transparent multilayer film in order to enhance the adhesion strength to the hard coat formed of the coating material α.

In the production method according to the invention, a third hard coat may further be formed on the surface of the transparent resin film opposite to the surface to be applied with the coating material α. This can make the curling resistance of a hard coat laminated film good. FIG. 2 illustrates the structure of a hard coat laminated film in which a third hard coat is formed in this way.

In recent years, a touch panel has been proposed which has a bilayer structure in which a touch sensor is directly provided on the back side of a display faceplate for the purpose of weight reduction of an image display device (so-called one-glass-solution). In addition, one-plastic-solution to substitute for the so-called one-glass-solution has also been proposed for the purpose of further weight reduction. In the case where the hard coat laminated film according to the invention is used for the one-plastic-solution to substitute for the so-called one-glass-solution, the third hard coat formed allows the hard coat laminated film to easily have properties suitable for a printed surface.

The hard coat laminated film according to the invention may have an optional layer(s) other than the hard coat formed of the coating material β, the hard coat formed of the coating material α, the transparent resin film layer and the third hard coat. Examples of the optional layer include a hard coat other than the three types of hard coats described above, an anchor coat, a pressure-sensitive adhesive layer, a transparent electroconductive layer, a high refractive index layer, a low refractive index layer and a reflection-preventive layer.

Regarding the poly(meth)acrylimide resin film, which is preferably a transparent multilayer film with a first poly(meth)acrylimide resin layer (P1); an aromatic polycarbonate resin layer (Q); and a second poly(meth)acrylimide resin layer (P2) directly laminated in this order as described above, it is not intended that poly(meth)acrylimide resin films comprising an optional layer(s) (e.g., a pressure-sensitive adhesive layer, an anchor coat, a transparent electroconductive layer, a high refractive index layer, a low refractive index layer and a reflection-preventive layer) in addition to these layers be excluded from the scope of the invention.

It is desirable that the hard coat laminated film produced by using the method according to the third aspect of the invention satisfy any one or more of the preferred ranges as described above for total light transmittance, haze, pencil hardness, minimum bending radius, water contact angle and yellowness index regarding the hard coat laminated film according to the first and second aspects. Details for a method for measuring these physical properties and technical meanings thereof are as described above.

Specifically, the hard coat laminated film produced by using the method according to the third aspect has a total light transmittance of preferably 85% or more, more preferably 88% or more and still more preferably 90% or more, and/or a haze of 2.0% or less, more preferably 1.5% or less, still more preferably 1.0% or less and most preferably 0.5% or less, and/or a pencil hardness of preferably 5H or higher, more preferably 6H or higher and still more preferably 7H or higher, and/or a minimum bending radius of preferably 40 mm or less, more preferably 35 mm or less and still more preferably 30 mm or less, and/or a water contact angle of the surface of the first hard coat of preferably 100° or more and more preferably 105° or more, and/or a water contact angle of the surface of the first hard coat after 20000 reciprocating wipes with a cotton of 100° or more and more preferably a water contact angle after 25000 reciprocating wipes with a cotton of 100° or more.

EXAMPLES

The invention will be now described by referring to Examples, but the invention is not limited to these Examples.

Measurement/Evaluation Methods

The measurement/evaluation method for the physical properties of a hard coat laminated film will be described.

(i) Total Light Transmittance

The total light transmittance was measured according to JIS K7361-1:1997 by using a turbidimeter "NDH2000" (trade name) of Nippon Denshoku Industries Co., Ltd.

(ii) Pencil Hardness

The pencil hardness of a hard coat laminated film was measured for the surface of the first hard coat or the hard coat formed of a coating material β according to JIS K5600-5-4 by using a pencil "UNI" (trade name) of Mitsubishi Pencil Co., Ltd under the condition of a load of 750 g.

(iii) Haze

The haze was measured according to JIS K7136:2000 by using a turbidimeter "NDH2000" (trade name) of Nippon Denshoku Industries Co., Ltd.

(iv) Minimum Bending Radius

With reference to Bending Formability (B method) in JIS-K6902:2007, a test piece of a hard coat laminated film was conditioned at a temperature of 23° C.±2° C. and a relative humidity of 50±5% for 24 hours, and thereafter the test piece was bent to form a curve at a bending temperature of 23° C.±2° C. at a bending line with a direction perpendicular to the machine direction of the hard coat laminated film so that the first hard coat of the hard coat laminated film was on the outer side, and for the resultant, measurement was performed. The radius of the front face of the shaping jig having the smallest radius of the front face among shaping jigs with no crack generated was defined as the minimum bending radius. The "front face" has the same meaning as the term regarding a shaping jig in the B method defined in Paragraph 18.2 in JIS K6902:2007.

(v) Water Contact Angle

The water contact angle of a hard coat laminated film was measured for the surface of the first hard coat or the hard coat formed of a coating material β with an automatic contact angle meter "DSA 20 (trade name)" available from KRUSS GmbH by using a method to calculate from the width and the height of a water drop (as indicated in JIS R3257:1999).

(vi) Abrasion Resistance 1 (Water Contact Angle after Wipes with Cotton)

A test piece of a hard coat laminated film was prepared in a size of 150 mm length and 50 mm width so that the machine direction of the hard coat laminated film corresponded to the longitudinal direction of the test piece, and the test piece was placed on a Gakushin-type tester in accordance with JIS L0849 so that the first hard coat or the hard coat formed of a coating material β of the hard coat laminated film was on the surface side. A stainless steel sheet (10 mm length, 10 mm width, 1 mm thickness) covered with a four-ply gauze (a type 1 medical gauze available from Kawamoto Corporation) was attached to a rubbing finger of the Gakushin-type tester, and the resultant was set so that the sheet face of the stainless steel sheet came into contact with the test piece and a load of 350 g was applied. After 10000 reciprocating rubbings of the surface of the first hardcoat or the hard coat formed of a coating material β of the test piece under conditions that the moving distance of the rubbing finger was 60 mm and the speed was 1 cycle/sec, the water contact angle on the cotton-wiped portion was measured in accordance with the method in the (v). In the case where the water contact angle was 100° or more, the operation of additionally carrying out 5000 reciprocating rubbings and then measuring the water contact angle on the cotton-wiped portion in accordance with the method in the (v) was repeated, and evaluation was performed by using the following criteria.

A: The water contact angle was 100° or more even after 25000 cycles of reciprocation.

B: The water contact angle was 100° or more after 20000 cycles but the water contact angle was less than 100° after 25000 cycles of reciprocation.

C: The water contact angle was 100° or more after 15000 cycles of reciprocation but the water contact angle was less than 100° after 20000 cycles of reciprocation.

D: The water contact angle was 100° or more after 10000 cycles of reciprocation but the water contact angle was less than 100° after 15000 cycles of reciprocation.

E: The water contact angle was less than 100° after 10000 cycles of reciprocation.

(vii) Abrasion Resistance 2 (Resistance Against Steel Wool)

A hard coat laminated film was placed on a Gakushin-type tester in accordance with JIS L0849 so that the first hard coat or the hard coat formed of a coating material β was on the surface side. A steel wool of #0000 was subsequently attached to a rubbing finger of the Gakushin-type tester and a load of 500 g was then applied. After 100 reciprocating rubbings of the surface of the test piece, the rubbed portion was visually observed. In the case where no scratch was found, the operation of additionally carrying out 100 reciprocating rubbings and then visually observing the rubbed portion was repeated, and evaluation was performed by using the following criteria.

A: No scratches were found even after 500 cycles of reciprocation.

B: No scratches were found after 400 cycles of reciprocation but scratches were found after 500 cycles of reciprocation.

C: No scratches were found after 300 cycles of reciprocation but scratches were found after 400 cycles of reciprocation.

D: No scratches were found after 200 cycles of reciprocation but scratches were found after 300 cycles of reciprocation.

E: No scratches were found after 100 cycles of reciprocation but scratches were found after 200 cycles of reciprocation.

F: Scratches were found after 100 cycles of reciprocation.

(viii) Yellowness Index

The yellowness index was measured according to JIS K7105:1981 by using a colorimeter "SolidSpec-3700" (trade name) available from Shimadzu Corporation.

(ix) Surface Smoothness (Surface Appearance)

The surface (i.e., each of both surfaces) of a hard coat laminated film was visually observed while irradiating with a fluorescent light from various incident angles, and evaluation was performed by using the following criteria.

⊚ (very good): No undulations or flaws were found on the surface. No cloudiness was perceived even when the surface was seen through with a light irradiated closely.

○ (good): A portion with a little cloudiness was found when the surface was seen through with a light irradiated closely.

Δ (slightly poor): Undulations or flaws were found on the surface in a small quantity when the surface was looked at closely. Further, cloudiness was perceived.

x (poor): Undulations or flaws were found on the surface in a large quantity. Further, cloudiness was clearly perceived.

(x) Cross-Cut Test (Adhesiveness)

In accordance with JIS K5600-5-6:1999, a square lattice pattern cut consisting of 100 cells (1 cell=1 mm×1 mm) was provided on the surface of the first hard coat or the hard coat formed of a coating material β of a hard coat laminated film. Thereafter, a tape for adhesion tests was attached on the square lattice pattern cut and rubbed with fingers and then peeled off. The criteria for evaluation were in accordance with Table 1 in the above standard of JIS.

Classification 0: The edges of the cuts were completely smooth; none of the squares of the lattice was detached.

Classification 1: Detachment of small flakes of the coating was seen at the intersections of the cuts. A cross-cut area of not greater than 5% was affected.

Classification 2: The coating flaked along the edges and/or at the intersections of the cuts. A cross-cut area of greater than 5%, but not greater than 15%, was affected.

Classification 3: The coating flaked along the edges of the cuts partly or wholly in large ribbons, and/or it flaked partly or wholly on different parts of the squares. A cross-cut area of greater than 15%, but not greater than 35%, was affected.

Classification 4: The coating flaked along the edges of the cuts partly or wholly in large ribbons and/or some squares detached partly or wholly. A cross-cut area of greater than 35%, but not greater than 65%, was affected.

Classification 5: This criterion was defined as the case where the degree of flaking was greater than that in Classification 4.

(xi) Cutting Processability (Condition of Curved Cutting-Processed Line)

A hard coat laminated film was provided with a cut hole in true circle with a diameter of 2 mm and a cut hole in true circle with a diameter of 0.5 mm by using a router processing machine automatically controlled with a computer. The mill used then was a four-bladed super-hard-alloy mill with nicks that has a cylindrically round tip, and the blade diameter was appropriately selected depending on a portion to be processed. Subsequently, the cut hole with a diameter of 2 mm was observed for the cut edge surface visually or with a microscope (100×) and evaluation was performed by using the following criteria. Similarly, the cut hole with a diameter of 0.5 mm was observed for the cut edge surface visually or with a microscope (100×) and evaluation was performed by using the following criteria. The result of the former case and the result of the latter case were listed in this order in the tables below.

⊚: (very good): No crack or burr was found even in microscopic observation.

○: (good): No crack was found even in microscopic observation but a burr was found.

Δ: (slightly poor): No crack was found in visual observation but a crack was found in microscopic observation.

×: (poor): A crack was found even in visual observation.

(xii) Shrinkage-Starting Temperature (Dimensional Stability Against Heat)

A temperature-test piece length curve was determined in accordance with JIS K7197:1991, and the lowest temperature among temperatures at inflection points at which an increasing trend in the test piece length (expansion) shifted to a decreasing trend (shrinkage) (the temperature at which the test piece length reached to a local maximum) within the range of 20° C. to the glass transition temperature of a raw material resin was estimated as the shrinkage-starting temperature. The thermomechanical analyzer (TMA) "EXSTAR 6100 (trade name)" available from Seiko Instruments Inc. was used for the measurement. A test piece was prepared in a size of 20 mm length and 10 mm width so that the machine direction (MD) of the film corresponded to the longitudinal direction of the test piece. Conditioning of the test piece was performed at a temperature of 23° C.±2° C. and a relative humidity of 50±5% for 24 hours, and conditioning at the maximum temperature to be measured was not performed in order to evaluate dimensional stability as the physical property value of a film. The distance between chucks and the tensile load were set to 10 mm and 4.0 mN/mm², respectively. The temperature program was one in which the temperature was retained at a temperature of 20° C. for 3 minutes and thereafter increased to a temperature of 300° C. at a temperature increase rate of 5° C./min.

I. Examples of Hard Coat Laminated Film
Raw Materials Used
(A) Polyfunctional (meth)acrylate:
(A-1) Dipentaerythritol hexaacrylate (hexafunctional)
(A-2) Pentaerythritol triacrylate (trifunctional)

(B) Water repellant:
(B-1) An acryloyl group-containing fluoropolyether water repellant "KY-1203" (trade name) available from Shin-Etsu Chemical Co., Ltd.: solid content 20% by mass
(B-2) A methacryloyl group-containing fluoropolyether water repellant "FOMBLIN MT70" (trade name) available from Solvay S.A.: solid content 70% by mass
(C) Silane coupling agent:
(C-1) N-2-(aminoethyl)-3-aminopropylmethyldimethoxysilane "KBM-602" (trade name) available from Shin-Etsu Chemical Co., Ltd.
(C-2) N-2-(aminoethyl)-3-aminopropyltrimethoxysilane "KBM-603" (trade name) available from Shin-Etsu Chemical Co., Ltd.
(C-3) 3-aminopropyltrimethoxysilane "KBM-903" (trade name) available from Shin-Etsu Chemical Co., Ltd.
(C-4) 3-mercaptopropylmethyldimethoxysilane "KBM-802" (trade name) available from Shin-Etsu Chemical Co., Ltd.
(C-5) 3-glycidoxypropyltrimethoxysilane "KBM-403" (trade name) available from Shin-Etsu Chemical Co., Ltd.
(D) Inorganic fine particles having an average particle size of 1 to 300 nm:
(D-1) Silica fine particles having an average particle size of 20 nm the surface of which has been treated with a silane coupling agent having a vinyl group
(E) Leveling agent:
(E-1) A silicon-acrylic copolymer leveling agent "DISPARLON NSH-8430H"" (trade name) available from Kusumoto Chemicals, Ltd.: solid content 10% by mass
(E-2) A silicon-acrylic copolymer leveling agent "BYK-3550" (trade name) available from Big Chemy Japan KK: solid content 52% by mass
(E-3) An acrylic polymer leveling agent "BYK-399" (trade name) available from Big Chemy Japan KK: solid content 100% by mass
(E-4) A silicon leveling agent "DISPARLON LS-480" (trade name) available from Kusumoto Chemicals, Ltd.: solid content 100% by mass
(F) Optional component:
(F-1) The phenyl ketone photopolymerization initiator (1-hydroxycyclohexyl phenyl ketone) "SB-PI714" (trade name) available from Shuang Bang Industrial Corp.
(F-2) 1-Methoxy-2-propanol
(H1) Coating material for forming first hard coat:
(H1-1) A coating material was obtained by mixing and stirring 100 parts by mass of the (A-1), 2 parts by mass (0.40 parts by mass in terms of solid content) of the (B-1), 0.06 parts by mass (0.042 parts by mass in terms of solid content) of the (B-2), 0.5 parts by mass of the (C-1), 4 parts by mass of the (F-1) and 100 parts by mass of the (F-2). The formation is shown in Table 1. Note that values in terms of solid content are listed for the (B-1) and the (B-2) in the table.

(H1-2 to H1-16) Each coating material was obtained in the same way as in the (H1-1) except that the components and their ratio were changed as shown in Table 1 or Table 2.

TABLE 1

Formulations (1) of coating material for forming first hard coat

| Component (parts by mass) | Coating material for forming first hard coat | | | | | | | |
|---|---|---|---|---|---|---|---|---|
| | H1-1 | H1-2 | H1-3 | H1-4 | H1-5 | H1-6 | H1-7 | H1-8 |
| (A-1) | 100 | 100 | 100 | 100 | 100 | 100 | 100 | 100 |
| (B-1) | 0.40 | 0.080 | 0.80 | 2.0 | — | 8.0 | 0.40 | 0.40 |

TABLE 1-continued

Formulations (1) of coating material for forming first hard coat

| Component (parts by mass) | Coating material for forming first hard coat | | | | | | | |
|---|---|---|---|---|---|---|---|---|
| | H1-1 | H1-2 | H1-3 | H1-4 | H1-5 | H1-6 | H1-7 | H1-8 |
| (B-2) | 0.042 | 0.0084 | 0.084 | 0.21 | — | 0.84 | 0.042 | 0.042 |
| (C-1) | 0.5 | 0.5 | 0.5 | 0.5 | 0.5 | 0.5 | 0.5 | — |
| (C-2) | — | — | — | — | — | — | — | — |
| (C-3) | — | — | — | — | — | — | — | — |
| (C-4) | — | — | — | — | — | — | — | — |
| (C-5) | — | — | — | — | — | — | — | — |
| (D-1) | — | — | — | — | — | — | 20 | — |
| (F-1) | 4 | 4 | 4 | 4 | 4 | 4 | 4 | 4 |
| (F-2) | 100 | 100 | 100 | 100 | 100 | 80 | 130 | 100 |

TABLE 2

Formulations (2) of coating material for forming first hard coat

| Component (parts by mass) | Coating material for forming first hard coat | | | | | | | |
|---|---|---|---|---|---|---|---|---|
| | H1-9 | H1-10 | H1-11 | H1-12 | H1-13 | H1-14 | H1-15 | H1-16 |
| (A-1) | 100 | 100 | 100 | 100 | 100 | 100 | 100 | 100 |
| (B-1) | 0.40 | 0.40 | 0.40 | 0.40 | 0.40 | 0.40 | 0.40 | 0.40 |
| (B-2) | 0.042 | 0.042 | 0.042 | 0.042 | 0.042 | 0.042 | 0.042 | 0.042 |
| (C-1) | 0.01 | 0.1 | 1 | 5 | — | — | — | — |
| (C-2) | — | — | — | — | 0.5 | — | — | — |
| (C-3) | — | — | — | — | — | 0.5 | — | — |
| (C-4) | — | — | — | — | — | — | 0.5 | — |
| (C-5) | — | — | — | — | — | — | — | 0.5 |
| (D-1) | — | — | — | — | — | — | — | — |
| (F-1) | 4 | 4 | 4 | 4 | 4 | 4 | 4 | 4 |
| (F-2) | 100 | 100 | 100 | 105 | 100 | 100 | 100 | 100 |

(H2) Coating material for forming second hard coat:

(H2-1) A coating material was obtained by mixing and stirring 100 parts by mass of the (A-2), 140 parts by mass of the (D-1), 2 parts by mass (0.2 parts by mass in terms of solid content) of the (E-1), 17 parts by mass of the (F-1) and 200 parts by mass of the (F-2). The formulation is shown in Table 3. Note that values in terms of solid content are listed for the (E-1) in the table.

(H2-2 to H2-15) Each coating material was obtained in the same way as in the (H2-1) except that the components and their ratio were changed as shown in Table 3 or Table 4.

TABLE 3

Formulations (1) of coating material for forming second hard coat

| Component (parts by mass) | Coating material for forming second hard coat | | | | | | |
|---|---|---|---|---|---|---|---|
| | H2-1 | H2-2 | H2-3 | H2-4 | H2-5 | H2-6 | H2-7 |
| (A-2) | 100 | 100 | 100 | 100 | 100 | 100 | 100 |
| (D-1) | 140 | 140 | 140 | 140 | 140 | 140 | 140 |
| (E-1) | 0.2 | — | 0.1 | 0.4 | 0.6 | 1.5 | — |
| (E-2) | — | — | — | — | — | — | 0.2 |
| (E-3) | — | — | — | — | — | — | — |
| (E-4) | — | — | — | — | — | — | — |
| (F-1) | 17 | 17 | 17 | 17 | 17 | 17 | 17 |
| (F-2) | 200 | 200 | 200 | 200 | 200 | 200 | 200 |

TABLE 4

Formulations (2) coating material for forming second hard coat

| Component (parts by mass) | Coating material for forming second hard coat | | | | | | | |
|---|---|---|---|---|---|---|---|---|
| | H2-8 | H2-9 | H2-10 | H2-11 | H2-12 | H2-13 | H2-14 | H2-15 |
| (A-2) | 100 | 100 | 100 | 100 | 100 | 100 | 100 | 100 |
| (D-1) | 140 | 140 | 140 | 80 | 200 | — | 400 | 30 |
| (E-1) | — | — | — | 0.2 | 0.2 | 0.2 | 0.2 | 0.2 |
| (E-2) | 0.4 | — | — | — | — | — | — | — |

TABLE 4-continued

Formulations (2) coating material for forming second hard coat

| Component | Coating material for forming second hard coat | | | | | | | |
|---|---|---|---|---|---|---|---|---|
| (parts by mass) | H2-8 | H2-9 | H2-10 | H2-11 | H2-12 | H2-13 | H2-14 | H2-15 |
| (E-3) | — | 0.3 | — | — | — | — | — | — |
| (E-4) | — | — | 0.3 | — | — | — | — | — |
| (F-1) | 17 | 17 | 17 | 17 | 17 | 17 | 17 | 17 |
| (F-2) | 200 | 200 | 200 | 155 | 250 | 120 | 420 | 120 |

(P) Transparent resin film:

(P-1) Using an apparatus provided with a two-component/three-layer multimanifold-type coextrusion T-die and a winder having a mechanism to pressurize a melted film with a mirror-finished roll and a mirror-finished belt, a two-component/three-layer multilayer resin film in which both outer layers (α1 layer and α2 layer) were formed of the poly(meth)acrylimide "PLEXIMID TT50" (trade name) available from Evonik Industry AG and the intermediate layer 03 layer) was formed of an aromatic polycarbonate "CALIBRE 301-4" (trade name) available from Sumika Styron Polycarbonate Limited was continuously coextruded from the coextrusion T-die, and the coextruded product was fed between the rotating mirror-finished roll and the mirror-finished belt circulating along the outer periphery surface of the mirror-finished roll so that the α1 layer was on the mirror-finished roll side, and pressurized. As a result, a transparent resin film having a total thickness of 250 μm was obtained in which the layer thickness of the α1 layer was 80 μm, the layer thickness of the 13 layer was 90 μm and the layer thickness of the α2 layer was 80 μm. Regarding the conditions set for this operation, the temperature of the T-die, the temperature of the mirror-finished roll, the temperature of the mirror-finished belt and the wind-up speed were set to 300° C., 130° C., 120° C. and 6.5 m/min, respectively.

(P-2) A transparent resin film was obtained in the same way as in the (P-1) except that the layer thickness ratio was changed so that the layer thickness of the α1 layer, the layer thickness of the (3 layer and the layer thickness of the α2 layer were 60 μm, 130 μm and 60 μm, respectively.

(P-3) A transparent resin film was obtained in the same way as in the (P-1) except that the layer thickness ratio was changed so that the layer thickness of the α1 layer, the layer thickness of the 13 layer and the layer thickness of the α2 layer were 40 μm, 170 μm and 40 μm, respectively.

(P-4) A biaxially oriented polyethylene terephthalate film "DIAFOIL" (trade name) available from Mitsubishi Plastics, Inc.: thickness 250 μm (P-5) An acrylic resin film "TECHNOLLOY S001G" (trade name) available from Sumitomo Chemical Co., Ltd.: thickness 250 μm.

(P-6) Using an apparatus provided with a monolayer T-die and a winder having a mechanism to pressurize a melted film with a mirror-finished roll and a mirror-finished belt, an aromatic polycarbonate "CALIBRE 301-4" (trade name) available from Sumika Styron Polycarbonate Limited was continuously extruded from the T-die, and the extruded product was fed between the rotating mirror-finished roll and the mirror-finished belt circulating along the outer periphery surface of the mirror-finished roll, and pressurized. As a result, a transparent resin film having a total thickness of 250 μm was obtained. Regarding the conditions set for this operation, the temperature of the T-die, the temperature of the mirror-finished roll, the temperature of the mirror-finished belt and the wind-up speed were set to 320° C., 140° C., 120° C. and 5.6 m/min, respectively.

Example 1

Both surfaces of the (P-1) were subjected to a corona discharge treatment. Both surfaces had a wetting index of 64 mN/m. Subsequently, the surface on the α1 layer side was coated with the (H2-1) by using a die-type applicator so that the wet coat thickness was 40 μm (thickness after curing: 22 μm). Next, the resultant was passed in a drying furnace with the inner temperature set to 90° C. at a line speed such that the time required to pass through from the inlet to the outlet was 1 minute, and then treated with a curing apparatus (see FIG. 1) having a UV irradiator 1 of high-pressure mercury lamp type and a mirror-finished metal roll 2 having a diameter of 25.4 cm which were disposed opposite to each other, under conditions that the temperature of the mirror-finished metal roll was 90° C. and the integrated amount of light was 80 mJ/cm². As a result, the wet coat formed of the (H2-1) became a coating film in a set-to-touch state. Subsequently, the coating film in a set-to-touch state formed of the (H2-1) was coated with the (H1-1) by using a die-type applicator so that the wet coat thickness was 4 μm (thickness after curing: 2 μm). Next, the resultant was passed in a drying furnace with the inner temperature set to 80° C. at a line speed such that the time required to pass through from the inlet to the outlet was 1 minute, and then treated to form a first hard coat and a second hard coat with a curing apparatus (see FIG. 1) having a UV irradiator 1 of high-pressure mercury lamp type and a mirror-finished metal roll 2 having a diameter of 25.4 cm which were disposed opposite to each other, under conditions that the temperature of the mirror-finished metal roll was 60° C. and the integrated amount of light was 480 mJ/cm². Subsequently, a third hard coat was formed on the surface on the α2 layer side with the same coating material as in forming the second hard coat (e.g., the (H2-1) in Example 1) by using a die-type applicator so that the thickness after curing was 22 μm, and as a result a hard coat laminated film was obtained. The tests (i) to (xii) were performed for it. The results are shown in Table 5.

Examples 2 to 35

Each hard coat laminated film was prepared and measurement/evaluation of the physical properties was performed totally in the same way as in Example 1 except that at least one of the coating material for forming the second hard coat, the coating material for forming the first hard coat and the transparent resin film used was changed as shown in one of Tables 5 to 9. The results are shown in Tables 5 to 9.

Examples 36 to 58

Each hard coat laminated film was prepared and measurement/evaluation of the physical properties was performed in the same way as in Example 1 except that the thicknesses after curing of the first to third hard coats or the production conditions of the hard coat laminated films were changed as shown in one of Tables 10 to 13. The results are shown in one of Tables 10 to 13.

TABLE 5

Measurement/evaluation results of physical properties of hard coat laminated film

|  |  | Example 1 | Example 2 | Example 3 | Example 4 | Example 5 | Example 6 | Example 7 |
|---|---|---|---|---|---|---|---|---|
| Configuration | Coating material for first hard coat | (H1-1) | (H1-2) | (H1-3) | (H1-4) | (H1-5) | (H1-6) | (H1-7) |
|  | Coating material for second hard coat | (H2-1) | (H2-1) | (H2-1) | (H2-1) | (H2-1) | (H2-1) | (H2-1) |
|  | Transparent resin film | (P-1) | (P-1) | (P-1) | (P-1) | (P-1) | (P-1) | (P-1) |
| Evaluation results | Total light transmittance % | 90.9 | 90.9 | 90.8 | 90.4 | 90.9 | 89.8 | 90.1 |
|  | Haze % | 0.2 | 0.1 | 0.3 | 1.3 | 0.1 | 3.5 | 0.3 |
|  | Yellowness index | 0.3 | 0.3 | 0.3 | 0.3 | 0.3 | 0.3 | 0.3 |
|  | Water contact angle deg | 116 | 115 | 116 | 118 | 72 | 119 | 116 |
|  | Abrasion resistance 1 | A | B | A | A | E | A | E |
|  | Abrasion resistance 2 | A | A | A | A | D | A | F |
|  | Pencil hardness | 7H | 7H | 7H | 7H | 5H | 7H | 7H |
|  | Surface smoothness | ◎ | ◎ | ◎ | ◎ | ◎ | ◎ | ◎ |
|  | Cross-cut test | Class 0 | Class 0 | Class 0 | Class 0 | Class 0 | Class 0 | Class 0 |
|  | Minimum bending radius mm | 30 | 30 | 30 | 30 | 30 | 30 | 30 |
|  | Cutting processability | ◎-◎ | ◎-◎ | ◎-◎ | ◎-◎ | ◎-◎ | ◎-◎ | ◎-◎ |
|  | Shrinkage-starting temperature °C. | 140 | 140 | 140 | 140 | 140 | 140 | 140 |

TABLE 6

Measurement/evaluation results of physical properties of hard coat laminated film

|  |  | Example 8 | Example 9 | Example 10 | Example 11 | Example 12 | Example 13 | Example 14 |
|---|---|---|---|---|---|---|---|---|
| Configuration | Coating material for first hard coat | (H1-8) | (H1-9) | (H1-10) | (H1-11) | (H1-12) | (H1-13) | (H1-14) |
|  | Coating material for second hard coat | (H2-1) | (H2-1) | (H2-1) | (H2-1) | (H2-1) | (H2-1) | (H2-1) |
|  | Transparent resin film | (P-1) | (P-1) | (P-1) | (P-1) | (P-1) | (P-1) | (P-1) |
| Evaluation results | Total light transmittance % | 90.9 | 90.9 | 90.9 | 90.9 | 90.9 | 90.9 | 90.9 |
|  | Haze % | 0.2 | 0.2 | 0.2 | 0.2 | 0.2 | 0.2 | 0.2 |
|  | Yellowness index | 0.3 | 0.3 | 0.3 | 0.3 | 0.3 | 0.3 | 0.3 |
|  | Water contact angle deg | 116 | 116 | 116 | 116 | 116 | 116 | 116 |
|  | Abrasion resistance 1 | A | A | A | A | A | A | A |
|  | Abrasion resistance 2 | A | A | A | A | A | A | A |
|  | Pencil hardness | 7H | H | 7H | 7H | 7H | 7H | 7H |
|  | Surface smoothness | ◎ | ◎ | ◎ | ◎ | ◎ | ◎ | ◎ |
|  | Cross-cut test | Class 4 | Class 1 | Class 0 | Class 0 | Class 0 | Class 0 | Class 0 |
|  | Minimum bending radius mm | 30 | 30 | 30 | 30 | 30 | 30 | 30 |
|  | Cutting processability | ◎-◎ | ◎-◎ | ◎-◎ | ◎-◎ | ◎-◎ | ◎-◎ | ◎-◎ |
|  | Shrinkage-starting temperature °C. | 140 | 140 | 140 | 140 | 140 | 140 | 140 |

TABLE 7

Measurement/evaluation results of physical properties of hard coat laminated film

|  |  | Example 15 | Example 16 | Example 17 | Example 18 | Example 19 | Example 20 | Example 21 |
|---|---|---|---|---|---|---|---|---|
| Configuration | Coating material for first hard coat | (H1-15) | (H1-16) | (H1-1) | (H1-1) | (H1-1) | (H1-1) | (H1-1) |
|  | Coating material for second hard coat | (H2-1) | (H2-1) | (H2-2) | (H2-3) | (H2-4) | (H2-5) | (H2-6) |
|  | Transparent resin film | (P-1) | (P-1) | (P-1) | (P-1) | (P-1) | (P-1) | (P-1) |
| Evaluation results | Total light transmittance % | 90.9 | 90.9 | 90.9 | 90.9 | 90.9 | 90.9 | 90.9 |
|  | Haze % | 0.2 | 0.2 | 0.3 | 0.2 | 0.2 | 0.2 | 0.5 |
|  | Yellowness index | 0.3 | 0.3 | 0.3 | 0.3 | 0.3 | 0.3 | 0.3 |
|  | Water contact angle deg | 116 | 116 | 116 | 116 | 116 | 116 | 116 |
|  | Abrasion resistance 1 | A | A | B | A | A | A | A |
|  | Abrasion resistance 2 | A | A | B | A | A | A | A |

TABLE 7-continued

Measurement/evaluation results of physical properties of hard coat laminated film

|  | Example 15 | Example 16 | Example 17 | Example 18 | Example 19 | Example 20 | Example 21 |
|---|---|---|---|---|---|---|---|
| Pencil hardness | 7H | 7H | 7H | 7H | 7H | 7H | 7H |
| Surface smoothness | ◎ | ◎ | ○ | ○ | ◎ | ◎ | ◎ |
| Cross-cut test | Class 0 | Class 3 | Class 0 | Class 0 | Class 0 | Class 0 | Class 2 |
| Minimum bending radius mm | 30 | 20 | 30 | 30 | 30 | 30 | 30 |
| Cutting processability | ◎-◎ | ◎-◎ | ◎-◎ | ◎-◎ | ◎-◎ | ◎-◎ | ◎-◎ |
| Shrinkage-starting temperature ° C. | 140 | 140 | 140 | 140 | 140 | 140 | 140 |

TABLE 8

Measurement/evaluation results of physical properties of hard coat laminated film

|  |  | Example 22 | Example 23 | Example 24 | Example 25 | Example 26 | Example 27 | Example 28 |
|---|---|---|---|---|---|---|---|---|
| Configuration | Coating material for first hard coat | (H1-1) | (H1-1) | (H1-1) | (H1-1) | (H1-1) | (H1-1) | (H1-1) |
|  | Coating material for second hard coat | (H2-7) | (H2-8) | (H2-9) | (H2-10) | (H2-11) | (H2-12) | (H2-13) |
|  | Transparent resin film | (P-1) | (P-1) | (P-1) | (P-1) | (P-1) | (P-1) | (P-1) |
| Evaluation results | Total light transmittance % | 90.9 | 90.9 | 90.9 | 90.9 | 91.1 | 90.0 | 91.3 |
|  | Haze % | 0.2 | 0.2 | 0.5 | 0.5 | 0.2 | 0.6 | 0.1 |
|  | Yellowness index | 0.3 | 0.3 | 0.3 | 0.3 | 0.3 | 0.3 | 0.3 |
|  | Water contact angle deg | 116 | 116 | 116 | 116 | 116 | 116 | 116 |
|  | Abrasion resistance 1 | A | A | A | A | A | A | A |
|  | Abrasion resistance 2 | A | A | A | A | A | A | A |
|  | Pencil hardness | 7H | 7H | 7H | 7H | 6H | 8H | 2H |
|  | Surface smoothness | ◎ | ◎ | ○ | ◎ | ◎ | ◎ | ◎ |
|  | Cross-cut test | Class 0 | Class 0 | Class 0 | Class 2 | Class 0 | Class 0 | Class 0 |
|  | Minimum bending radius mm | 30 | 30 | 30 | 30 | 20 | 40 | 50 |
|  | Cutting processability | ◎-◎ | ◎-◎ | ◎-◎ | ◎-◎ | ◎-◎ | ◎-◎ | ◎-◎ |
|  | Shrinkage-starting temperature ° C. | 140 | 140 | 140 | 140 | 140 | 140 | 140 |

TABLE 9

Measurement/evaluation results of physical properties of hard coat laminated film

|  |  | Example 29 | Example 30 | Example 31 | Example 32 | Example 33 | Example 34 | Example 35 |
|---|---|---|---|---|---|---|---|---|
| Configuration | Coating material for first hard coat | (H1-1) | (H1-1) | (H1-1) | (H1-1) | (H1-1) | (H1-1) | (H1-1) |
|  | Coating material for second hard coat | (H2-14) | (H2-15) | (H2-1) | (H2-1) | (H2-1) | (H2-1) | (H2-1) |
|  | Transparent resin film | (P-1) | (P-1) | (P-2) | (P-3) | (P-4) | (P-5) | (P-6) |
| Evaluation results | Total light transmittance % | 88.0 | 91.1 | 90.9 | 90.9 | 90.1 | 90.9 | 90.6 |
|  | Haze % | 3.5 | 0.1 | 0.2 | 0.2 | 0.3 | 0.3 | 0.3 |
|  | Yellowness index | 0.3 | 0.3 | 0.3 | 0.3 | 0.3 | 0.3 | 0.4 |
|  | Water contact angle deg | 116 | 116 | 116 | 116 | 116 | 116 | 116 |
|  | Abrasion resistance 1 | A | A | A | A | A | A | A |
|  | Abrasion resistance 2 | A | A | A | A | A | A | A |
|  | Pencil hardness | 9H | 3H | 7H | 5H | 4H | 7H | 2H |
|  | Surface smoothness | ◎ | ◎ | ◎ | ◎ | ◎ | ◎ | ◎ |
|  | Cross-cut test | Class 0 | Class 0 | Class 0 | Class 0 | Class 0 | Class 0 | Class 0 |
|  | Minimum bending radius mm | 50 | 20 | 30 | 30 | 30 | 40 | 30 |
|  | Cutting processability | ◎-◎ | ◎-◎ | ◎-◎ | ◎-◎ | ◎-◎ | ◎-◎ | ◎-◎ |
|  | Shrinkage-starting temperature ° C. | 140 | 140 | 140 | 140 | 70 | 100 | 130 |

TABLE 10

Measurement/evaluation results of physical properties of hard coat laminated film

|  |  | Example 36 | Example 37 | Example 38 | Example 39 | Example 40 | Example 41 |
|---|---|---|---|---|---|---|---|
| First hard coat | Coating material | (H1-1) | (H1-1) | (H1-1) | (H1-1) | (H1-1) | (H1-1) |
|  | Thickness μm | 0.5 | 1 | 3 | 5 | 2 | 2 |
|  | Predrying temperature ° C. | 80 | 80 | 80 | 80 | 80 | 80 |
|  | Predrying time min. | 1 | 1 | 1 | 1 | 1 | 1 |
|  | Preheating in irradiation ° C. | 60 | 60 | 60 | 60 | 60 | 60 |

TABLE 10-continued

Measurement/evaluation results of physical properties of hard coat laminated film

| | | Example 36 | Example 37 | Example 38 | Example 39 | Example 40 | Example 41 |
|---|---|---|---|---|---|---|---|
| | Integrated amount of light mJ/cm² | 480 | 480 | 480 | 480 | 480 | 480 |
| Second hard coat | Coating material | (H2-1) | (H2-1) | (H2-1) | (H2-1) | (H2-1) | (H2-1) |
| | Thickness μm | 22 | 22 | 22 | 22 | 15 | 18 |
| | Predrying temperature ° C. | 90 | 90 | 90 | 90 | 90 | 90 |
| | Predrying time min. | 1 | 1 | 1 | 1 | 1 | 1 |
| | Preheating in irradiation ° C. | 90 | 90 | 90 | 90 | 90 | 90 |
| | Integrated amount of light mJ/cm² | 80 | 80 | 80 | 80 | 80 | 80 |
| | Transparent resin film | (P-1) | (P-1) | (P-1) | (P-1) | (P-1) | (P-1) |
| Evaluation results | Total light transmittance % | 90.9 | 90.9 | 90.9 | 90.9 | 91.1 | 90.8 |
| | Haze % | 0.2 | 0.2 | 0.4 | 0.9 | 0.2 | 0.2 |
| | Yellowness index | 0.3 | 0.3 | 0.3 | 0.3 | 0.3 | 0.3 |
| | Water contact angle deg | 116 | 116 | 116 | 116 | 116 | 116 |
| | Abrasion resistance 1 | B | A | A | A | A | A |
| | Abrasion resistance 2 | B | A | A | A | A | A |
| | Pencil hardness | 5H | 7H | 7H | 7H | 5H | 7H |
| | Surface smoothness | ◎ | ◎ | ◎ | ◎ | ◎ | ◎ |
| | Cross-cut test | Class 0 | Class 0 | Class 0 | Class 2 | Class 0 | Class 0 |
| | Minimum bending radius mm | 30 | 30 | 30 | 40 | 20 | 30 |
| | Cross-cut test | ◎-◎ | ◎-◎ | ◎-◎ | ◎-◎ | ◎-◎ | ◎-◎ |
| | Shrinkage-starting temperature ° C. | 140 | 140 | 140 | 140 | 140 | 140 |

TABLE 11

Measurement/evaluation results of physical properties of hard coat laminated film

| | | Example 42 | Example 43 | Example 44 | Example 1 | Example 45 | Example 46 |
|---|---|---|---|---|---|---|---|
| First hard coat | Coating material | (H1-1) | (H1-1) | (H1-1) | (H1-1) | (H1-1) | (H1-1) |
| | Thickness μm | 2 | 2 | 2 | 2 | 2 | 2 |
| | Predrying temperature ° C. | 80 | 80 | 80 | 80 | 80 | 80 |
| | Predrying time min. | 1 | 1 | 1 | 1 | 1 | 1 |
| | Preheating in irradiation ° C. | 60 | 60 | 60 | 60 | 60 | 60 |
| | Integrated amount of light mJ/cm² | 480 | 480 | 480 | 480 | 480 | 480 |
| Second hard coat | Coating material | (H2-1) | (H2-1) | (H2-1) | (H2-1) | (H2-1) | (H2-1) |
| | Thickness μm | 25 | 35 | 22 | 22 | 22 | 22 |
| | Predrying temperature ° C. | 90 | 90 | 90 | 90 | 90 | 90 |
| | Predrying time min. | 1 | 1 | 1 | 1 | 1 | 1 |
| | Preheating in irradiation ° C. | 90 | 90 | 90 | 90 | 90 | 90 |
| | Integrated amount of light mJ/cm² | 80 | 80 | 30 | 80 | 120 | 160 |
| | Transparent resin film | (P-1) | (P-1) | (P-1) | (P-1) | (P-1) | (P-1) |
| Evaluation results | Total light transmittance % | 90.5 | 90.0 | 90.9 | 90.9 | 90.9 | 90.9 |
| | Haze % | 0.2 | 0.2 | 0.2 | 0.2 | 0.2 | 0.2 |
| | Yellowness index | 0.3 | 0.3 | 0.3 | 0.3 | 0.3 | 0.3 |
| | Water contact angle deg | 116 | 116 | 116 | 116 | 116 | 116 |
| | Abrasion resistance 1 | A | A | A | A | A | A |
| | Abrasion resistance 2 | A | A | A | A | A | A |
| | Pencil hardness | 7H | 9H | 7H | 7H | 7H | 7H |
| | Surface smoothness | ◎ | ◎ | ◎ | ◎ | ◎ | ◎ |
| | Cross-cut test | Class 0 | Class 0 | Class 0 | Class 0 | Class 0 | Class 1 |
| | Minimum bending radius mm | 35 | 70 | 30 | 30 | 30 | 30 |
| | Cross-cut test | ◎-◎ | ◎-◎ | ◎-◎ | ◎-◎ | ◎-◎ | ◎-◎ |
| | Shrinkage-starting temperature ° C. | 140 | 140 | 140 | 140 | 140 | 140 |

TABLE 12

Measurement/evaluation results of physical properties of hard coat laminated film

| | | Example 47 | Example 48 | Example 49 | Example 50 | Example 51 | Example 52 |
|---|---|---|---|---|---|---|---|
| First hard coat | Coating material | (H1-1) | (H1-1) | (H1-1) | (H1-1) | (H1-1) | (H1-1) |
| | Thickness μm | 2 | 2 | 2 | 2 | 2 | 2 |
| | Predrying temperature ° C. | 80 | 80 | 80 | 80 | 80 | 80 |
| | Predrying time min. | 1 | 1 | 1 | 1 | 1 | 1 |
| | Preheating in irradiation ° C. | 60 | 60 | 40 | 80 | 40 | 80 |

TABLE 12-continued

Measurement/evaluation results of physical properties of hard coat laminated film

| | | Example 47 | Example 48 | Example 49 | Example 50 | Example 51 | Example 52 |
|---|---|---|---|---|---|---|---|
| | Integrated amount of light mJ/cm$^2$ | 480 | 480 | 480 | 480 | 480 | 480 |
| Second hard coat | Coating material | (H2-1) | (H2-1) | (H2-1) | (H2-1) | (H2-1) | (H2-1) |
| | Thickness μm | 22 | 22 | 22 | 22 | 22 | 22 |
| | Predrying temperature °C | 90 | 90 | 90 | 90 | 90 | 90 |
| | Predrying time min. | 1 | 1 | 1 | 1 | 1 | 1 |
| | Preheating in irradiation °C | 90 | 90 | 90 | 90 | 90 | 90 |
| | Integrated amount of light mJ/cm$^2$ | 230 | 300 | 80 | 80 | 120 | 120 |
| | Transparent resin film | (P-1) | (P-1) | (P-1) | (P-1) | (P-1) | (P-1) |
| Evaluation results | Total light transmittance % | 90.9 | 90.9 | 90.9 | 90.9 | 90.9 | 90.9 |
| | Haze % | 0.2 | 0.2 | 0.2 | 0.2 | 0.2 | 0.2 |
| | Yellowness index | 0.3 | 0.3 | 0.3 | 0.3 | 0.3 | 0.3 |
| | Water contact angle deg | 116 | 116 | 110 | 116 | 110 | 116 |
| | Abrasion resistance 1 | A | A | A | A | A | A |
| | Abrason resistance 2 | A | A | A | A | A | A |
| | Pencil hardness | 7H | 7H | 7H | 7H | 7H | 7H |
| | Surface smoothness | ◎ | ◎ | ◎ | ◎ | ◎ | ◎ |
| | Cross-cut test | Class 3 | Class 4 | Class 0 | Class 0 | Class 1 | Class 1 |
| | Minimum bending radius mm | 30 | 30 | 30 | 30 | 30 | 30 |
| | Cross-cut test | ◎-◎ | ◎-◎ | ◎-◎ | ◎-◎ | ◎-◎ | ◎-◎ |
| | Shrinkage-starting temperature °C | 140 | 140 | 140 | 140 | 140 | 140 |

TABLE 13

Measurement/evaluation results of physical properties of hard coat laminated film

| | | Example 53 | Example 54 | Example 55 | Example 56 | Example 57 | Example 58 |
|---|---|---|---|---|---|---|---|
| First hard coat | Coating material | (H1-1) | (H1-1) | (H1-1) | (H1-1) | (H1-1) | (H1-1) |
| | Thickness μm | 2 | 2 | 2 | 2 | 2 | 2 |
| | Predrying temperature °C | 80 | 80 | 80 | 80 | 80 | 80 |
| | Predrying time min. | 1 | 1 | 1 | 1 | 1 | 1 |
| | Preheating in irradiation °C | 25 | 40 | 80 | 110 | 40 | 80 |
| | Integrated amount of light mJ/cm$^2$ | 480 | 480 | 480 | 480 | 480 | 480 |
| Second hard coat | Coating material | (H2-1) | (H2-1) | (H2-1) | (H2-1) | (H2-1) | (H2-1) |
| | Thickness μm | 22 | 22 | 22 | 22 | 22 | 22 |
| | Predrying temperature °C | 90 | 90 | 90 | 90 | 90 | 90 |
| | Predrying time min. | 1 | 1 | 1 | 1 | 1 | 1 |
| | Preheating in irradiation °C | 90 | 90 | 90 | 90 | 90 | 90 |
| | Integrated amount of light mJ/cm$^2$ | 160 | 160 | 160 | 160 | 230 | 230 |
| | Transparent resin film | (P-1) | (P-1) | (P-1) | (P-1) | (P-1) | (P-1) |
| Evaluation results | Total light transmittance % | 90.9 | 90.9 | 90.9 | 90.9 | 90.9 | 90.9 |
| | Haze % | 0.2 | 0.2 | 0.2 | 0.2 | 0.2 | 0.2 |
| | Yellowness index | 0.3 | 0.3 | 0.3 | 0.3 | 0.3 | 0.3 |
| | Water contact angle deg | 110 | 110 | 116 | 110 | 110 | 116 |
| | Abrasion resistance 1 | A | A | A | A | A | A |
| | Abrason resistance 2 | A | A | A | A | A | A |
| | Pencil hardness | 7H | 7H | 7H | 7H | 7H | 7H |
| | Surface smoothness | ◎ | ◎ | ◎ | ◎ | ◎ | ◎ |
| | Cross-cut test | Class 5 | Class 2 | Class 2 | Class 5 | Class 3 | Class 3 |
| | Minimum bending radius mm | 30 | 30 | 30 | 30 | 30 | 30 |
| | Cross-cut test | ◎-◎ | ◎-◎ | ◎-◎ | ◎-◎ | ◎-◎ | ◎-◎ |
| | Shrinkage-starting temperature °C | 140 | 140 | 140 | 140 | 140 | 140 |

It was found from these results that each of the hard coat laminated films according to the invention was excellent in balance among transparency, color tone, abrasion resistance, surface hardness and surface appearance. Therefore, these hard coat laminated films can be suitably used for a display faceplate in an image display device with a touch panel function.

II. Examples of Method for Producing Hard Coat Laminated Film

For components (A) to (F), the above-described substances were used.

(Hα) Coating material α:

(Hα-1) A coating material was obtained by mixing and stirring 100 parts by mass of the (A-2), 140 parts by mass of the (D-1), 2 parts by mass (0.2 parts by mass in terms of solid content) of the (E-1), 17 parts by mass of the (F-1) and 200 parts by mass of the (F-2). The formulation is shown in Table 14. Note that values in terms of solid content are listed for the (E-1) in the table.

(Hα-2 to Hα-14) Each coating material was obtained in the same way as in the (Hα-1) except that the components and their ratio were changed as shown in Table 14 or Table 15.

TABLE 14

Formulations (1) of coating material α

| Component (parts by mass) | Hα-1 | Hα-2 | Hα-3 | Hα-4 | Hα-5 | Hα-6 | Hα-7 |
|---|---|---|---|---|---|---|---|
| (A-2) | 100 | 100 | 100 | 100 | 100 | 100 | 100 |
| (D-1) | 140 | 140 | 140 | 140 | 140 | 140 | 140 |
| (E-1) | 0.2 | — | 0.1 | 0.4 | 0.6 | 1.5 | — |
| (E-2) | — | — | — | — | — | — | 0.2 |
| (E-3) | — | — | — | — | — | — | — |
| (E-4) | — | — | — | — | — | — | — |
| (F-1) | 17 | 17 | 17 | 17 | 17 | 17 | 17 |
| (F-2) | 200 | 200 | 200 | 200 | 200 | 200 | 200 |

TABLE 15

Formulations (2) of coating material α

| Component (parts by mass) | Hα-8 | Hα-9 | Hα-10 | Hα-11 | Hα-12 | Hα-13 | Hα-14 |
|---|---|---|---|---|---|---|---|
| (A-2) | — | 100 | 100 | 100 | 100 | 100 | 100 |
| (D-1) | 140 | 140 | 140 | 80 | 200 | 30 | 400 |
| (E-1) | — | — | — | 0.2 | 0.2 | 0.2 | 0.2 |
| (E-2) | 0.4 | — | — | — | — | — | — |
| (E-3) | — | 0.3 | — | — | — | — | — |
| (E-4) | — | — | 0.3 | — | — | — | — |
| (F-1) | 17 | 17 | 17 | 17 | 17 | 17 | 17 |
| (F-2) | 200 | 200 | 200 | 155 | 250 | 120 | 420 |

(Hβ) Coating Material β:

(Hβ-1) A coating material was obtained by mixing and stirring 100 parts by mass of the (A-1), 2 parts by mass (0.40 parts by mass in terms of solid content) of the (B-1), 0.06 parts by mass (0.042 parts by mass in terms of solid content) of the (B-2), 0.5 parts by mass of the (C-1), 4 parts by mass of the (F-1) and 100 parts by mass of the (F-2). The formation is shown in Table 16. Note that values in terms of solid content are listed for the (B-1) and the component (B-2) in the table.

(Hβ-2 to Hβ-16) Each coating material was obtained in the same way as in the (Hβ-1) except that the components and their ratio were changed as shown in Table 16 or Table 17.

TABLE 16

Formulations (1) of coating material β

| Component (parts by mass) | Hβ-1 | Hβ-2 | Hβ-3 | Hβ-4 | Hβ-5 | Hβ-6 | Hβ-7 | Hβ-8 |
|---|---|---|---|---|---|---|---|---|
| (A-1) | 100 | 100 | 100 | 100 | 100 | 100 | 100 | 100 |
| (B-1) | 0.40 | 0.080 | 0.80 | 2.0 | — | 8.0 | 0.40 | 0.40 |
| (B-2) | 0.042 | 0.0084 | 0.084 | 0.21 | — | 0.84 | 0.042 | 0.042 |
| (C-1) | 0.5 | 0.5 | 0.5 | 0.5 | 0.5 | 0.5 | 0.5 | — |
| (C-2) | — | — | — | — | — | — | — | — |
| (C-3) | — | — | — | — | — | — | — | — |
| (C-4) | — | — | — | — | — | — | — | — |
| (C-5) | — | — | — | — | — | — | — | — |
| (D-1) | — | — | — | — | — | — | 20 | — |
| (F-1) | 4 | 4 | 4 | 4 | 4 | 4 | 4 | 4 |
| (F-2) | 100 | 100 | 100 | 100 | 100 | 80 | 130 | 100 |

TABLE 17

Formulations (2) of coating material β

| Component (parts by mass) | Hβ-9 | Hβ-10 | Hβ-11 | Hβ-12 | Hβ-13 | Hβ-14 | Hβ-15 | Hβ-16 |
|---|---|---|---|---|---|---|---|---|
| (A-1) | 100 | 100 | 100 | 100 | 100 | 100 | 100 | 100 |
| (B-1) | 0.40 | 0.40 | 0.40 | 0.40 | 0.40 | 0.40 | 0.40 | 0.40 |
| (B-2) | 0.042 | 0.042 | 0.042 | 0.042 | 0.042 | 0.042 | 0.042 | 0.042 |
| (C-1) | 0.01 | 0.1 | 1 | 5 | — | — | — | — |
| (C-2) | — | — | — | — | 0.5 | — | — | — |
| (C-3) | — | — | — | — | — | 0.5 | — | — |
| (C-4) | — | — | — | — | — | — | 0.5 | — |
| (C-5) | — | — | — | — | — | — | — | 0.5 |
| (D-1) | — | — | — | — | — | — | — | — |
| (F-1) | 4 | 4 | 4 | 4 | 4 | 4 | 4 | 4 |
| (F-2) | 100 | 100 | 100 | 105 | 100 | 100 | 100 | 100 |

(P) Transparent Resin Film:

(P-1) Using an apparatus provided with a two-component/three-layer multimanifold-type coextrusion T-die and a winder having a mechanism to pressurize a melted film with a mirror-finished roll and a mirror-finished belt, a two-component/three-layer multilayer resin film in which both outer layers (P1 layer and P2 layer) were formed of the poly(meth)acrylimide "PLEXIMID TT50" (trade name) available from Evonik Industry AG and the intermediate layer (Q layer) was formed of an aromatic polycarbonate "CALIBRE 301-4" (trade name) available from Sumika Styron Polycarbonate Limited was continuously coextruded from the coextrusion T-die, and the coextruded product was fed between the rotating mirror-finished roll and the mirror-finished belt circulating along the outer periphery surface of the mirror-finished roll so that the P1 layer was on the mirror-finished roll side, and pressurized. As a result, a transparent resin film having a total thickness of 250 µm was obtained in which the layer thickness of the P1 layer was 80 µm, the layer thickness of the Q layer was 90 µm and the layer thickness of the P2 layer was 80 µm. Regarding the conditions set for this operation, the temperature of the T-die, the temperature of the mirror-finished roll, the temperature of the mirror-finished belt and the wind-up speed were set to 300° C., 130° C., 120° C. and 6.5 m/min, respectively.

(P-2) A transparent resin film was obtained in the same way as in the (P-1) except that the layer thickness ratio was changed so that the layer thickness of the P1 layer, the layer thickness of the Q layer and the layer thickness of the P2 layer were 60 µm, 130 µm and 60 µm, respectively.

(P-3) A transparent resin film was obtained in the same way as in the (P-1) except that the layer thickness ratio was changed so that the layer thickness of the P1 layer, the layer thickness of the Q layer and the layer thickness of the P2 layer were 40 µm, 170 µm and 40 µm, respectively.

(P-4) A biaxially oriented polyethylene terephthalate film "DIAFOIL" (trade name) available from Mitsubishi Plastics, Inc.: thickness 250 µm.

(P-5) An acrylic resin film "TECHNOLLOY S001G" (trade name) available from Sumitomo Chemical Co., Ltd.: thickness 250 µm.

(P-6) Using an apparatus provided with a monolayer T-die and a winder having a mechanism to pressurize a melted film with a mirror-finished roll and a mirror-finished belt, an aromatic polycarbonate "CALIBRE 301-4" (trade name) available from Sumika Styron Polycarbonate Limited was continuously extruded from the T-die, and the extruded product was fed between the rotating mirror-finished roll and the mirror-finished belt circulating along the outer periphery surface of the mirror-finished roll, and pressurized. As a result, a transparent resin film having a total thickness of 250 µm was obtained. Regarding the conditions set for this operation, the temperature of the T-die, the temperature of the mirror-finished roll, the temperature of the mirror-finished belt and the wind-up speed were set to 320° C., 140° C., 120° C. and 5.6 m/min, respectively.

Example 59

Both surfaces of the (P-1) were subjected to a corona discharge treatment. Both surfaces had a wetting index of 64 mN/m.

Subsequently, the surface on the P1 layer side was coated with the (Hα-1) by using a die-type applicator so that the wet coat thickness was 40 µm (thickness after curing: 22 µm) (Step (1)).

Next, the resultant was passed in a drying furnace with the inner temperature set to 90° C. at a line speed such that the time required to pass through from the inlet to the outlet was 1 minute.

Then, the resultant was treated with a curing apparatus (see FIG. 1) having a UV irradiator 1 of high-pressure mercury lamp type and a mirror-finished metal roll 2 having a diameter of 25.4 cm which were disposed opposite to each other, under conditions that the temperature of the mirror-finished metal roll was 90° C. and the integrated amount of light was 80 mJ/cm$^2$. As a result, the wet coat formed of the (Hα-1) became a coating film in a set-to-touch state (step (2)).

Subsequently, the coating film in a set-to-touch state formed of the (Hα-1) was coated with the (Hβ-1) by using a die-type applicator so that the wet coat thickness was 4 µm (thickness after curing: 2 µm) (step (3)).

Next, the resultant was passed in a drying furnace with the inner temperature set to 80° C. at a line speed such that the time required to pass through from the inlet to the outlet was 1 minute.

Then, the resultant was treated with a curing apparatus (see FIG. 1) having a UV irradiator 1 of high-pressure mercury lamp type and a mirror-finished metal roll 2 having a diameter of 25.4 cm which were disposed opposite to each other, under conditions that the temperature of the mirror-finished metal roll was 60° C. and the integrated amount of light was 480 mJ/cm$^2$ (step (4)).

Subsequently, a third hard coat was formed on the surface on the P2 layer side with the same coating material as in the step (1) (e.g., the (Hα2-1) in Example 59) by using a die-type applicator so that the thickness after curing was 22 µm, and as a result a hard coat laminated film was obtained. The tests (i) to (xii) were performed for it. The results are shown in Table 18.

Examples 60, 61

Each hard coat laminated film was prepared and measurement/evaluation of the physical properties was performed totally in the same way as in Example 59 except that the temperature of the mirror-finished metal roll in the step (4) was changed to a condition listed in Table 18. The results are shown in Table 18.

Examples 62, 63

Each hard coat laminated film was prepared and measurement/evaluation of the physical properties was performed totally in the same way as in Example 59 except that the integrated amount of light in the step (2) was changed to 120 mJ/cm$^2$ and the temperature of the mirror-finished metal roll in the step (4) was changed to a condition listed in Table 18. The results are shown in Table 18.

Examples 64 to 65, 66 to 67

Each hard coat laminated film was prepared and measurement/evaluation of the physical properties was performed totally in the same way as in Example 59 except that the integrated amount of light in the step (2) was changed to 160 mJ/cm$^2$ and the temperature of the mirror-finished metal roll in the step (4) was changed to a condition listed in Table 18 or 19. The results are shown in Table 18 or 19.

Examples 68, 69

Each hard coat laminated film was prepared and measurement/evaluation of the physical properties was performed totally in the same way as in Example 59 except that the integrated amount of light in the step (2) was changed to 230 mJ/cm² and the temperature of the mirror-finished metal roll in the step (4) was changed to a condition listed in Table 19. The results are shown in Table 19.

Examples 70 to 73, 74

Each hard coat laminated film was prepared and measurement/evaluation of the physical properties was performed totally in the same way as in Example 59 except that the integrated amount of light in the step (2) was changed to a condition listed in Table 19 or Table 20. The results are shown in Table 19 and Table 20.

Examples 75 to 78

Each hard coat laminated film was prepared and measurement/evaluation of the physical properties was performed totally in the same way as in Example 59 except that the thickness after curing of the hard coat formed of the coating material α was changed as shown in Table 20 or Table 21 and the thickness after curing of the third hard coat was changed to the same thickness after curing as the hard coat formed of the coating material α. The results are shown in Table 20 and Table 21.

Examples 79 to 82

Each hard coat laminated film was prepared and measurement/evaluation of the physical properties was performed totally in the same way as in Example 59 except that the thickness after curing of the hard coat formed of the coating material β was changed as shown in Table 21. The results are shown in Table 21.

Examples 83 to 115

Each hard coat laminated film was prepared and measurement/evaluation of the physical properties was performed totally in the same way as in Example 59 except that at least one of the coating material α, the coating material β and the transparent resin film used was changed as shown in one of Tables 22 to 26. The results are shown in Tables 22 to 26.

TABLE 18

Measurement/evaluation results of physical properties of hard coat laminated film

|  |  | Example 59 | Example 60 | Example 61 | Example 62 | Example 63 | Example 64 |
|---|---|---|---|---|---|---|---|
|  | Coating material α | (Hα-1) | (Hα-1) | (Hα-1) | (Hα-1) | (Hα-1) | (Hα-1) |
|  | Wet coat thickness μm in step (1) | 40 | 40 | 40 | 40 | 40 | 40 |
|  | Thickness μm after curing | 22 | 22 | 22 | 22 | 22 | 22 |
|  | Predrying temperature ° C. | 90 | 90 | 90 | 90 | 90 | 90 |
|  | Predrying time min. | 1 | 1 | 1 | 1 | 1 | 1 |
|  | Roll temperature ° C. in step (2) | 90 | 90 | 90 | 90 | 90 | 90 |
|  | Integrated amount of light in step (2) mJ/cm² | 80 | 80 | 80 | 120 | 120 | 160 |
|  | Coating material β | (Hβ-1) | (Hβ-1) | (Hβ-1) | (Hβ-1) | (Hβ-1) | (Hβ-1) |
|  | Wet coat thickness μm in step (3) | 4 | 4 | 4 | 4 | 4 | 4 |
|  | Thickness μm after curing | 2 | 2 | 2 | 2 | 2 | 2 |
|  | Predrying temperature ° C. | 80 | 80 | 80 | 80 | 80 | 80 |
|  | Predrying time min. | 1 | 1 | 1 | 1 | 1 | 1 |
|  | Roll temperature ° C. in step (4) | 60 | 40 | 80 | 40 | 80 | 40 |
|  | Integrated amount of light in step (4) mJ/cm² | 480 | 480 | 480 | 480 | 480 | 480 |
|  | Transparent resin film | (P-1) | (P-1) | (P-1) | (P-1) | (P-1) | (P-1) |
| Evaluation results | Total light transmittance % | 90.9 | 90.9 | 90.9 | 90.9 | 90.9 | 90.9 |
|  | Haze % | 0.2 | 0.2 | 0.2 | 0.2 | 0.2 | 0.2 |
|  | Yellowness index | 0.3 | 0.3 | 0.3 | 0.3 | 0.3 | 0.3 |
|  | Water contact angle deg | 116 | 110 | 116 | 110 | 116 | 110 |
|  | Abrasion resistance 1 | A | A | A | A | A | A |
|  | Abrasion resistance 2 | A | A | A | A | A | A |
|  | Pencil hardness | 7H | 7H | 7H | 7H | 7H | 7H |
|  | Surface smoothness | ◎ | ◎ | ◎ | ◎ | ◎ | ◎ |
|  | Cross-cut test | Class 0 | Class 0 | Class 0 | Class 1 | Class 1 | Class 2 |
|  | Minimum bending radius mm | 30 | 30 | 30 | 30 | 30 | 30 |
|  | Cutting processability | ◎-◯ | ◎-◯ | ◎-◯ | ◎-◯ | ◎-◯ | ◎-◯ |
|  | Shrinkage-starting temperature ° C. | 140 | 140 | 140 | 140 | 140 | 140 |

TABLE 19

Measurement/evaluation results of physical properties of hard coat laminated film

|  | Example 65 | Example 66 | Example 67 | Example 68 | Example 69 | Example 70 |
|---|---|---|---|---|---|---|
| Coating material α | (Hα-1) | (Hα-1) | (Hα-1) | (Hα-1) | (Hα-1) | (Hα-1) |
| Wet coat thickness μm in step (1) | 40 | 40 | 40 | 40 | 40 | 40 |
| Thickness μm after curing | 22 | 22 | 22 | 22 | 22 | 22 |
| Predrying temperature ° C. | 80 | 90 | 90 | 90 | 90 | 90 |
| Predrying time min. | 1 | 1 | 1 | 1 | 1 | 1 |

TABLE 19-continued

Measurement/evaluation results of physical properties of hard coat laminated film

|  |  | Example 65 | Example 66 | Example 67 | Example 68 | Example 69 | Example 70 |
|---|---|---|---|---|---|---|---|
|  | Roll temperature ° C. in step (2) | 90 | 90 | 90 | 90 | 90 | 90 |
|  | Integrated amount of light in step (2) mJ/cm² | 160 | 160 | 160 | 230 | 230 | 120 |
|  | Coating material β | (Hβ-1) | (Hβ-1) | (Hβ-1) | (Hβ-1) | (Hβ-1) | (Hβ-1) |
|  | Wet coat thickness μm in step (3) | 4 | 4 | 4 | 4 | 4 | 4 |
|  | Thickness μm after curing | 2 | 2 | 2 | 2 | 2 | 2 |
|  | Predrying temperature ° C. | 80 | 80 | 80 | 80 | 80 | 80 |
|  | Predrying time min. | 1 | 1 | 1 | 1 | 1 | 1 |
|  | Roll temperature ° C. in step (4) | 80 | 25 | 110 | 40 | 80 | 60 |
|  | Integrated amount of light in step (4) mJ/cm² | 480 | 480 | 480 | 480 | 480 | 480 |
|  | Transparent resin film | (P-1) | (P-1) | (P-1) | (P-1) | (P-1) | (P-1) |
| Evaluation results | Total light transmittance % | 90.9 | 90.9 | 90.9 | 90.9 | 90.9 | 90.9 |
|  | Haze % | 0.2 | 0.2 | 0.2 | 0.2 | 0.2 | 0.2 |
|  | Yellowness index | 0.3 | 0.3 | 0.3 | 0.3 | 0.3 | 0.3 |
|  | Water contact angle deg | 116 | 110 | 110 | 110 | 116 | 116 |
|  | Abrasion resistance 1 | A | A | A | A | A | A |
|  | Abrasion resistance 2 | A | A | A | A | A | A |
|  | Pencil hardness | 7H | 7H | 7H | 7H | 7H | 7H |
|  | Surface smoothness | ◎ | ◎ | ◎ | ◎ | ◎ | ◎ |
|  | Cross-cut test | Class 2 | Class 5 | Class 5 | Class 3 | Class 3 | Class 0 |
|  | Minimum bending radius mm | 30 | 30 | 30 | 30 | 30 | 30 |
|  | Cutting processability | ◎-○ | ◎-○ | ◎-○ | ◎-○ | ◎-○ | ◎-○ |
|  | Shrinkage-starting temperature ° C. | 140 | 140 | 140 | 140 | 140 | 140 |

TABLE 20

Measurement/evaluation results of physical properties of hard coat laminated film

|  |  | Example 71 | Example 72 | Example 73 | Example 74 | Example 75 | Example 76 |
|---|---|---|---|---|---|---|---|
|  | Coating material α | (Hα-1) | (Hα-1) | (Hα-1) | (Hα-1) | (Hα-1) | (Hα-1) |
|  | Wet coat thickness μm in step (1) | 40 | 40 | 40 | 40 | 27 | 32 |
|  | Thickness μm after curing | 22 | 22 | 22 | 22 | 15 | 18 |
|  | Predrying temperature ° C. | 90 | 90 | 90 | 90 | 90 | 90 |
|  | Predrying time min. | 1 | 1 | 1 | 1 | 1 | 1 |
|  | Roll temperature ° C. in step (2) | 90 | 90 | 90 | 90 | 90 | 90 |
|  | Integrated amount of light in step (2) mJ/cm² | 160 | 230 | 30 | 480 | 80 | 80 |
|  | Coating material β | (Hβ-1) | (Hβ-1) | (Hβ-1) | (Hβ-1) | (Hβ-1) | (Hβ-1) |
|  | Wet coat thickness μm in step (3) | 4 | 4 | 4 | 4 | 4 | 4 |
|  | Thickness μm after curing | 2 | 2 | 2 | 2 | 2 | 2 |
|  | Predrying temperature ° C. | 80 | 80 | 80 | 80 | 80 | 80 |
|  | Predrying time min. | 1 | 1 | 1 | 1 | 1 | 1 |
|  | Roll temperature ° C. in step (4) | 60 | 60 | 60 | 60 | 60 | 60 |
|  | Integrated amount of light in step (4) mJ/cm² | 480 | 480 | 480 | 480 | 480 | 480 |
|  | Transparent resin film | (P-1) | (P-1) | (P-1) | (P-1) | (P-1) | (P-1) |
| Evaluation results | Total light transmittance % | 90.9 | 90.9 | 90.9 | 90.9 | 91.1 | 90.8 |
|  | Haze % | 0.2 | 0.2 | 0.2 | 0.2 | 0.2 | 0.2 |
|  | Yellowness index | 0.3 | 0.3 | 0.3 | 0.3 | 0.3 | 0.3 |
|  | Water contact angle deg | 116 | 116 | 116 | 116 | 116 | 116 |
|  | Abrasion resistance 1 | A | A | A | A | A | A |
|  | Abrasion resistance 2 | A | A | A | A | A | A |
|  | Pencil hardness | 7H | 7H | 7H | 7H | 5H | 7H |
|  | Surface smoothness | ◎ | ◎ | ◎ | ◎ | ◎ | ◎ |
|  | Cross-cut test | Class 1 | Class 3 | Class 0 | Class 5 | Class 0 | Class 0 |
|  | Minimum bending radius mm | 30 | 30 | 30 | 30 | 20 | 30 |
|  | Cutting processability | ◎-○ | ◎-○ | ◎-○ | ◎-○ | ◎-○ | ◎-○ |
|  | Shrinkage-starting temperature ° C. | 140 | 140 | 140 | 140 | 140 | 140 |

TABLE 21

Measurement/evaluation results of physical properties of hard coat laminated film

|  |  | Example 77 | Example 78 | Example 79 | Example 80 | Example 81 | Example 82 |
|---|---|---|---|---|---|---|---|
|  | Coating material α | (Hα-1) | (Hα-1) | (Hα-1) | (Hα-1) | (Hα-1) | (Hα-1) |
|  | Wet coat thickness μm in step (1) | 45 | 62 | 40 | 40 | 40 | 40 |
|  | Thickness μm after curing | 25 | 35 | 22 | 22 | 22 | 22 |
|  | Predrying temperature ° C. | 90 | 90 | 90 | 90 | 90 | 90 |
|  | Predrying time min. | 1 | 1 | 1 | 1 | 1 | 1 |
|  | Roll temperature ° C. in step (2) | 90 | 90 | 90 | 90 | 90 | 90 |
|  | Integrated amount of light in step (2) mJ/cm$^2$ | 80 | 80 | 80 | 80 | 80 | 80 |
|  | Coating material β | (Hβ-1) | (Hβ-1) | (Hβ-1) | (Hβ-1) | (Hβ-1) | (Hβ-1) |
|  | Wet coat thickness μm in step (3) | 4 | 4 | 1 | 2 | 6 | 10 |
|  | Thickness μm after curing | 2 | 2 | 0.5 | 1 | 3 | 5 |
|  | Predrying temperature ° C. | 80 | 80 | 80 | 80 | 80 | 80 |
|  | Predrying time min. | 1 | 1 | 1 | 1 | 1 | 1 |
|  | Roll temperature ° C. in step (4) | 60 | 60 | 60 | 60 | 60 | 60 |
|  | Integrated amount of light in step (4) mJ/cm$^2$ | 480 | 480 | 480 | 480 | 480 | 480 |
|  | Transparent resin film | (P-1) | (P-1) | (P-1) | (P-1) | (P-1) | (P-1) |
| Evaluation results | Total light transmittance % | 90.5 | 90.0 | 90.9 | 90.9 | 90.9 | 90.9 |
|  | Haze % | 0.2 | 0.2 | 0.2 | 0.2 | 0.4 | 0.9 |
|  | Yellowness index | 0.3 | 0.3 | 0.3 | 0.3 | 0.3 | 0.3 |
|  | Water contact angle deg | 116 | 116 | 116 | 116 | 116 | 116 |
|  | Abrasion resistance 1 | A | A | B | A | A | A |
|  | Abrasion resistance 2 | A | A | B | A | A | A |
|  | Pencil hardness | 7H | 9H | 5H | 7H | 7H | 7H |
|  | Surface smoothness | ◎ | ◎ | ◎ | ◎ | ◎ | ◎ |
|  | Cross-cut test | Class 0 | Class 0 | Class 0 | Class 0 | Class 0 | Class 2 |
|  | Minimum bending radius mm | 35 | 70 | 30 | 30 | 30 | 40 |
|  | Cutting processability | ◎-○ | ◎-○ | ◎-○ | ◎-○ | ◎-○ | ◎-○ |
|  | Shrinkage-starting temperature ° C. | 140 | 140 | 140 | 140 | 140 | 140 |

TABLE 22

Measurement/evaluation results of physical properties of hard coat laminated film

|  |  | Example 1 | Example 83 | Example 84 | Example 85 | Example 86 | Example 87 | Example 88 |
|---|---|---|---|---|---|---|---|---|
| Configuration | Coating material β | (Hβ-1) | (Hβ-2) | (Hβ-3) | (Hβ-4) | (Hβ-5) | (Hβ-6) | (Hβ-7) |
|  | Coating material α | (Hα-1) | (Hα-1) | (Hα-1) | (Hα-1) | (Hα-1) | (Hα-1) | (Hα-1) |
|  | Transparent resin film | (P-1) | (P-1) | (P-1) | (P-1) | (P-1) | (P-1) | (P-1) |
| Evaluation results | Total light transmittance % | 90.9 | 90.9 | 90.8 | 90.4 | 90.9 | 89.8 | 90.1 |
|  | Haze % | 0.2 | 0.1 | 0.3 | 1.3 | 0.1 | 3.5 | 0.3 |
|  | Yellowness index | 0.3 | 0.3 | 0.3 | 0.3 | 0.3 | 0.3 | 0.3 |
|  | Water contact angle deg | 116 | 115 | 116 | 118 | 72.1 | 119 | 116 |
|  | Abrasion resistance 1 | A | B | A | A | E | A | E |
|  | Abrasion resistance 2 | A | A | A | A | D | A | F |
|  | Pencil hardness | 7H | 7H | 7H | 7H | 5H | 7H | 7H |
|  | Surface smoothness | ◎ | ◎ | ◎ | ◎ | ◎ | ◎ | ◎ |
|  | Cross-cut test | Class 0 | Class 0 | Class 0 | Class 0 | Class 0 | Class 0 | Class 0 |
|  | Minimum bending radius mm | 30 | 30 | 30 | 30 | 30 | 30 | 30 |
|  | Cutting processability | ◎-○ | ◎-○ | ◎-○ | ◎-○ | ◎-○ | ◎-○ | ◎-○ |
|  | Shrinkage-starting temperature ° C. | 140 | 140 | 140 | 140 | 140 | 140 | 140 |

TABLE 23

Measurement/evaluation results of physical properties of hard coat laminated film

|  |  | Example 89 | Example 90 | Example 91 | Example 92 | Example 93 | Example 94 | Example 95 |
|---|---|---|---|---|---|---|---|---|
| Configuration | Coating material β | (Hβ-8) | (Hβ-9) | (Hβ-10) | (Hβ-11) | (Hβ-12) | (Hβ-13) | (Hβ-14) |
|  | Coating material α | (Hα-1) | (Hα-1) | (Hα-1) | (Hα-1) | (Hα-1) | (Hα-1) | (Hα-1) |
|  | Transparent resin film | (P-1) | (P-1) | (P-1) | (P-1) | (P-1) | (P-1) | (P-1) |
| Evaluation results | Total light transmittance % | 90.9 | 90.9 | 90.9 | 90.9 | 90.9 | 90.9 | 90.9 |
|  | Haze % | 0.2 | 0.2 | 0.2 | 0.2 | 0.2 | 0.2 | 0.2 |
|  | Yellowness index | 0.3 | 0.3 | 0.3 | 0.3 | 0.3 | 0.3 | 0.3 |

TABLE 23-continued

Measurement/evaluation results of physical properties of hard coat laminated film

|  | | Example 89 | Example 90 | Example 91 | Example 92 | Example 93 | Example 94 | Example 95 |
|---|---|---|---|---|---|---|---|---|
| | Water contact angle deg | 116 | 116 | 116 | 116 | 116 | 116 | 116 |
| | Abrasion resistance 1 | A | A | A | A | A | A | A |
| | Abrasion resistance 2 | A | A | A | A | A | A | A |
| | Pencil hardness | 7H | 7H | 7H | 7H | 7H | 7H | 7H |
| | Surface smoothness | ◉ | ◉ | ◉ | ◉ | ◉ | ◉ | ◉ |
| | Cross-cut test | Class 4 | Class 1 | Class 0 | Class 0 | Class 0 | Class 0 | Class 0 |
| | Minimum bending radius mm | 30 | 30 | 30 | 30 | 30 | 30 | 30 |
| | Cutting processability | ◉-◯ | ◉-◯ | ◉-◯ | ◉-◯ | ◉-◯ | ◉-◯ | ◉-◯ |
| | Shrinkage-starting temperature ° C. | 140 | 140 | 140 | 140 | 140 | 140 | 140 |

TABLE 24

Measurement/evaluation results of physical properties of hard coat laminated film

|  | | Example 96 | Example 97 | Example 98 | Example 99 | Example 100 | Example 101 | Example 102 |
|---|---|---|---|---|---|---|---|---|
| Configuration | Coating material β | (Hβ-15) | (Hβ-16) | (Hβ-1) | (Hβ-1) | (Hβ-1) | (Hβ-1) | (Hβ-1) |
| | Coating material α | (Hα-1) | (Hα-1) | (Hα-2) | (Hα-3) | (Hα-4) | (Hα-5) | (Hα-6) |
| | Transparent resin film | (P-1) | (P-1) | (P-1) | (P-1) | (P-1) | (P-1) | (P-1) |
| Evaluation results | Total light transmittance % | 90.9 | 90.9 | 90.9 | 90.9 | 90.9 | 90.9 | 90.9 |
| | Haze % | 0.2 | 0.2 | 0.3 | 0.2 | 0.2 | 0.2 | 0.5 |
| | Yellowness index | 0.3 | 0.3 | 0.3 | 0.3 | 0.3 | 0.3 | 0.3 |
| | Water contact angle deg | 116 | 116 | 116 | 116 | 116 | 116 | 116 |
| | Abrasion resistance 1 | A | A | B | A | A | A | A |
| | Abrasion resistance 2 | A | A | B | A | A | A | A |
| | Pencil hardness | 7H | 7H | 7H | 7H | 7H | 7H | 7H |
| | Surface smoothness | ◉ | ◉ | ◯ | ◯ | ◉ | ◉ | ◉ |
| | Cross-cut test | Class 0 | Class 2 | Class 0 | Class 0 | Class 0 | Class 0 | Class 2 |
| | Minimum bending radius mm | 30 | 20 | 30 | 30 | 30 | 30 | 30 |
| | Cutting processability | ◉-◯ | ◉-◯ | ◉-◯ | ◉-◯ | ◉-◯ | ◉-◯ | ◉-◯ |
| | Shrinkage-starting temperature ° C. | 140 | 140 | 140 | 140 | 140 | 140 | 140 |

TABLE 25

Measurement/evaluation results of physical properties of hard coat laminated film

|  | | Example 103 | Example 104 | Example 105 | Example 106 | Example 107 | Example 108 | Example 109 |
|---|---|---|---|---|---|---|---|---|
| Configuration | Coating material β | (Hβ-1) | (Hβ-1) | (Hβ-1) | (Hβ-1) | (Hβ-1) | (Hβ-1) | (Hβ-1) |
| | Coating material α | (Hα-7) | (Hα-8) | (Hα-9) | (Hα-10) | (Hα-11) | (Hα-12) | (Hα-13) |
| | Transparent resin film | (P-1) | (P-1) | (P-1) | (P-1) | (P-1) | (P-1) | (P-1) |
| Evaluation results | Total light transmittance % | 90.9 | 90.0 | 90.9 | 90.9 | 91.1 | 90.0 | 91.1 |
| | Haze % | 0.2 | 0.2 | 0.5 | 0.5 | 0.2 | 0.6 | 0.1 |
| | Yellowness index | 0.3 | 0.3 | 0.3 | 0.3 | 0.3 | 0.3 | 0.3 |
| | Water contact angle deg | 116 | 116 | 116 | 116 | 116 | 116 | 116 |
| | Abrasion resistance 1 | A | A | A | A | A | A | A |
| | Abrasion resistance 2 | A | A | A | A | A | A | A |
| | Pencil hardness | 7H | 7H | 7H | 7H | 6H | 8H | 3H |
| | Surface smoothness | ◉ | ◉ | ◯ | ◉ | ◉ | ◉ | ◉ |
| | Cross-cut test | Class 0 | Class 0 | Class 0 | Class 2 | Class 0 | Class 0 | Class 0 |
| | Minimum bending radius mm | 30 | 30 | 30 | 30 | 20 | 40 | 20 |
| | Cutting processability | ◉-◯ | ◉-◯ | ◉-◯ | ◉-◯ | ◉-◯ | ◉-◯ | ◉-◯ |
| | Shrinkage-starting temperature ° C. | 140 | 140 | 140 | 140 | 140 | 140 | 140 |

TABLE 26

Measurement/evaluation results of physical properties of hard coat laminated film

|  | | Example 110 | Example 111 | Example 112 | Example 113 | Example 114 | Example 115 |
|---|---|---|---|---|---|---|---|
| Configuration | Coating material β | (Hβ-1) | (Hβ-1) | (Hβ-1) | (Hβ-1) | (Hβ-1) | (Hβ-1) |
| | Coating material α | (Hα-14) | (H2-1) | (H2-1) | (H2-1) | (H2-1) | (H2-1) |
| | Transparent resin film | (P-1) | (P-2) | (P-3) | (P-4) | (P-5) | (P-6) |
| Evaluation results | Total light transmittance % | 88.0 | 90.9 | 90.9 | 90.1 | 90.9 | 90.6 |
| | Haze % | 3.5 | 0.2 | 0.2 | 0.3 | 0.3 | 0.3 |

TABLE 26-continued

Measurement/evaluation results of physical properties of hard coat laminated film

|  | Example 110 | Example 111 | Example 112 | Example 113 | Example 114 | Example 115 |
|---|---|---|---|---|---|---|
| Yellowness index | 0.3 | 0.3 | 0.3 | 0.3 | 0.3 | 0.4 |
| Water contact angle deg | 116 | 116 | 116 | 116 | 116 | 116 |
| Abrasion resistance 1 | A | A | A | A | A | A |
| Abrasion resistance 2 | A | A | A | A | A | A |
| Pencil hardness | 9H | 7H | 5H | 4H | 7H | 2H |
| Surface smoothness | ◎ | ◎ | ◎ | ◎ | ◎ | ◎ |
| Cross-cut test | Class 0 | Class 0 | Class 0 | Class 0 | Class 0 | Class 0 |
| Minimum bending radius mm | 50 | 30 | 30 | 30 | 40 | 30 |
| Cutting processability | ◎-○ | ◎-○ | ◎-○ | ◎-○ | ◎-○ | ◎-○ |
| Shrinkage-starting temperature ° C. | 140 | 140 | 140 | 70 | 100 | 130 |

It was found from these results that each of the hard coat laminated films obtained by the production method according to the invention had a good interlayer adhesiveness and was excellent in balance among transparency, color tone, abrasion resistance, surface hardness and surface appearance. Therefore, these hard coat laminated films can be suitably used for a display faceplate in an image display device with a touch panel function.

The hard coat laminated film according to the first aspect and the hard coat laminated film according to the second aspect are excellent in transparency, surface hardness, bending resistance, abrasion resistance, color tone and surface appearance. Therefore, these hard coat laminated films can be suitably used for a member in an image display device such as a liquid crystal display, a plasma display and an electroluminescence display (including an image display device with a touch panel function and an image display device with no touch panel function), particularly for a display faceplate in an image display device with a touch panel function.

The method according to the third aspect enables to obtain a hard coat laminated film having a good interlayer adhesion strength even in the case where a plurality of hard coats with largely different properties are laminated. Therefore, a hard coat laminated film obtained by using this method is excellent in transparency, color tone, abrasion resistance, surface hardness and surface smoothness and can be suitably used for a member in an image display device such as a liquid crystal display, a plasma display and an electroluminescence display (including an image display device with a touch panel function and an image display device with no touch panel function), particularly for a display faceplate in an image display device with a touch panel function.

INDUSTRIAL APPLICABILITY

The hard coat laminated film according to the invention can be suitably used for a member in an image display device such as a liquid crystal display, a plasma display and an electroluminescence display (including an image display device with a touch panel function and an image display device with no touch panel function), particularly for a display faceplate in an image display device with a touch panel function.

REFERENCE SIGNS LIST

1: UV irradiator
2: Mirror-finished metal roll
3: Web
4: Holding angle
5: First hard coat
6: Second hard coat
7: First poly(meth)acrylimide resin layer ($\alpha 1$)
8: Aromatic polycarbonate resin layer ($\beta$)
9: Second poly(meth)acrylimide resin layer ($\alpha 2$)
10: Third hard coat

The invention claimed is:

1. A hard coat laminated film comprising a first hard coat, a second hard coat, a transparent resin film layer, and a third hard coat in order from an outermost surface layer side, wherein
   the first hard coat is formed of a coating material containing
   (A) 100 parts by mass of a polyfunctional (meth)acrylate;
   (B) 0.01 to 7 parts by mass of a water repellant; and
   (C) 0.01 to 10 parts by mass of a silane coupling agent and containing no inorganic particles;
   the second hard coat is formed of a coating material containing
   (A) 100 parts by mass of a polyfunctional (meth)acrylate;
   (D) 50 to 300 parts by mass of inorganic fine particles having an average particle size of 1 to 300 nm;
   the third hard coat is formed of a coating material containing:
   (A) 100 parts by mass of a polyfunctional (meth)acrylate; and
   (D) 50 to 300 parts by mass of inorganic fine particles having an average particle size of 1 to 300 nm;
   the third hard coat is a single layer that is the only hard coat present on the opposite side of the transparent resin film layer from the first hard coat and the second hard coat; and
   the transparent resin film layer is the only resin film layer present between the second hard coat and the third hard coat.

2. The hard coat laminated film according to claim 1, wherein the (B) water repellant comprises a (meth)acryloyl group-containing fluoropolyether water repellant.

3. The hard coat laminated film according to claim 1, wherein a thickness of the first hard coat is 0.5 to 5 μm.

4. The hard coat laminated film according to claim 1, wherein a thickness of the second hard coat is 10 to 30 μm.

5. The hard coat laminated film according to claim 1, wherein the transparent resin film is a transparent multilayer film with
   a first poly(meth)acrylimide resin layer ($\alpha 1$);
   an aromatic polycarbonate resin layer ($\beta$); and a second poly(meth)acrylimide resin layer (α2) directly laminated in this order.

6. An image display device comprising the hard coat laminated film according to claim 1.

7. The hard coat laminated film according to claim 1, further satisfying the following requirements:
the hard coat laminated film fulfills one of the following criteria of A and B:
when the hard coat laminated film is placed on a Gakushin tester in accordance with JIS L0849 so that the first hard coat is on the surface side; a steel wool of #0000 is subsequently attached to a rubbing finger of the Gakushin tester and a load of 500 g is then applied; after 100 reciprocating rubbings of the surface of the test piece, the rubbed portion is visually observed; in the case where no scratch is found, the operation of additionally carrying out 100 reciprocating rubbings and then visually observing the rubbed portion is repeated, and evaluation is performed by using the following criteria:
A: no scratches are found even after 500 cycles of reciprocation;
B: no scratches are found after 400 cycles of reciprocation but scratches are found after 500 cycles of reciprocation.

8. The hard coat laminated film according to claim 1, further satisfying the following requirements:
when a square lattice pattern cut consisting of 100 cells (1 cell=1 mm×1 mm) is provided on the surface of the first hard coat in accordance with JIS K5600-5-6:1999, a tape for adhesion tests is attached on the square lattice pattern cut and rubbed with fingers and then peeled off; the hard coat laminated film fulfills one of the following criteria of classification 0, classification 1 and classification 2 in accordance with Table 1 in the above standard of JIS:
classification 0: the edges of the cuts are completely smooth and none of the squares of the lattice is detached;
classification 1: detachment of small flakes of the coating is seen at the intersections of the cuts, and a cross-cut area of not greater than 5% is affected; and
classification 2: the coating flakes along the edges and/or at the intersections of the cuts, and a cross-cut area of greater than 5%, but not greater than 15%, is affected.

9. The hard coat laminated film according to claim 1, wherein a pencil hardness of a surface of the first hard coat is 5H or higher.

10. The hard coat laminated film according to claim 1, wherein a pencil hardness of a surface of the first hard coat is 7H or higher.

11. The hard coat laminated film according to claim 1, further satisfying the following requirements:
the hard coat laminated film fulfills one of the following criteria of A and B:
when the hard coat laminated film is placed on a Gakushin tester in accordance with JIS L0849 so that the first hard coat is on the surface side; a steel wool of #0000 is subsequently attached to a rubbing finger of the Gakushin tester and a load of 500 g is then applied; after 100 reciprocating rubbings of the surface of the test piece, the rubbed portion is visually observed; in the case where no scratch is found, the operation of additionally carrying out 100 reciprocating rubbings and then visually observing the rubbed portion is repeated, and evaluation is performed by using the following criteria:
A: no scratches are found even after 500 cycles of reciprocation;
B: no scratches are found after 400 cycles of reciprocation but scratches are found after 500 cycles of reciprocation; and
the hard coat laminated film further satisfying the following requirements:
when a square lattice pattern cut consisting of 100 cells (1 cell=1 mm×1 mm) is provided on the surface of the first hard coat in accordance with JIS K5600-5-6:1999, a tape for adhesion tests is attached on the square lattice pattern cut and rubbed with fingers and then peeled off; the hard coat laminated film fulfills one of the following criteria of classification 0, classification 1 and classification 2 in accordance with Table 1 in the above standard of JIS:
classification 0: the edges of the cuts are completely smooth and none of the squares of the lattice is detached;
classification 1: detachment of small flakes of the coating is seen at the intersections of the cuts, and a cross-cut area of not greater than 5% is affected;
classification 2: the coating flakes along the edges and/or at the intersections of the cuts, and a cross-cut area of greater than 5%, but not greater than 15%, is affected; and
wherein a pencil hardness of a surface of the first hard coat is 5H or higher.

12. The hard coat laminated film according to claim 1, wherein the (C) silane coupling agent comprises one or more selected from the group consisting of a silane coupling agent having an amino group and a silane coupling agent having a mercapto group.

13. The hard coat laminated film according to claim 1, wherein the coating material for forming the second hard coat further comprises (E) 0.01 to 1 part by mass of a silicon-acrylic copolymer leveling agent.

14. The hard coat laminated film according to claim 1, wherein the second hard coat, the transparent resin film layer, and the third hard coat are laminated directly or so as to interpose an anchor coat only between the layers.

\* \* \* \* \*